United States Patent [19]

Kuroda et al.

[11] Patent Number: 4,956,277
[45] Date of Patent: Sep. 11, 1990

[54] PHOTOCONDUCTOR COMPRISING CHARGE TRANSPORTING HYDRAZONE COMPOUNDS

[75] Inventors: Masami Kuroda; Youichi Nakamura; Noboru Furusho, all of Kawasaki, Japan

[73] Assignee: Fuji Electric Co., Ltd., Kanagawa, Japan

[21] Appl. No.: 281,029

[22] Filed: Dec. 7, 1988

[30] Foreign Application Priority Data

| Dec. 9, 1987 | [JP] | Japan | 62-311310 |
| Dec. 16, 1987 | [JP] | Japan | 62-317770 |
| Dec. 22, 1987 | [JP] | Japan | 62-326230 |
| Dec. 22, 1987 | [JP] | Japan | 62-326228 |
| Dec. 28, 1987 | [JP] | Japan | 62-332364 |
| Dec. 28, 1987 | [JP] | Japan | 62-332370 |
| Dec. 28, 1987 | [JP] | Japan | 62-332371 |

[51] Int. Cl.$^5$ ............................................. G03G 5/10
[52] U.S. Cl. ............................................. 430/58; 430/73
[58] Field of Search .................. 430/58, 73, 70, 75, 430/79, 82

[56] References Cited

U.S. PATENT DOCUMENTS

| 3,484,237 | 12/1969 | Shattuck et al. | 430/76 |
| 4,150,987 | 3/1979 | Anderson et al. | 260/566 B |
| 4,278,747 | 7/1981 | Murayama et al. | 430/82 |
| 4,353,971 | 4/1982 | Chang et al. | 430/58 |
| 4,367,273 | 1/1983 | Murayama et al. | 430/82 |
| 4,385,106 | 5/1983 | Sakai | 430/59 |
| 4,415,640 | 11/1983 | Gato et al. | 430/59 |
| 4,448,868 | 2/1984 | Suzuki et al. | 430/58 |
| 4,565,761 | 3/1986 | Katagiri et al. | 430/83 |
| 4,568,623 | 2/1986 | Makino et al. | 430/58 |
| 4,606,986 | 8/1986 | Yanns et al. | 430/59 |
| 4,624,904 | 11/1986 | Kazmaier et al. | 430/59 |
| 4,629,670 | 12/1986 | Katagiri et al. | 430/58 |
| 4,666,809 | 5/1987 | Matsumoto et al. | 430/73 |
| 4,673,630 | 6/1987 | Katagiri et al. | 430/72 |
| 4,677,045 | 6/1987 | Champ et al. | 430/76 |
| 4,702,983 | 10/1987 | Haino et al. | 430/75 |
| 4,731,315 | 3/1988 | Horie et al. | 430/77 |
| 4,783,387 | 11/1988 | Ueda | 430/76 |
| 4,808,503 | 2/1989 | Yamada et al. | 430/73 |
| 4,839,252 | 8/1989 | Murata et al. | 430/59 |
| 4,861,691 | 7/1989 | Kuroda et al. | . |
| 4,861,692 | 1/1989 | Kuroda et al. | 430/59 |

FOREIGN PATENT DOCUMENTS

| 0131140 | 1/1985 | European Pat. Off. . |
| 3019909 | 11/1980 | Fed. Rep. of Germany . |
| 3203621 | 1/1982 | Fed. Rep. of Germany . |
| 3141306 | 6/1982 | Fed. Rep. of Germany . |
| 3139524 | 8/1982 | Fed. Rep. of Germany . |
| 3303830 | 8/1983 | Fed. Rep. of Germany . |
| 37543 | 3/1972 | Japan . |
| 10785 | 7/1972 | Japan . |
| 66444 | 9/1973 | Japan . |
| 39952 | 4/1975 | Japan . |
| 50455 | 3/1984 | Japan . |
| 59-182456 | 3/1984 | Japan . |
| 59-182457 | 4/1984 | Japan . |
| 93443 | 5/1985 | Japan . |
| 264055 | 11/1987 | Japan . |

Primary Examiner—John L. Goodrow
Attorney, Agent, or Firm—Spencer & Frank

[57] ABSTRACT

An electrophotographic photosensitive material includes a photosensitive layer containing a charge transporting substance comprising a novel hydrazone compound or derivative. A hydrazone compound is represented by the following general formula:

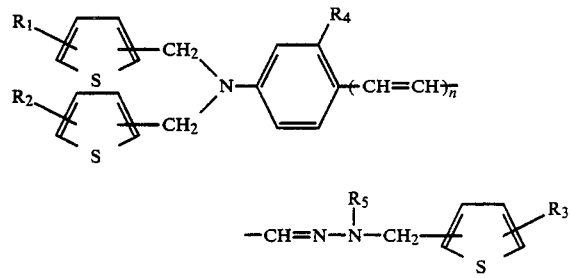

wherein $R_1$ stands for an aryl group which may have a substituent(s); each of $R_2$, $R_3$, $R_4$, $R_5$ and $R_6$ stands for a hydrogen atom, a halogen atom, an alkyl group, an alkoxy group, a hydroxy group, a nitro group, an allyl group, an aryl group, or an aralkyl group, both of which aryl group and aralkyl group may have a substituent(s); and n stands for an integer of 0 or 1.

21 Claims, 1 Drawing Sheet

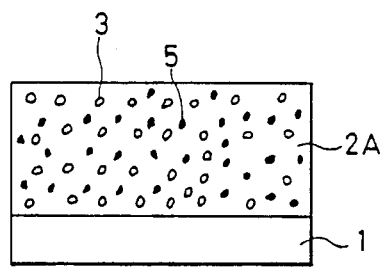
F I G. 1
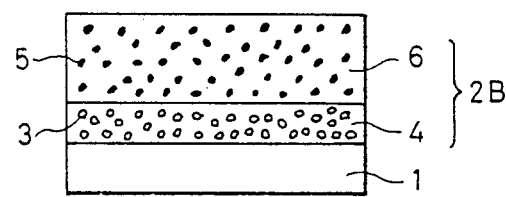
F I G. 2
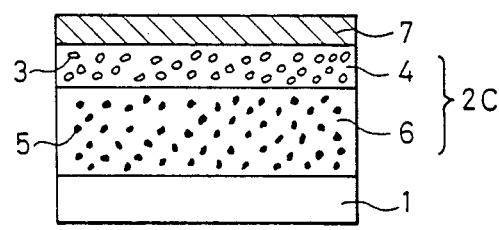
F I G. 3

PHOTOCONDUCTOR COMPRISING CHARGE TRANSPORTING HYDRAZONE COMPOUNDS

BACKGROUND OF THE INVENTION

1. Field of the Invention

The present invention relates to a photoconductor for electrophotography, and particularly to a photoconductor for electrophotography which contains a novel hydrazone compound or a derivative thereof in the photosensitive layer thereof formed on an electroconductive substrate.

2. Description of the Prior Art

Photosensitive materials which have heretofore been used as photoconductors for electrophotography include inorganic photoconductive substances, such as selenium and selenium alloys, dispersions of inorganic photoconductive substances such as zinc oxide and cadmium sulfide in resin binders, organic polymeric photoconductive substances, such as poly-N-vinylcarbazole and polyvinylanthracene, organic photoconductive substances, such as phthalocyanine compounds and bisazo compounds, and dispersions of such organic polymeric photoconductive substances in resin binders.

Photoconductors are required to maintain surface electric charge in the dark, a to generate an electric charge upon receiving light, and to transport an electric charge upon receiving light. Photoconductors are classified into two types namely so-called monolayer type photoconductors, and so-called laminate type photonductors. The former comprises a single layer having all of the above-mentioned three functions, and the latter comprises functionally distinguishable laminated layers, i.e., one layer of which contributes mainly to the generation of electric charge, and another layer of which contributes to the retention of surface electric charge in the dark and the transportation of electric charge upon receiving light. An electrophotographic method using a photoconductor of the kinds a mentioned above is, for example, the Carlson's system as applied to image formation. The image formation according to this system comprises the steps of subjecting a photoconductor in the dark to corona discharge to charge the photoconductor, illuminating the surface of the charged photoconductor with imagewise light based on a manuscript or copy bearing, e.g., letters and/or pictures to form a latent electrostatic image, developing the formed latent electrostatic image with a toner, and transferring the developed toner image to a support such as a paper sheet to fix the toner image on the support. After the toner image transfer, the photoconductor is subjected to the steps of removal of the electric charge, removal of the remaining toner (cleaning), neutralizaiton of the residual charge with light (erasure), and so on so as to be ready for reuse.

Photosensitive members for electrophotography in which use is made of an organic material(s) have recently been put into practical by virtue of the advantageous feature(s) of the organic material(s) such as flexibility, thermal stability, and/or a film forming capacity. They include a photoconductor comprising poly-N-vinylcarbazole and 2,4,7-trinitrofluoren-9-one (disclosed in U.S. Pat. No. 3,484,237), a photoconductor using an organic pigment as the main component (disclosed in Japanese Patent Laid-Open No. 37,543/1972), and a photoconductor using as a main component an eutectic complex composed of a dye and a resin (disclosed in Japanese Patent Laid-Open No. 10,785/1972). A number of novel hydrazone compounds have also been put into practical use for photoconductors.

Although organic materials have a number of advantageous features as mentioned above with which inorganic materials are not endowed, the fact is that there have been obtained no organic materials fully satisfying all of the characteristics required of a material to be used in photoconductors for electrophotography at present. Particular problems involved in organic materials have been concerned with photosensitivity and characteristics in continuous repeated use.

SUMMARY OF THE INVENTION

An object of the present invention is to provide a photoconductor for electrophotography to be used in copying apparatus and printers, which photoconductor has a high photosensitivity and excellent characteristics in repeated use, through the use, in the photosensitive layer, of a novel organic materials not used to date as a charge transporting substance.

In the first aspect of the present invention, a photoconductor for electrophotography comprises:

at least one hydrazone compound represented by the following general formula (I) as a charge transporting substance:

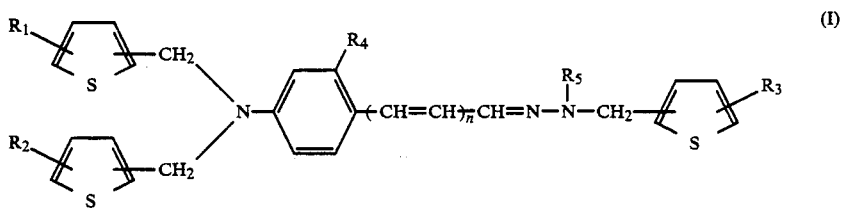

(I)

wherein each of $R_1$, $R_2$, $R_3$ and $R_4$ stands for a hydrogen atom, a halogen atom, an alkyl group, an alkoxy group, a hydroxy group, an allyl group, a nitro group, an aryl group, or an amino group, both of which aryl group and amino group may have a substituent(s); $R_{b\,5}$ stands for an aryl group which may have a substituent(s) and n stands for an integer of 0 or 1.

Here, the photoconductor may comprise a layer including a dispersion of a charge generating substance and a charge transporting substance selected from hydrazone compounds represented by the general formulae (I) in a binder resin.

The photoconductor may comprise a laminate of a charge transporting layer including a charge transporting substance selected from hydrazone compounds represented by the general formulae (I) and a charge generating layer.

In the second aspect of the present invention, a photoconductor for electrophotography comprises:

at least one hydrazone compound represented by the following general formula (II) as a charge transporting substance:

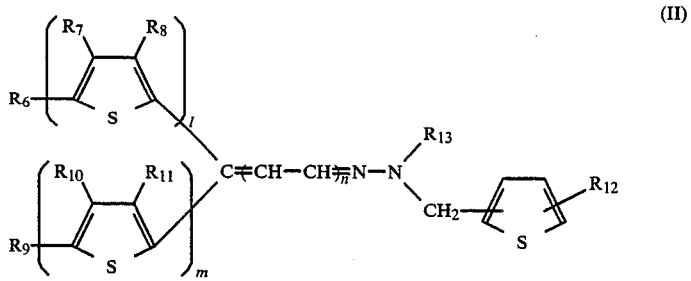

(II)

wherein each of $R^6$, $R^7$, $R^8$, $R^9$, $R^{10}$, $R^{11}$ and $R^{12}$ stands for a hydrogen atom, a halogen atom, an alkyl group, a hydroxy group, an alkoxy group, a nitro group, an acyl group, an aryl group, or an amino group both of which aryl group and amino group may have a substituent(s); $R_{13}$ stands for an aryl group which may have a substituent(s); each of l and m stands for an integer 1, 2 or 3; and n stands for an integer of 0 or 1.

Here, the photoconductor may comprise a layer including a dispersion of a charge generating substance and a charge transporting substance selected from hydrazone compounds represented by the general formulae (II) in a binder resin.

The photoconductor may comprise a laminate of a charge transporting layer including a charge transporting substance selected from hydrazone compounds represented by the general formulae (II) and a charge generating layer.

In the third aspect of the present invention, a photoconductor for electrophotography comprises:

at least one hydrazone derivative represented by the following general formula (III) as a charge transporting substance:

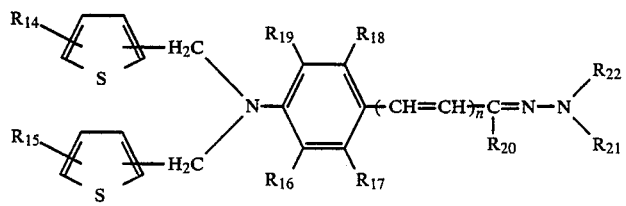

(III)

wherein each of $R_{14}$, $R_{15}$, $R_{16}$, $R_{17}$, $R_{18}$, $R_{19}$ and $R_{20}$ stands for a hydrogen atoms, a halogen atom, an alkyl group, an alkoxy group, an allyl group, an aralkyl group, or an aryl group, which aryl group may have a substituent(s); each of $R_{21}$ and $R_{22}$ stands for an alkyl group, an allyl group, an aralkyl group or an aryl group, which aryl group may have a substituent(s); and n stands for an integer of 0 or 1.

Here, the photoconductor may comprise a layer including a dispersion of a charge generating substance and a charge transporting substance selected from hydrazone derivative represented by the general formulae (III) in a binder resin.

The photoconductor may comprise a laminate of a charge transporting layer including a charge transporting substance selected from hydrazone derivatives represented by the general formulae (III) and a charge generating layer.

In the fourth aspect of the present invention, a photoconductor for electrophotography comprises:

at least one hydrazone derivative represented by the following general formula (IV) as a charge transporting substance:

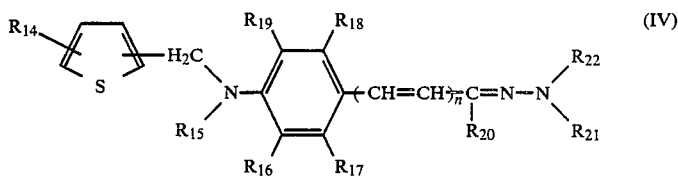

(IV)

wherein each of $R_{14}$, $R_{15}$, $R_{16}$, $R_{17}$, $R_{18}$, $R_{19}$ and $R_{20}$ stands for a hydrogen atom, a halogen atom, an alkoxy group, an alkyl group, or an allyl group, an aralkyl group, an aryl group, which aryl group may have a substituent(s); each of $R_{21}$ and $R_{22}$ stands for an alkyl group, an allyl group, an aralkyl group or an aryl group, which aryl group may have a substituent(s); and n stands for an integer of 0 or 1.

Here, the photoconductor may comprise a layer including a dispersion of a charge generating substance and a charge transporting substance selected from hydrazone derivatives represented by the general formulae (IV) in a binder resin.

The photoconductor may comprise a laminate of a charge transporting layer including a charge transporting substance selected from hydrazone derivatives represented by the general formulae (IV) and a charge generating layer.

In the fifth aspect of the present invention, a photoconductor for electrophotography comprises:

at least one hydrazone compound represented by the following general formula (V) as a charge transporting substance:

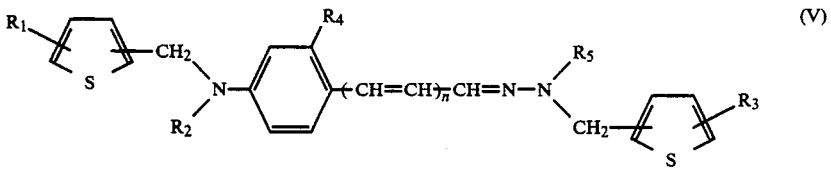
(V)

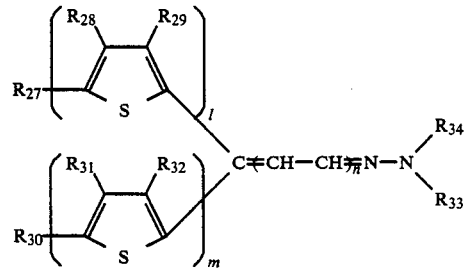
(VII)

wherein each of $R_1$, $R_2$, $R_3$ and $R_4$ stands for a hydrogen atom, a halogen atom, an alkyl group, an alkoxy group, an allyl group, a hydroxy group, a nitro group, an aryl group or an amino group, both of which aryl group and amino group may have a substituent(s); $R_5$ stands for an aryl group which may have a substituent(s); and n stands for an integer 0 or 1.

Here, the photoconductor may comprise a layer including a dispersion of a charge generating substance and a charge transporting substance selected from hydrazone compounds represented by the general formulae (V) in a binder resin.

The photoconductor may comprise a laminate of a charge transporting layer including a charge transporting substance selected from hydrazone compounds represented by the general formulae (V) and a charge generating layer.

In the sixth aspect of the present invention, a photoconductor for electrophotography comprises: at least one hydrazone compound represented by the following general formula (VI) as a charge transporting substance:

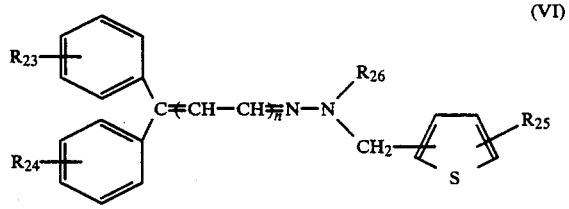
(VI)

wherein each of $R_{23}$, $R_{24}$ and $R_{25}$ stands for a hydrogen atom, a halogen atom, an alkyl group, a hydroxy group, an alkoxy group, or an aryl group, a nitro group, or an amino group each of which groups may have a substituent(s); $R_{26}$ stands for an aryl group which may have a substituent(s); and n stands for an integer of 0 or 1.

Here, the photoconductor may comprise a layer including a dispersion of a charge generating substance and a charge transporting substance selected from hydrazone compounds represented by the general formulae (VI) in a binder resin.

The photoconductor may comprise a laminate of a charge transporting layer including a charge transporting substance selected from hydrazone compounds represented by the general formulae (VI) and a charge generating layer.

In the seventh aspect of the present invention, a photoconductor for electrophotography comprises:
at least one hydrazone compound represented by the following general formula (VII) as a charge transporting substance:

wherein each of $R_{27}$, $R_{28}$, $R_{29}$, $R_{30}$, $R_{31}$ and $R_{32}$ stands for a hydrogen atom, a halogen atom, an alkyl group, an alkoxy group, an acyl group, a nitro group, an aryl group or an amino group, both of which aryl group and amino group may have a substituent(s); each of $R_{33}$ and $R_{34}$ stands for an alkyl group, an allyl group, or an aralkyl group or an aralkyl group, both of which aryl group and aralkyl may have a substituent(s); each of l and m stands for 1, 2, 3; and stands for an integer of 0 or 1.

Here, the photoconductor may comprise a layer including a dispersion of a charge generating substance and a charge transporting substance selected from hydrazone compounds represented by the general formulae (VII) in a binder resin.

The photoconductor may comprise a laminate of a charge transporting layer including a charge transporting substance selected from hydrazone compounds represented by the general formulae (VII) and a charge generating layer.

The above and other objects, effects, features and advantages of the present invention will become more apparent from the following description of embodiments thereof taken in conjunction with the accompanying drawings.

BRIEF DESCRIPTION OF THE DRAWINGS

FIGS. 1 to 3 are schematic cross-sectional views of photoconductors according to the present invention.

DETAILED DESCRIPTION OF PREFERRED EMBODIMENTS

The photoconductor according to the present invention which contains a hydrazone compound or hydrazone derivative in the photosensitive layer thereof may be in the form of any one of the structures of FIGS. 1, 2 and 3, depending on the way in which the hydrazone compound and the hydrazone derivative are applied thereto.

FIGS. 1, 2 and 3 are schematic cross-sectional views of different embodiments of the photoconductor of the present invention, respectively.

FIG. 1 shows a monolayer type photoconductor. A photosensitive layer 2A is provided on an electroconductive substrate 1. The photosensitive layer 2A comprises a charge generating substance 3 and a hydrazone compound or a hydrazone drivative as a charge transporting substance 5 both of which substances are dispersed in a resin binder matrix so that the photosensitive layer 2A functions as a photoconductor.

FIG. 2 shows a laminate type photoconductor. A laminated photosensitive layer 2B is provided on an electroconductive substrate 1, a lower layer of the laminate is a charge generating layer 4 including a charge generating substance 3 as the main component and an upper layer of the laminate is a charge transporting layer 6 containing a hydrazone compound or a hydrazone derivative as a charge transporting substance 5, so that the photosensitive layer 2B functions as a photoconductor. This photoconductor is usually used according to the negative charge mode.

FIG. 3 shows another laminate type photoconductor having a layer structure in reverse to that of FIG. 2. A laminated photosensitive layer 2C is provided on an electroconductive substrate 1, a lower layer of the laminate is a charge transporting layer 6 including a hydrazone compound or a hydrazone derivative as a charge transporting substance 5 and an upper layer of the laminate is a charge generating layer 4 including a charge generating substance 3. The photosensitive layer also functions as a photoconductor. This photoconductor is usually used according to the positive charge mode. In this case, a covering layer 7 may generally be further provided as shown in FIG. 3 to protect the charge generating layer 4.

Thus, there are two different types of layer structures in the photoconductor. The reason for this is that, even if any photoconductor with the layer structure as shown in FIG. 2 is to be used in the positive charge mode, no charge transporting substances adaptable to the positive charge mode have been found yet. Accordingly, when adaptation to the positive charge mode is desired, the photoconductor is required to have a layered structure as shown in FIG. 3 at present.

A photoconductor as shown in FIG. 1 can be produced by dispersing a charge generating substance in a solution of a charge transporting substance and a resin binder and applying the resulting dispersion on an electroconductive substrate.

A photoconductor as shown in FIG. 2 can be prepared by depositing a charge generating substance on an electroconductive substrate by means of vacuum evaporation or applying and drying a dispersion of a particulate charge generating substance in a solvent and/or a resin binder on an electroconductive substrate, followed by applying a solution of a charge transporting substance and a resin binder on the resulting layer and drying.

A photoconductor as shown in FIG. 3 can be prepared by applying and drying a solution of a charge transporting substance and a resin binder on an electroconductive substrate, and depositing a charge generating substance on the resulting coating layer by means of vacuum evaporation or coating and drying a dispersion of a particulate charge generating substance in a solvent and/or a resin binder on the coating layer, followed by formation thereon of a covering layer.

The electroconductive substrate 1 serves as an electrode of the photoconductor and as a support for a layer(s) formed thereon. The electroconductive substrate may be in the form of a cylinder, a plate or a film, and may be made of a metallic material such as aluminum, stainless steel or nickel, or other material having a surface treated to be electroconductive, such as glass so treated or a resin so treated.

The charge generating layer 4 is formed by application of a dispersion of a particulate charge generating substance 3 in a resin binder or by deposition of a charge generating substance by means of vacuum evaporation, or the like technique as described above, and this layer generates an electric charge upon receiving light. It is important that the charge generating layer 4 be high not only in charge generating efficiency but also in capability of injecting the generated electric charge into the charge transporting layer 6 and any covering layer 7, whose capability is desirably dependent upon the electric field as little as possible and high even in low intensity electric fields. Usable charge generating substances include phthalocyanine compounds such as metal-free phthalocyanine and titanyl phthalocyanine; various azo, quinone and indigo pigments; dyes such as cyanine, squarylium, azulenium, and pyrylium compounds; and selenium and selenium compounds. Among them, a suitable compound can be chosen depending on the wavelength range of a light source used for the image formation. The thickness of the charge generating layer is determined depending on the extinction coefficient of a charge generating substance to be used therein in view of the layer's function of generating an electric charge, but is generally 5 $\mu$m or smaller, preferably 1 $\mu$m or smaller. It also is possible to form a charge generating layer using a charge generating substance as a main component in mixture with a charge transporting substance and so on. Resin binders usable in the charge generating layer include polycarbonates, polyesters, polyamides, polyurethanes, epoxy resins, silicone resins, and methacrylate homopolymer and copolymers, which may be used either alone or in an appropriate composition ratio.

The charge transporting layer 6 is a coating film containing a hydrazone compound or hydrazone derivative as an organic charge transporting substance in a resin binder. The charge transporting layer serves as an insulator layer in the dark so as to retain the electric charge of the photoconductor, and fulfills a function of transporting an electric charge injected from the charge generating layer upon receiving light. Resin binders usable in the charge transporting layer include polycarbonates, polyesters, polyamides, polyurethanes, epoxy resins, silicone resins, and methacryate homopolymer and copolymers.

The covering layer 7 has a function of receiving and retaining an electric charge generated by corona discharge in the dark and a capability of transmitting light to which the charge generating layer should respond. It is necessary that the covering layer transmits light upon exposure of the photoconductor and allows the light to reach the charge generating layer, and then undergoes injection of an electric charge generated in the charge generating layer to neutralize and erase a surface electric charge. Materials usable in the covering layer include organic insulating film-forming materials such as polyesters and polyamides. Such organic materials may also be used in mixture with an inorganic material such as a glass resin or $SiO_2$, or a material for lowering electric resistance such as a metal or a metallic oxide. Materials usable in the covering layer are not limited to organic insulating materials for film-forming, and further include inorganic materials such as $SiO_2$, metals, and metallic oxides, which may be formed into a covering layer by an appropriate method such as vacuum evaporation and deposition, or sputtering. From the viewpoint of the aforementioned description, it is desirable that the material to be used in the covering layer be as transparent as possible in the wavelength range in which the charge generating substance attains maximum light absorption.

Although the thickness of the covering layer depends on the material or composition thereof, it can be arbitrarily set in so far as it does not produce any adverse effects including an increase in a residual potential in continuous repeated use.

The hydrazone compounds to be used in the present invention can be easily synthesized by a customary method.

The first group of hydrazone compounds is represented by the following general formula (I).

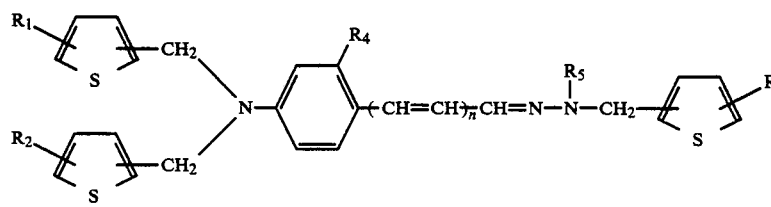
(I)

Wherein, each of $R_1$, $R_2$, $R_3$ and $R_4$ stands for a hydrogen atom a halogen atom, an alkyl group, an alkoxy group, a hydroxy group, an allyl group, a nitro group, an aryl group, or an amino group, both of which aryl group and amio group may have a substituent(s); $R_5$ stands for an aryl group which may have a substituent(s); and n stands for an integer of 0 or 1.

These compounds are synthesized by dehydration-condensating an aldehyde compound of the formula

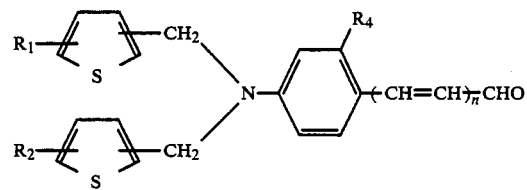

with a hydrazine compound of the formula

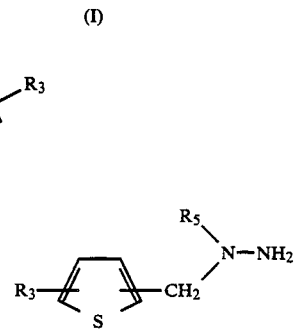

in an appropriate organic solvent such as ethanol in the presence of a small amount of a catalyst such as an acid.

Specific examples of the hydrazone compounds of the general formula (I) prepared in the above-mentioned manner include:

Compound No. I-1

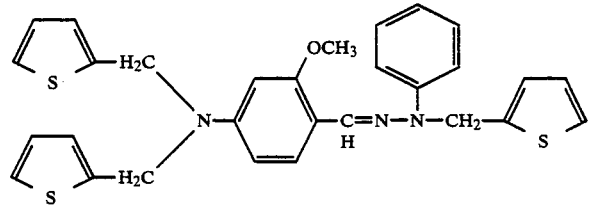

Compound No. I-2

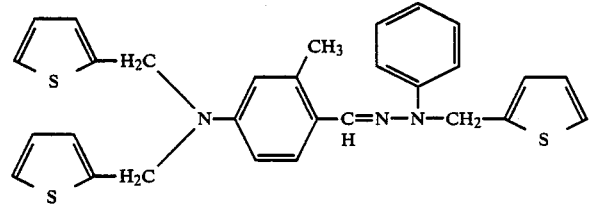

Compound No. I-3

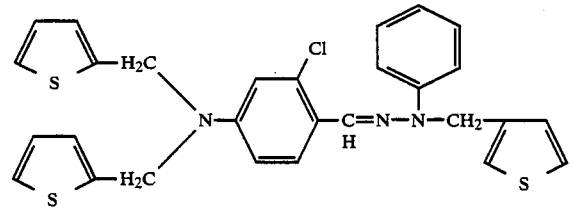

-continued
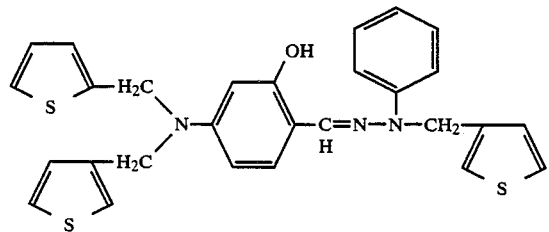
Compound No. I-4
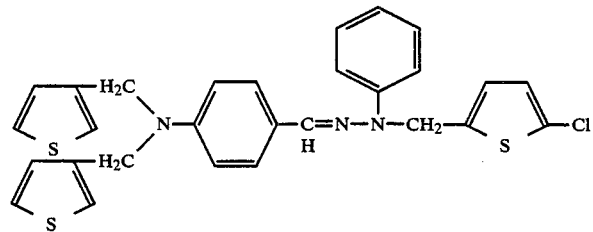
Compound No. I-5
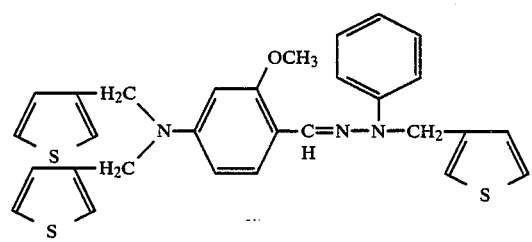
Compound No. I-6
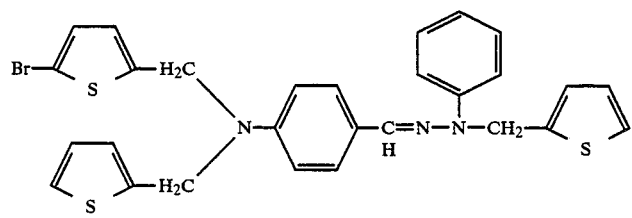
Compound No. I-7
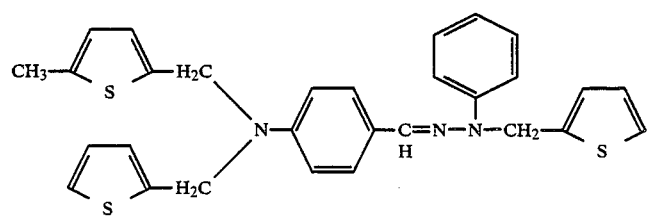
Compound No. I-8
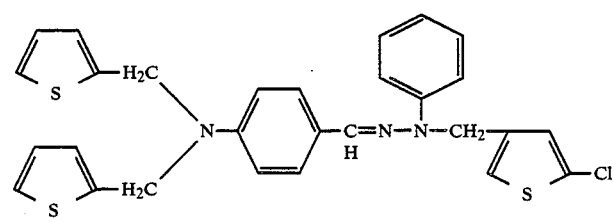
Compound No. I-9

-continued
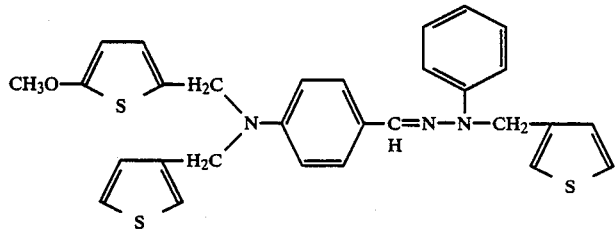
Compound No. I-10
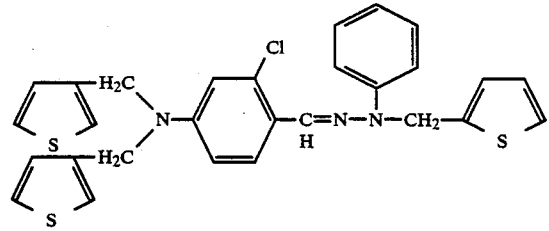
Compound No. I-11
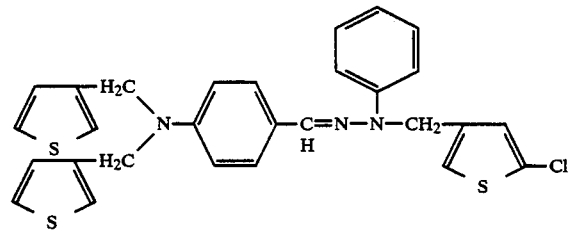
Compound No. I-12
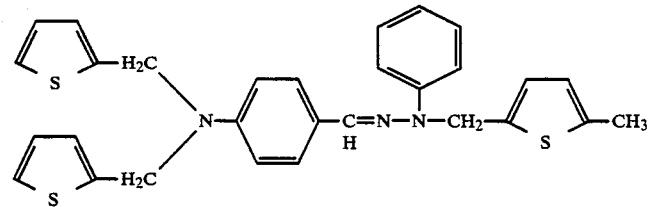
Compound No. I-13
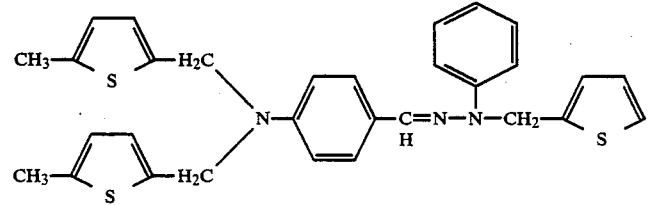
Compound No. I-14
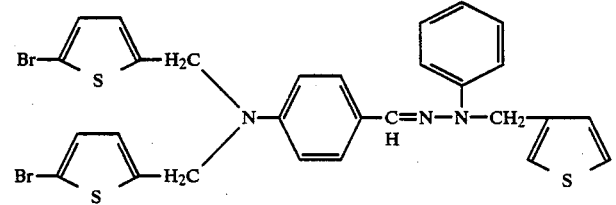
Compound No. I-15

-continued
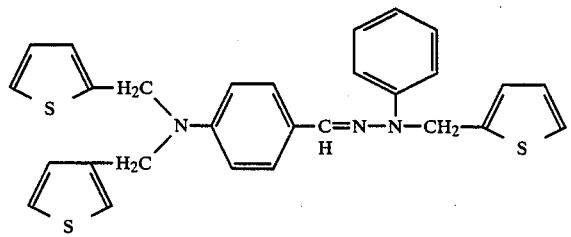
Compound No. I-16
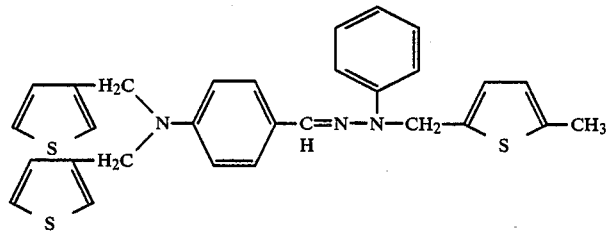
Compound No. I-17
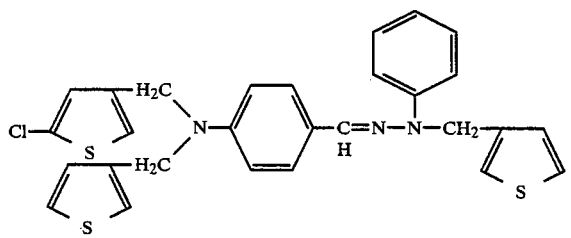
Compound No. I-18
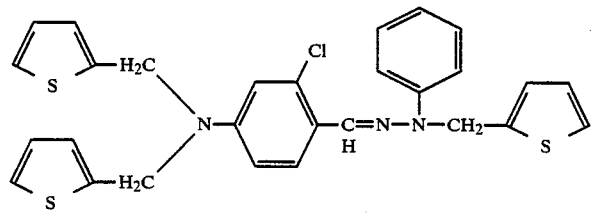
Compound No. I-19
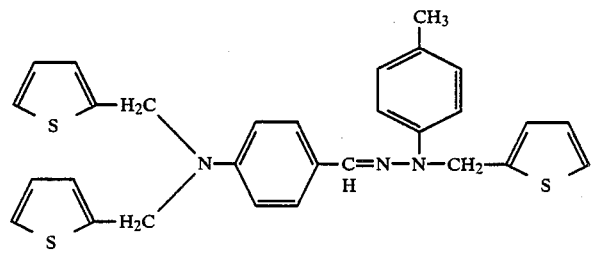
Compound No. I-20
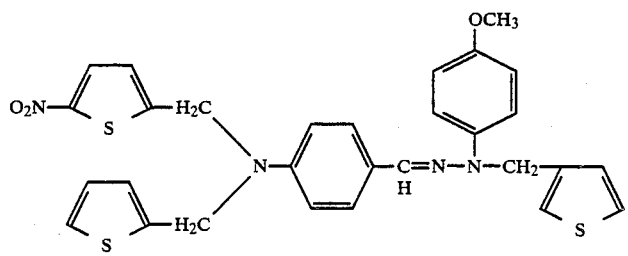
Compound No. I-21

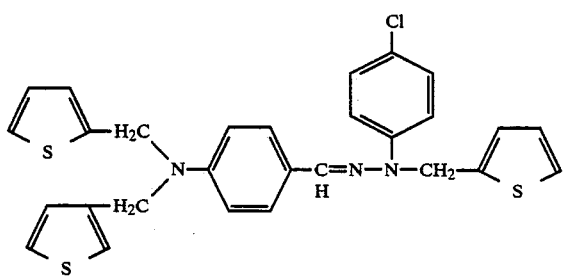
Compound No. I-22
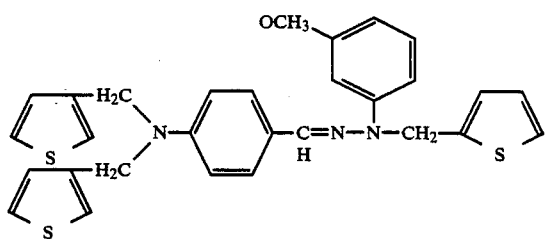
Compound No. I-23
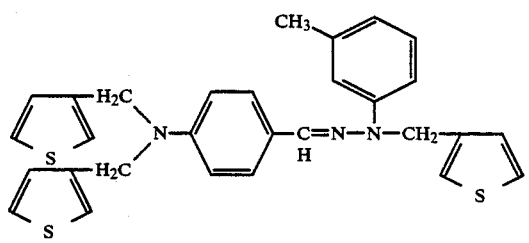
Compound No. I-24
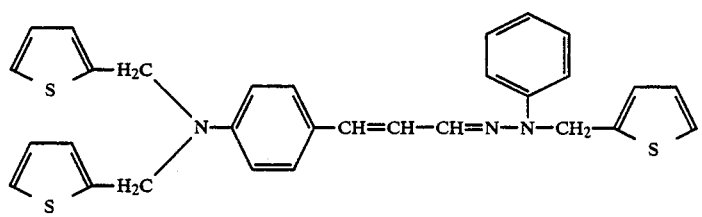
Compound No. I-25
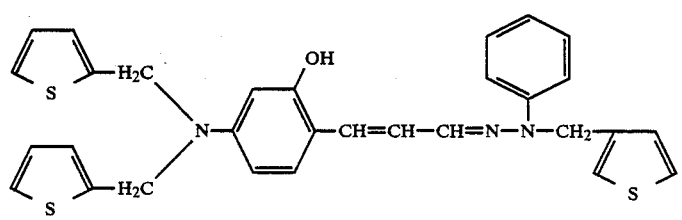
Compound No. I-26
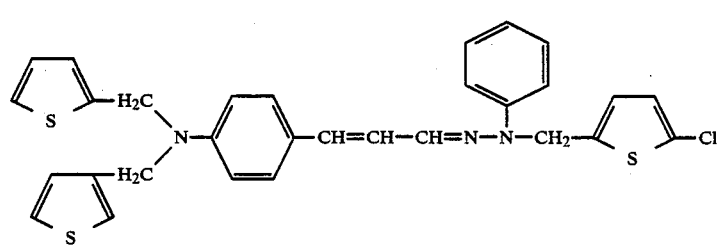
Compound No. I-27

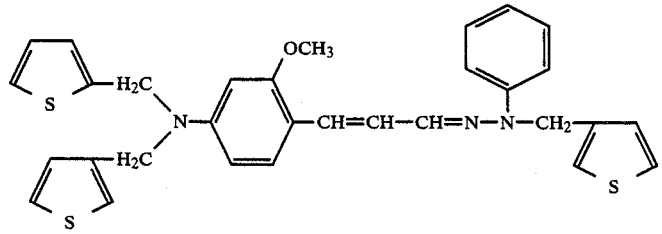

Compound No. I-28

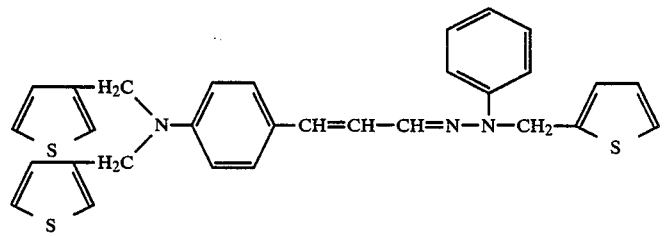

Compound No. I-29

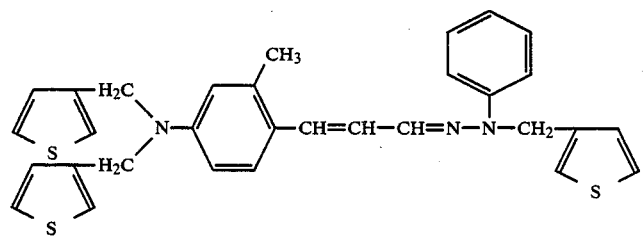

Compound No. I-30

Examples will now be given, wherein various compounds represented by the general formula (I) were respectively used to produce photoconductors.

EXAMPLE I-1

50 parts by weight of metal-free phthalocyanine (manufactured by Tokyo Kasei Co., Ltd.) pulverized with a ball mill for 150 hours and 100 parts by weight of the hydrazone compound No. I-1 mentioned above were kneaded together with 100 parts by weight of a polyester resin (Vylon 200 (trademark), manufactured by Toyobo Co., Ltd.) and tetrahydrofuran (THF) as a solvent with a mixer for 3 hours to prepare a coating liquid. The coating liquid was applied on an aluminum-deposited polyester film (Al-PET) as an electroconductive substrate by means of the wire bar technique to form a photosensitive layer having a dry thickness of 15 μm. Thus, a photoconductor with the structure shown in FIG. 1 was produced.

EXAMPLE I-2

Metal-free o-phthalocyanine as a starting material was pulverized for 20 minutes into a fine powder with a pulverizer, a LIMMAC (Linear Induction Motor Mixing and Crushing manufactured by Fuji Electric Co., Ltd.) wherein a non-magnetic can containing the metal-free α-phthalocyanine and Teflon pieces as small acting pieces, was placed between parallel rollers of a roller mill. The sample of 1 part by weight of the fine powder thus prepared was dispersed in 50 parts by weight of DMF (N,N-dimethylformamide) as a solvent by means of an ultrasonic dispersion treatment. Thereafter, the sample was separated from DMF by filtration and dried to complete the treatment of metal-free phthalocyanine.

A solution of 100 parts by weight of the hydrazone compound No. I-2 mentioned above in 700 parts by weight of tetrahydrofuran (THF) was mixed with a solution of 100 parts by weight of polymethyl methacrylate (PMMA, manufactured by Iokyo Kasei Co., Ltd.) in 700 parts by weight of toluene to prepare a coating liquid. The coating liquid was applied on an aluminum-deposited polyester film substrate by means of the wire bar technique to form a charge transporting layer having a dry thickness of 15 μm. 50 parts by weight of metal-free phthalocyanine treated in the above-mentioned manner, 50 parts by weight of a polyester resin (Vylon 200), and 50 parts by weight of PMMA were kneaded with a mixer for 3 hours together with IHF as a solvent to prepare a coating liquid, which was then applied on the charge transporting layer by the wire bar technique to form a charge generating layer having a dry thickness of 1 μm. Thus, a photoconductor with a structure corresponding to that shown in FIG. 3 was produced.

EXAMPLE I-3

A photoconductor was produced by forming a photosensitive layer in substantially the same manner as in example I-1 except that 50 parts by weight of metal-free phthalocyanine, 100 parts by weight of the hydrazone compound No. I-3 mentioned above, 50 parts by weight of a polyester resin (Vylon 200), and 50 parts by weight of PMMA were used to replace therewith the composition of the photosensitive layer of Example I-1.

EXAMPLE I-4

A photoconductor was produced by forming a photosensitive layer in substantially the same manner as in Example I-1 except that Chlorodiane Blue which is a bisazo pigment disclosed in, for example, Japanese Patent Laid-Open No. 37,543/1972 was used instead of metal-free phthalocyanine in the Example I-3.

The electrophotographic characteristics of the four photoconductors thus produced were measured by utilizing an electrostatic recording paper testing apparatus (Kawaguchi Denki Model SP-428).

The surface potential $V_s$ (volts) of each photoconductor is an initial surface potential which was measured when the surface of the photoconductor was positively charged in the dark by corona discharge at +6.0 kV for 10 seconds. After the discontinuation of the corona discharge, the photoconductor was allowed to stand in the dark for 2 seconds, after which the surface potential $V_d$ (volts) of the photoconductor was measured. Subsequently, the surface of the photoconductor was irradiated with white light at an illuminance of 2 luxes and the time (seconds) required for the irradiation to decrease the surface potential of the photoconductor to half of the $V_d$ was measured, then, from this time and the illuminance, the half decay exposure amount $E_{\frac{1}{2}}$ (lux.sec) was calculated. Also, the surface potential of the photoconductor after 10 seconds of irradiation thereof with white light at an illuminance of 2 luxes was measured as a residual potential $V_r$ (volts). When a phthalocyanine compound was used as a charge generating substance, a high sensitivity could be expected for light with longer wavelengths. Hence, the electro-photographic characteristics thereof were also measured by using a monochromatic light with a wavelength of 780 nm. Specifically, the $V_s$ and the $V_d$ of each photoconductor were measured in the same manner as described above, and the half decay exposure amount ($\mu J/cm^2$) was found by irradiation of the photoconductor surface with a monochromatic light (wavelength: 780 nm) of 1 $\mu W$ instead of white light, while the residual potential $V_r$ (volts) was measured after 10 seconds of irradiation of the photoconductor surface with the above-mentioned light. The results of the measurements are shown in Table 1.

TABLE 1

| Example No. | White Light | | | Light with Wavelength of 780 nm | | |
|---|---|---|---|---|---|---|
| | $V_s$ (volts) | $V_r$ (volts) | $E_{\frac{1}{2}}$ (lux·sec) | $V_s$ (volts) | $V_r$ (volts) | $E_{\frac{1}{2}}$ ($\mu J/cm^2$) |
| I-1 | 660 | 60 | 6.3 | 620 | 50 | 6.0 |
| I-2 | 620 | 60 | 6.5 | 600 | 70 | 6.2 |
| I-3 | 640 | 50 | 7.0 | 650 | 80 | 6.9 |
| I-4 | 690 | 90 | 6.2 | — | — | — |

As can be seen in Table 1, the photoconductors of Examples I-1, I-2, I-3 and I-4 were not substantially different therebetween in the half decay exposure amounts and the residual potentials, and showed good surface potential characteristics. The photoconductors of Examples I-1, I-2 and I-3, using a phthalocyanine compound as the charge generating substance, showed also excellent electrophotographic characteristics for light with a long wavelength of 780 nm and providing that they can be satisfactorily used in semiconductor laser printers.

EXAMPLE I-5

Selenium was deposited on an aluminum plate having a thickness of 500 $\mu m$ by means of vacuum evaporation to form a charge generating layer having a thickness of 1.5 $\mu m$. A solution of 100 parts by weight of the hydrazone compound No. I-4 as mentioned above in 700 parts by weight of tetrahydrofuran (THF) was mixed with a solution of 100 parts by weight of polymethyl methacrylate (PMMA) in 700 parts by weight of toluene to prepare a coating liquid, which was then applied on the charge generating layer by the wire bar technique to form a charge transporting layer having a dry thickness of 20 $\mu m$. Thus, a photoconductor with the structure shown in FIG. 2 was produced. This photoconductor was charged by corona discharge at −6.0 kV for 0.2 second and examined with respect to electrophotographic characteristics. Good results were obtained namely $V_s = -610$ V, $V_r = -50$ V and $E_{\frac{1}{2}} = 5.8$ lux.sec.

EXAMPLE I-6

50 parts by weight of metal-free phthalocyanine treated in the same manner as in Example I-1, 50 parts by weight of a polyester resin (Vylon 200), and 50 parts by weight of PMMA were kneaded together with THF as a solvent with a mixer for 3 hours to prepare a coating liquid, which was then applied on an aluminum support to form a charge generating layer having a thickness of about 1 $\mu m$. Subsequently, 100 parts by weight of the hydrazone compound No. I-5 as mentioned above, 100 parts by weight of a polycarbonate resin (Panlite L-1250, manufactured by Ieijin Kasei Co., Ltd.), and 0.1 part by weight of a silicone oil were mixed with 700 parts by weight of THF and 700 parts by weight of toluene to prepare a coating liquid, which was then applied on the charge generating layer to form a charge transporting layer having a thickness of about 15 $\mu m$.

The photoconductor thus produced was charged by corona discharge at −6.0 kV for 0.2 second and examined with respect to electrophotographic characteristics in the same manner as in Example I-5 to obtain good results, namely $V_s = -620$ V and $E_{\frac{1}{2}} = 6.2$ lux sec.

EXAMPLE I-7

Photosensitive members were produced by forming respective photosensitive layers in substantially the same manner as in Example I-4 except the that compound Nos. I-6 to I-30 were respectively used instead of compound No. I-4. The results obtained by using the electrostatic recording paper testing apparatus (SP-428) are shown in Table 2. Table 2 shows the half decay exposure amounts $E_{\frac{1}{2}}$ (lux.sec) obtained under the experimental conditions wherein the photoconductors were positively charged in the dark by corona discharge at +6.0 kV for 10 seconds and irradiated with white light at an illuminance of 2 luxes.

TABLE 2

| Compound No. | $E_{\frac{1}{2}}$ (lux · sec) |
|---|---|
| I-6 | 6.5 |
| I-7 | 5.8 |
| I-8 | 7.8 |
| I-9 | 5.1 |
| I-10 | 6.9 |
| I-11 | 6.8 |
| I-12 | 8.3 |
| I-13 | 5.1 |
| I-14 | 5.9 |
| I-15 | 6.2 |
| I-16 | 5.8 |
| I-17 | 6.5 |
| I-18 | 5.9 |
| I-19 | 7.1 |
| I-20 | 6.4 |
| I-21 | 4.9 |
| I-22 | 5.9 |
| I-23 | 6.2 |
| I-24 | 6.6 |
| I-25 | 5.4 |

TABLE 2-continued

| Compound No. | $E_{\frac{1}{2}}$ (lux · sec) |
|---|---|
| I-26 | 6.6 |
| I-27 | 5.7 |
| I-28 | 6.3 |
| I-29 | 5.5 |
| I-30 | 6.9 |

As can be seen in Table 2, the photoconductors using the respective hydrazone compounds Nos. I-6 to I-30 as a charge transporting substance were satisfactory with respect to the half decay exposure amount $E_{\frac{1}{2}}$.

The second group of hydrazone compounds to be used in the present invention is represented by the following general formula (II).

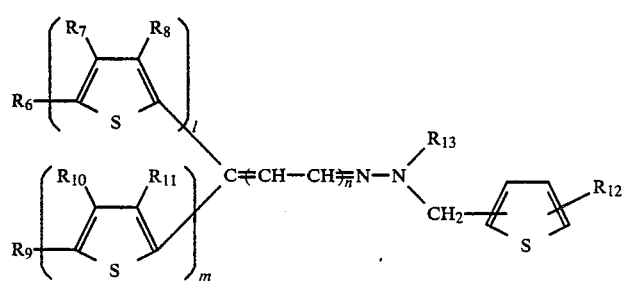

(II)

Wherein, each of $R_6$ to $R_{12}$ stands for a hydrogen atom, a halogen atom, an alkyl group, a hydroxy group, an alkoxy group, a nitro group, an acyl group, or an aryl group or an amino group both of which may have a substituent(s); $R_{13}$ stands for an aryl group which may have a substituent(s); each of l and m stands for an integer of 1, 2 or 3; and n stands for an integer of 0 or 1.

These compounds are synthesized by dehydration-condensating an aldehyde compound of the formula

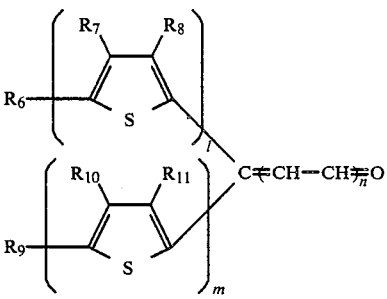

with a hydrazine compound of the formula

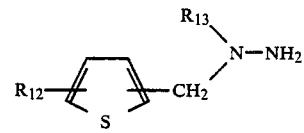

in an appropriate organic solvent such as ethanol in the presence of a small amount of a catalyst such as an acid.

Specific examples of hydrazone compounds of the general formula (II) prepared in the above-mentioned manner include:

Compound No. II-1

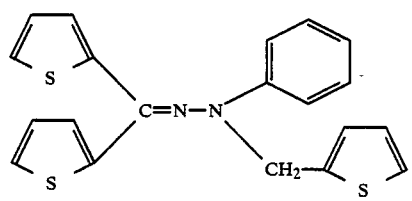

Compound No. II-2

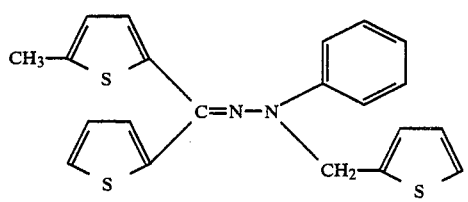

Compound No. II-3

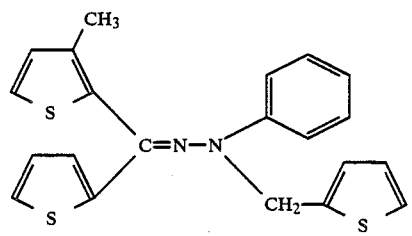

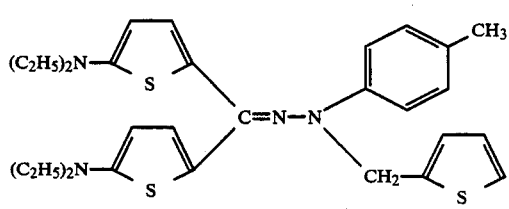
Compound No. II-4
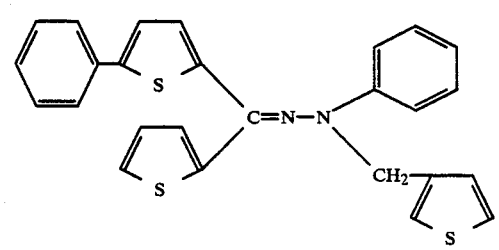
Compound No. II-5
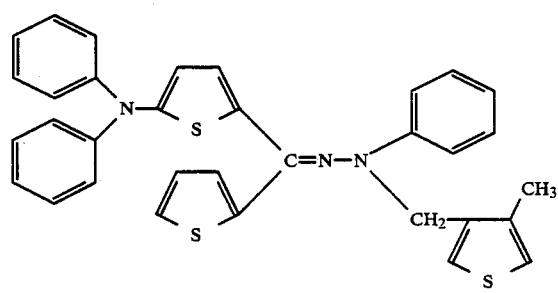
Compound No. II-6
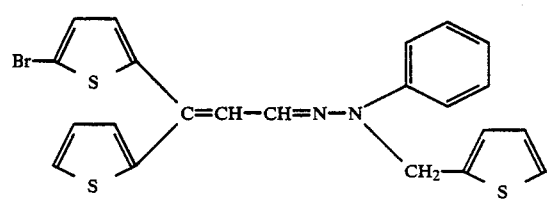
Compound No. II-7
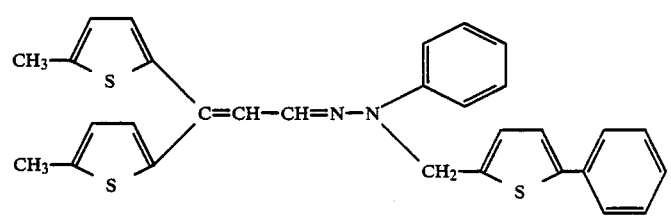
Compound No. II-8
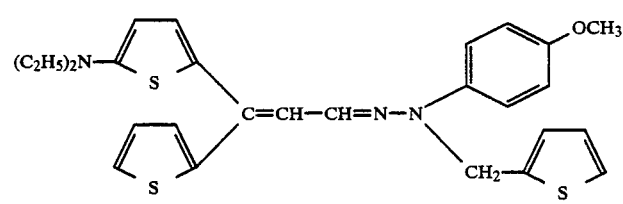
Compound No. II-9
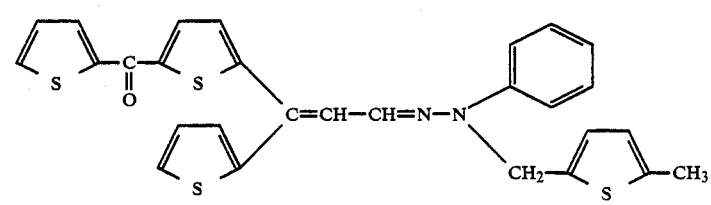
Compound No. II-10

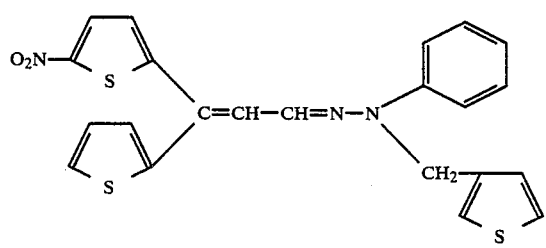
Compound No. II-11
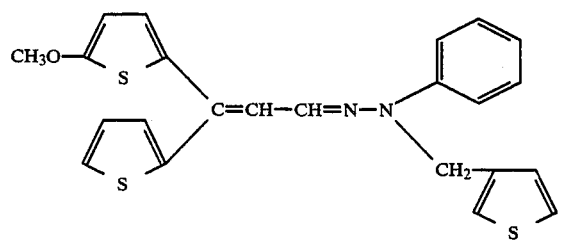
Compound No. II-12
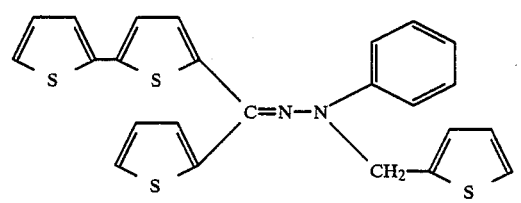
Compound No. II-13
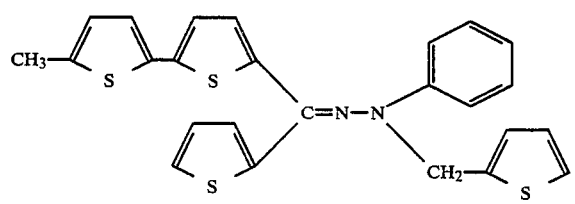
Compound No. II-14
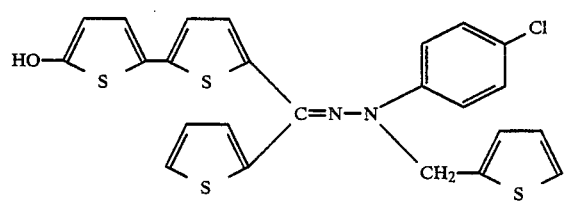
Compound No. II-15
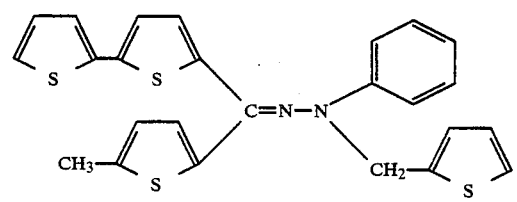
Compound No. II-16
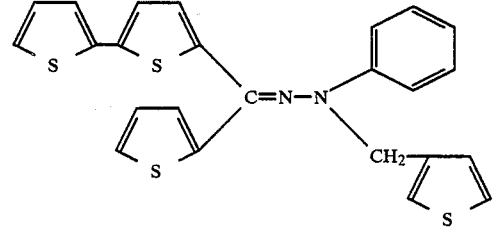
Compound No. II-17

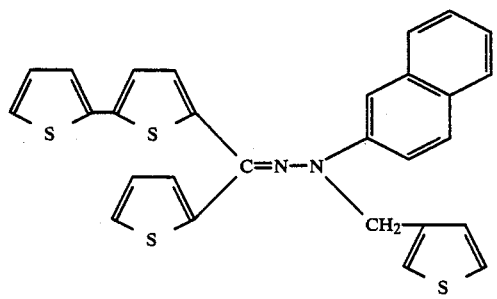
Compound No. II-18
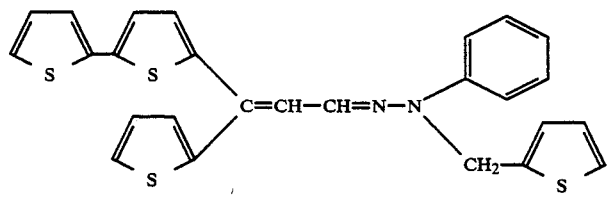
Compound No. II-19
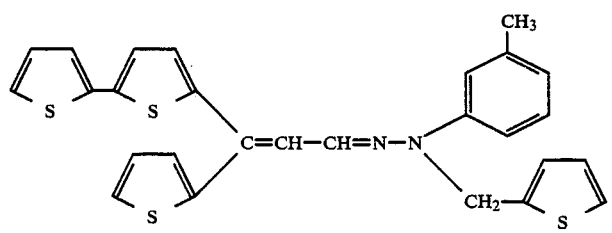
Compound No. II-20
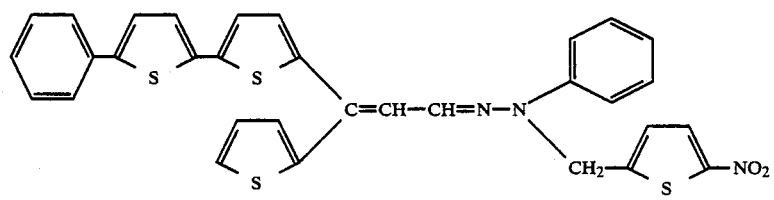
Compound No. II-21
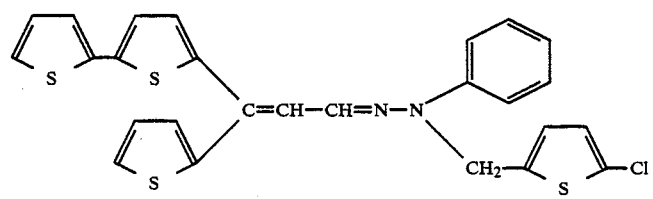
Compound No. II-22
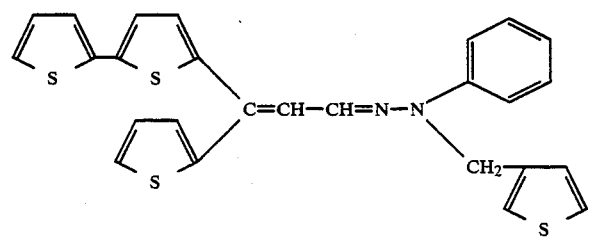
Compound No. II-23
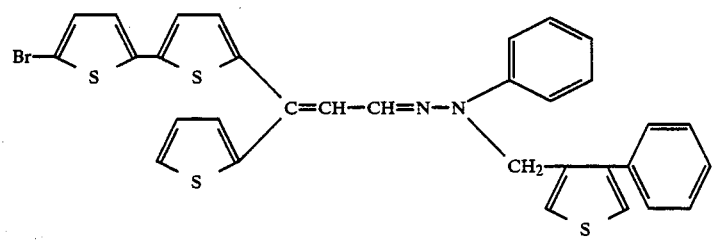
Compound No. II-24

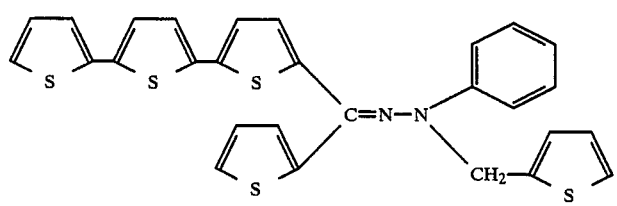
Compound No. II-25
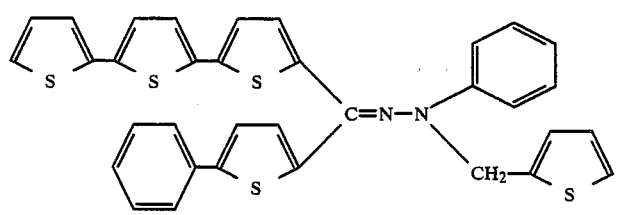
Compound No. II-26
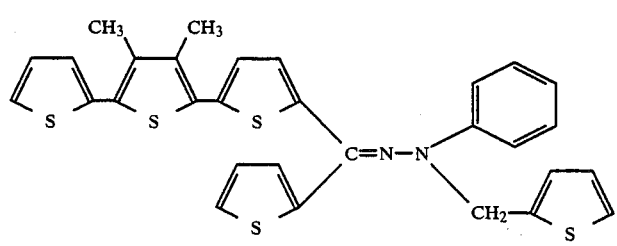
Compound No. II-27
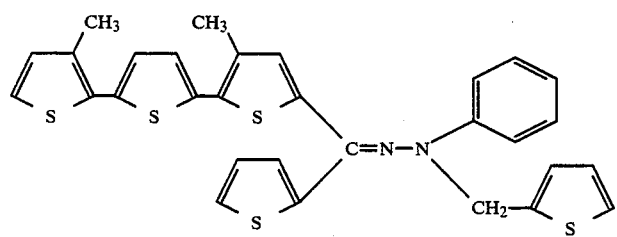
Compound No. II-28
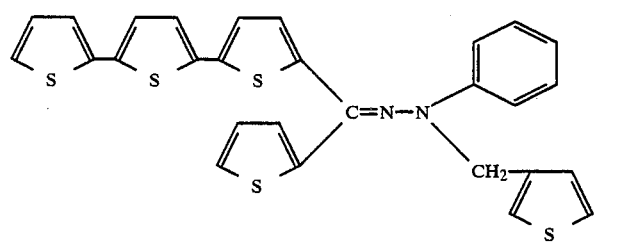
Compound No. II-29
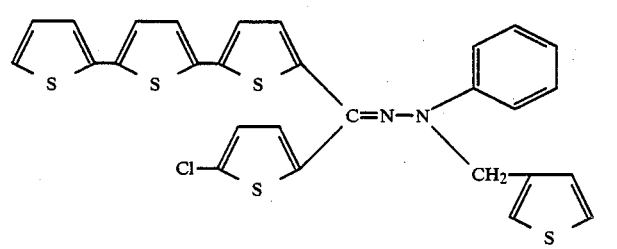
Compound No. II-30
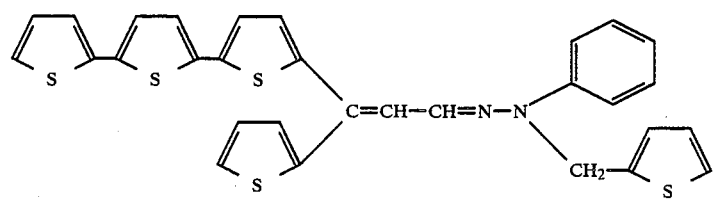
Compound No. II-31

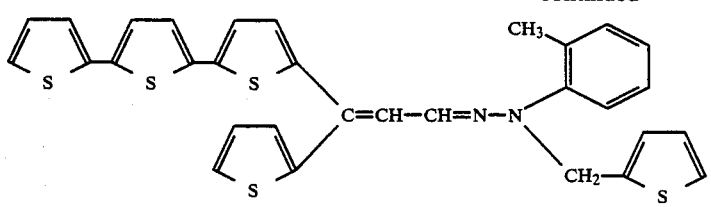
Compound No. II-32
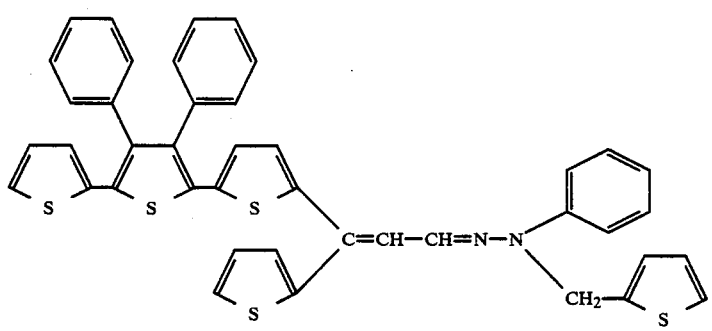
Compound No. II-33
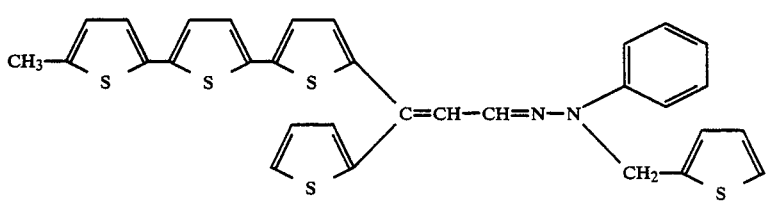
Compound No. II-34
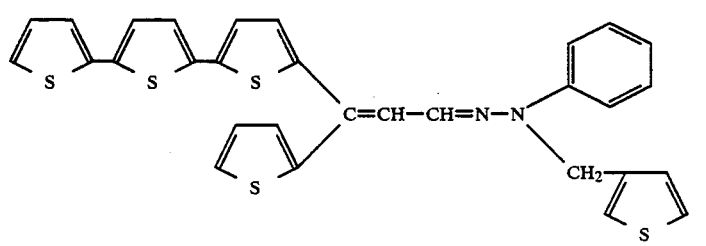
Compound No. II-35
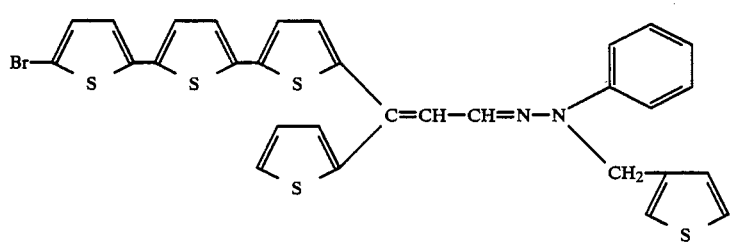
Compound No. II-36
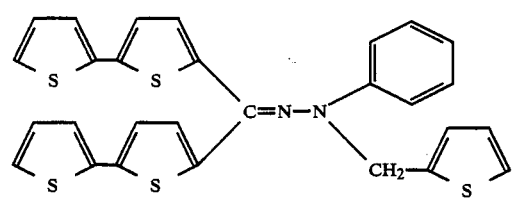
Compound No. II-37
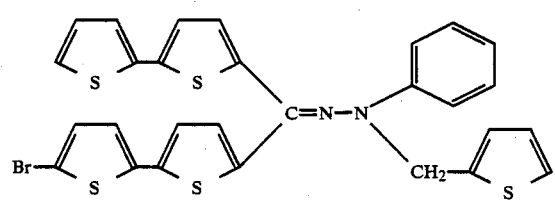
Compound No. II-38

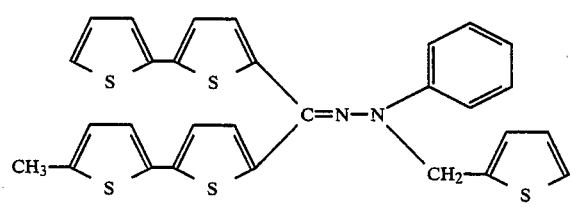
Compound No. II-39
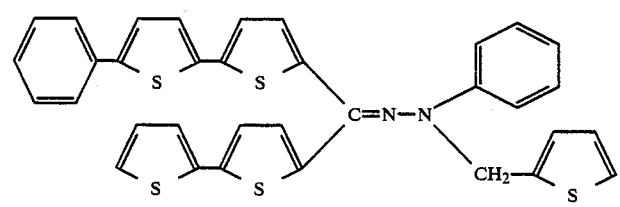
Compound No. II-40
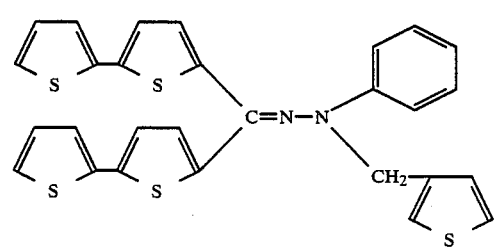
Compound No. II-41
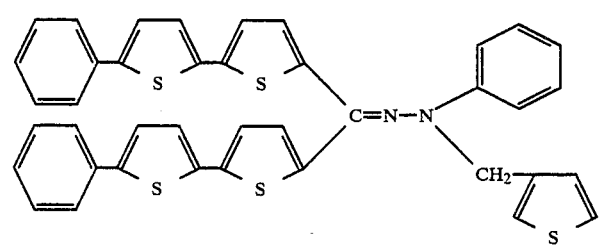
Compound No. II-42
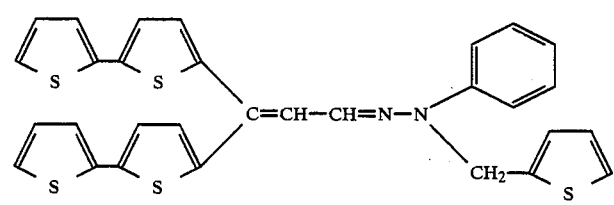
Compound No. II-43
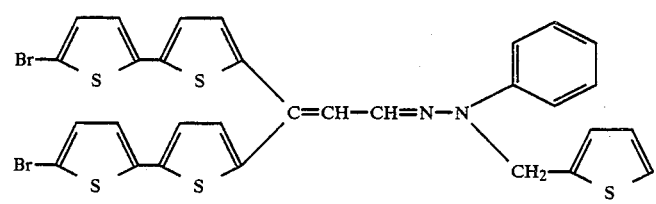
Compound No. II-44
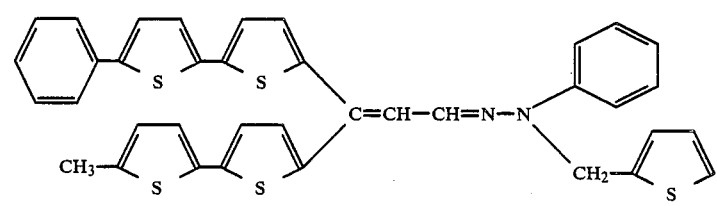
Compound No. II-45

-continued
Compound No. II-46
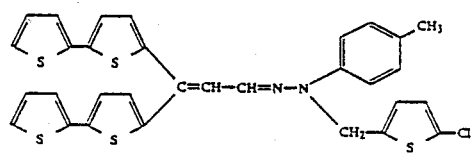
Compound No. II-51
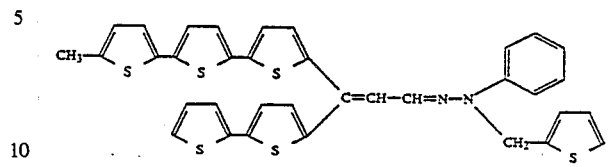
Compound No. II-47
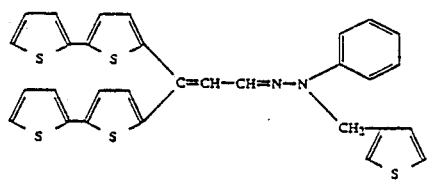
Compound No. II-52
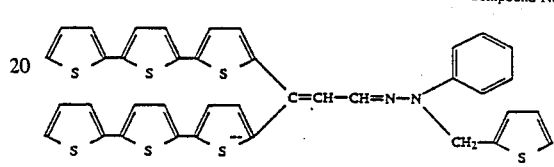
Compound No. II-48
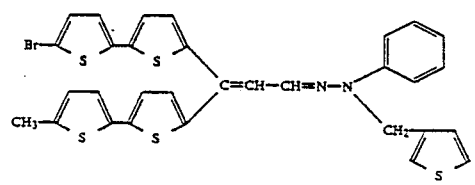
Compound No. II-53
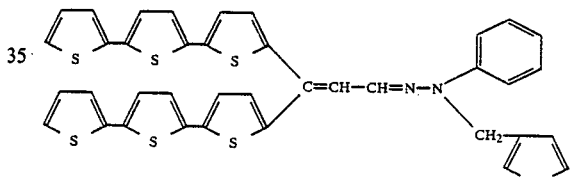
Compound No. II-49
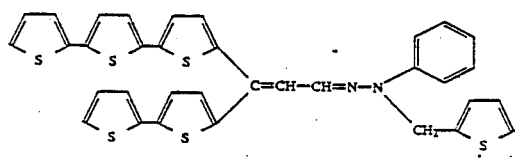
Compound No. II-54
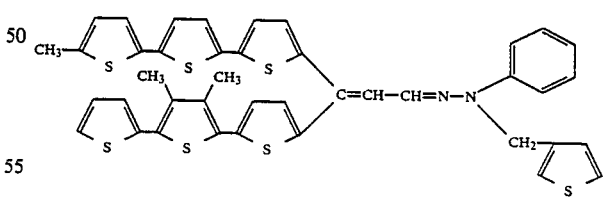
Compound No. II-50
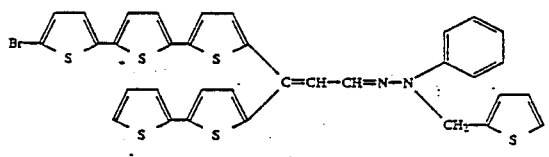
Compound No. II-55
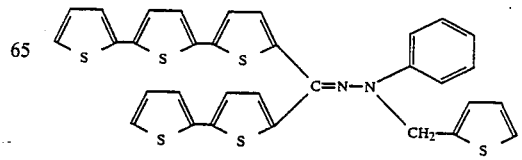

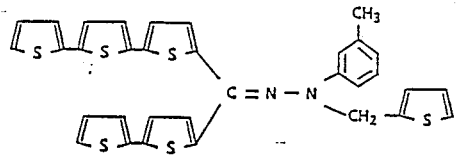

Compound No. II-56

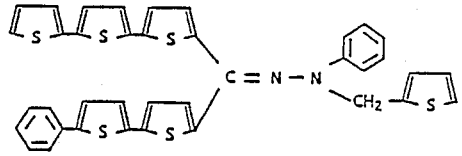

Compound No. II-57

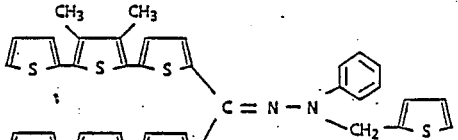

Compound No. II-58

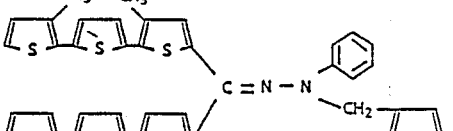

Compound No. II-59

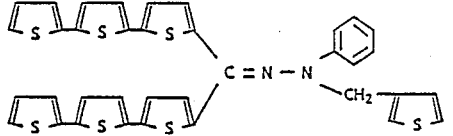

Compound No. II-60

Examples will now be given, wherein various compounds represented by the general formula (II) were respectively used to produce photoconductors.

EXAMPLE II-1

A photoconductor having the structure shown in FIG. 1 and comprising a photosensitive layer having a thickness of 15 μm was produced in substantially the same manner as in Example I-1 except that the hydrazone compound No. II-1 mentioned above was used instead of the compound No. I-1.

EXAMPLE II-2

A photoconductor having a structure corresponding to that of FIG. 3 was produced in substantially the same manner as in Example I-2 except that the hydrazone compound No. II-2 was used instead of the compound No. I-2. The thickness of the charge transporting layer of the member was 15 μm, while the thickness of the charge generating layer was 1 μm.

EXAMPLE II-3

A photoconductor was produced by forming a photosensitive layer in substantially the same manner as in Example II-1 except that 50 parts by weight of metal-free phthalocyanine, 100 parts by weight of the hydrazone compound No. II-1 mentioned above, 50 parts by weight of a polyester resin (Vylon 200), and 50 parts by weight of PMMA were used to replace therewith the composition of the photosensitive layer of Example II-1.

EXAMPLE II-4

A photoconductor was produced by forming a photosensitive layer in substantially the same manner as in Example II-1 except that Chlorcdiane Blue was used instead of metal-free phthalocyanine in the Example II-3.

The four photoconductors thus produced were examined with respect to surface potential $V_s$, residual potential $V_r$, and half decay exposure amount $E_{\frac{1}{2}}$ by using white light as well as a monochromatic light (wavelength: 780 nm) in the same manner as in Examples I-1 to I-4. The results of the measurements are shown in Table 3.

TABLE 3

| Example No. | White Light | | | Light with Wavelength of 780 nm | | |
|---|---|---|---|---|---|---|
| | $V_s$ (volts) | $V_r$ (volts) | $E_{\frac{1}{2}}$ (lux · sec) | $V_s$ (volts) | $V_r$ (volts) | $E_{\frac{1}{2}}$ (μJ/ cm$^2$) |
| II-1 | 630 | 80 | 5.3 | 600 | 70 | 5.1 |
| II-2 | 660 | 90 | 4.6 | 640 | 60 | 4.8 |
| II-3 | 610 | 40 | 5.9 | 610 | 60 | 5.9 |
| II-4 | 680 | 60 | 6.2 | — | — | — |

As can be seen in Table 3, the photoconductors of Examples II-1, II-2, II-3 and II-4 were not substantially different therebetween in the half decay exposure amount and the residual potential, and showed good surface potential characteristics. The photoconductors of Examples II-1, II-2 and II-3, using a phthalocyanine compound as a charge generating substance, showed also excellent electrophotographic characteristics for light with a long wavelength of 780 nm, and providing that they can be satisfactorily used in semiconductor laser printers.

EXAMPLE II-5

A photoconductor with the structure shown in FIG. 2 was produced by forming a charge generating layer and a charge transporting layer having a dry thickness of 20 μm in the same manner as in Example I-5 except that the hydrazone compound NO. II-4 was used instead of the compound No. I-4. After this photoconductor was charged by corona discharge at −6.0 kV for 0.2 second, the electrophotographic characteristics of the member were measured to obtain good results, namely $V_s = -630V$, $V_r = -50V$, and $E_{\frac{1}{2}} = 5.3$ lux.sec.

EXAMPLE II-6

A charge generating layer with a thickness of about 1 μm was formed on an aluminum support in the same manner as in Example I-6. A charge transporting layer with a thickness of about 15 μm was formed on the charge generating layer in substantially the same manner as in Example I-6 except that the hydrazone compound No. II-5 was used instead of the compound No. I-5.

The photoconductor thus obtained was charged by corona discharge at $-6.0$ kV for 0.2 second and examined with respect to electrophotographic characteristics in the same manner as in Example II-5 to obtain good results, namely $V_s = -660V$ and $E_{\frac{1}{2}} = 4.9$ lux.sec.

EXAMPLE II-7

Photoconductors were produced by forming respective photosensitive layers in substantially the same manner as in Example II-4 except that the compounds Nos. II-6 to II-60 were respectively used instead of the compound No. II-4. The results obtained by using the electrostatic recording paper testing apparatus Model SP-428 are shown in Table 4. Table 4 shows the half decay exposure amounts $E_{\frac{1}{2}}$ (lux.sec) obtained under the experimental conditions where the photoconductors were positively charged in the dark by corona discharge at $+6.0$ kV for 10 seconds and irradiated with white light at an illuminance of 2 luxes.

TABLE 4

| Compound No. | $E_{\frac{1}{2}}$ (lux · sec) |
| --- | --- |
| II-6 | 5.8 |
| II-7 | 6.2 |
| II-8 | 7.8 |
| II-9 | 7.2 |
| II-10 | 5.8 |
| II-11 | 7.6 |
| II-12 | 6.1 |
| II-13 | 5.0 |
| II-14 | 5.8 |
| II-15 | 4.9 |
| II-16 | 8.1 |
| II-17 | 7.4 |
| II-18 | 6.9 |
| II-19 | 5.8 |
| II-20 | 6.2 |
| II-21 | 6.9 |
| II-22 | 5.6 |
| II-23 | 4.9 |
| II-24 | 5.3 |
| II-25 | 6.9 |
| II-26 | 7.1 |
| II-27 | 5.6 |
| II-28 | 5.6 |
| II-29 | 7.7 |
| II-30 | 5.5 |
| II-31 | 6.6 |
| II-32 | 6.6 |

TABLE 4-continued

| Compound No. | $E_{\frac{1}{2}}$ (lux · sec) |
| --- | --- |
| II-33 | 4.9 |
| II-34 | 7.1 |
| II-35 | 5.8 |
| II-36 | 7.8 |
| II-37 | 6.9 |
| II-38 | 5.2 |
| II-39 | 5.8 |
| II-40 | 4.4 |
| II-41 | 8.1 |
| II-42 | 6.9 |
| II-43 | 4.6 |
| II-44 | 5.4 |
| II-45 | 5.5 |
| II-46 | 7.9 |
| II-47 | 8.7 |
| II-48 | 6.2 |
| II-49 | 5.8 |
| II-50 | 6.6 |
| II-51 | 5.4 |
| II-52 | 4.9 |
| II-53 | 7.9 |
| II-54 | 6.9 |
| II-55 | 5.6 |
| II-56 | 6.8 |
| II-57 | 5.3 |
| II-58 | 4.5 |
| II-59 | 7.0 |
| II-60 | 6.0 |

As can be seen in Table 4, the photoconductors using the respective hydrazone compounds Nos. II-6 to II-60 as a charge transporting substance were satisfactory with respect to the half decay exposure amount $E_{\frac{1}{2}}$.

The third group of hydrazone compounds or derivatives to be used in the present invention is represented by the following general formula (III).

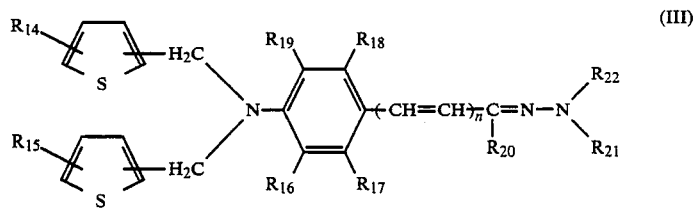

(III)

Wherein, each of $R_{14}$ to $R_{20}$ stands for a hydrogen atom, a halogen atom, an alkyl group, an alkoxy group, an allyl group, an aralkyl, group or an aryl group, which aryl group may have a substituent(s); each of $R_{21}$ and $R_{22}$ stands for an alkyl group, an allyl group, an aralkyl group or an aryl group, which aryl group may have a substituent(s); and n stands for an integer of 0 or 1.

These compounds are synthesized by dehydration-condensating an aldehyde compound or a keton compound of the formula

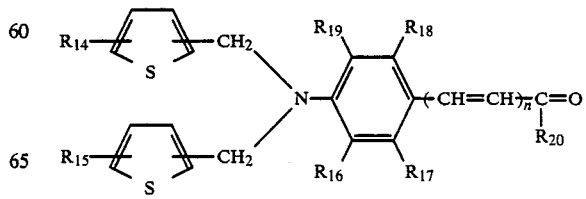

with a hydrazine compound of the formula

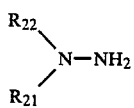
in an appropriate organic solvent such as ethanol in the presence of a small amount of a catalyst such as an acid.
Specific examples of the hydrazone compounds of the general formula (III) prepared in the above-mentioned manner include:
Compound No. III-1
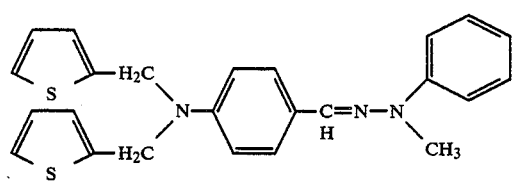
Compound No. III-2
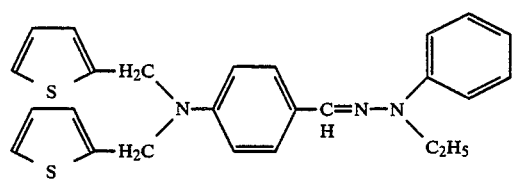
Compound No. III-3
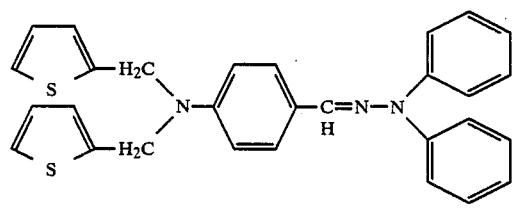
Compound No. III-4
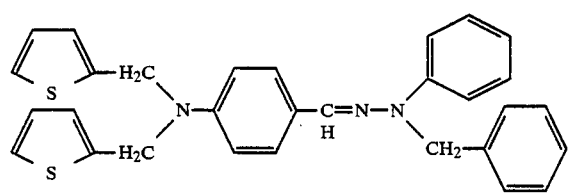
Compound No. III-5
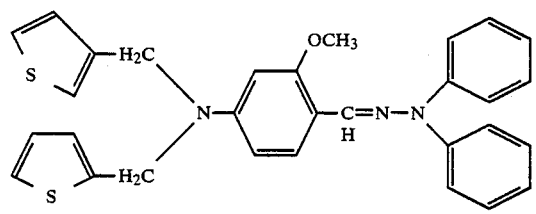
Compound No. III-6
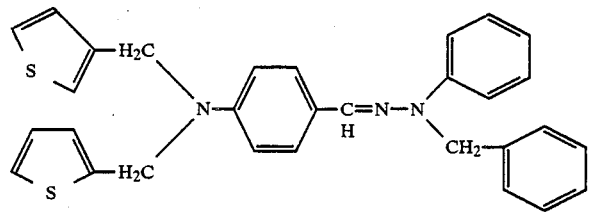
Compound No. III-7
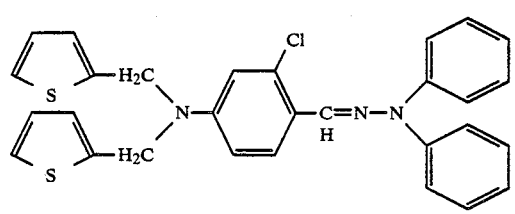

-continued
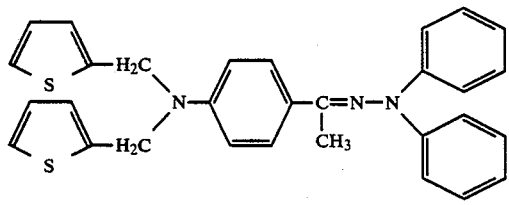
Compound No. III-8
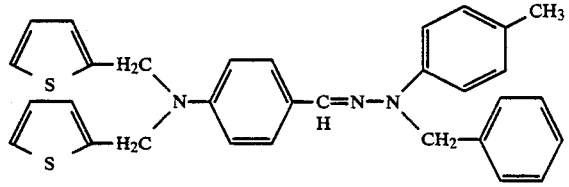
Compound No. III-9
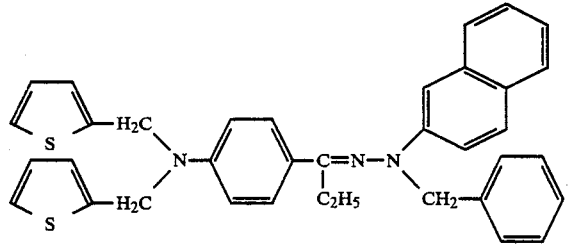
Compound No. III-10
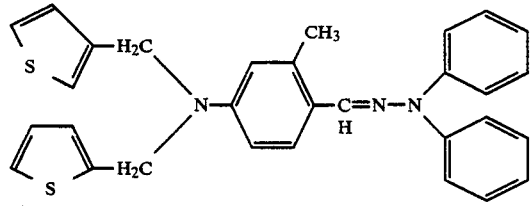
Compound No. III-11
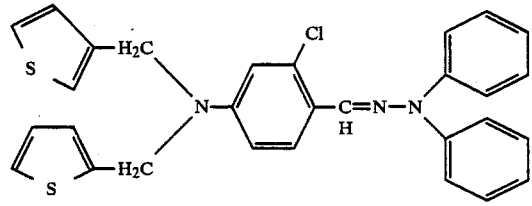
Compound No. III-12
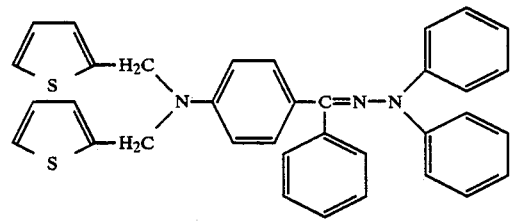
Compound No. III-13
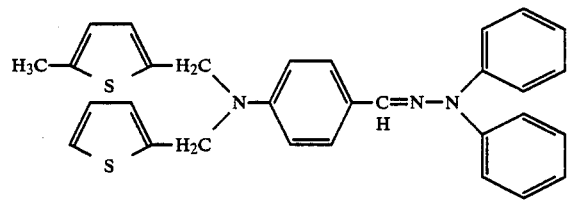
Compound No. III-14

-continued
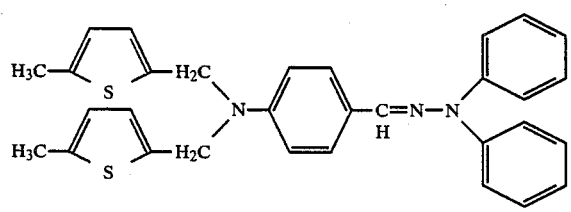
Compound No. III-15
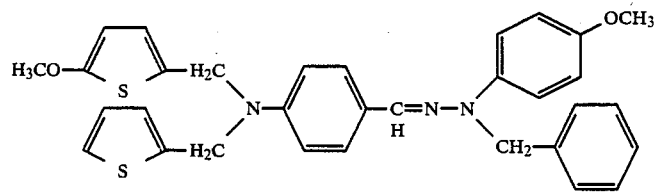
Compound No. III-16
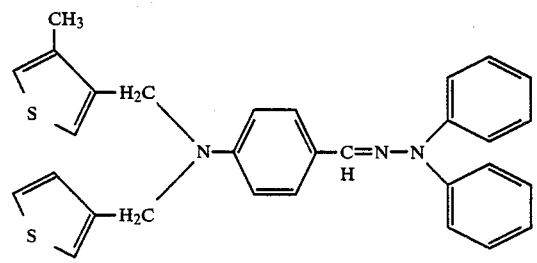
Compound No. III-17
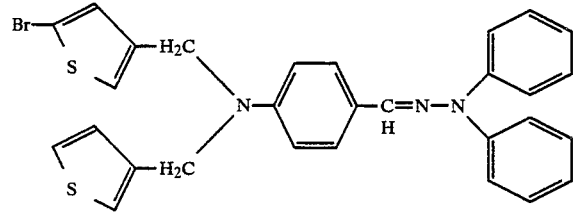
Compound No. III-18
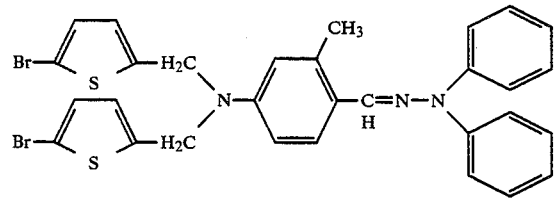
Compound No. III-19
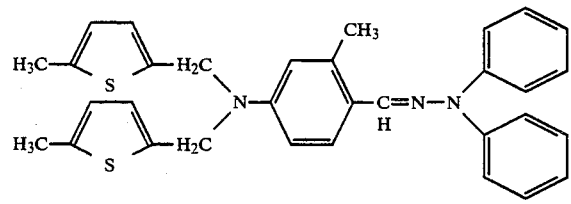
Compound No. III-20
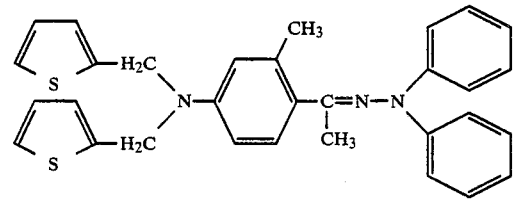
Compound No. III-21

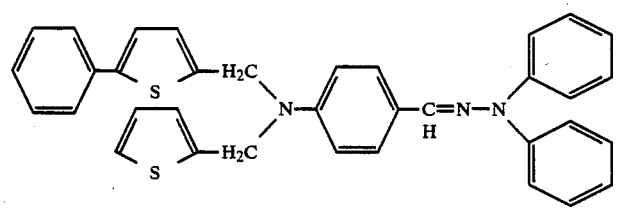
Compound No. III-22
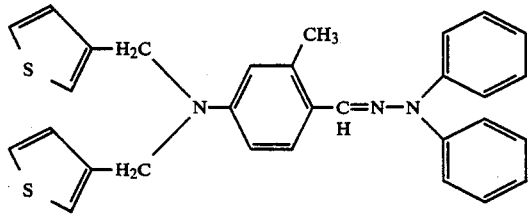
Compound No. III-23
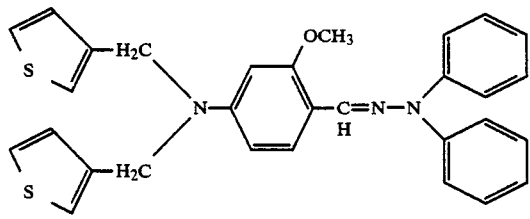
Compound No. III-24
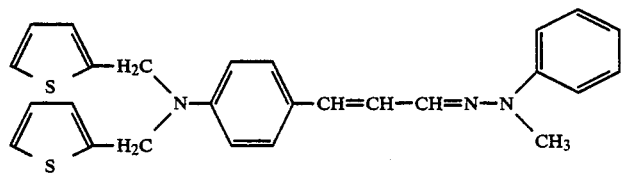
Compound No. III-25
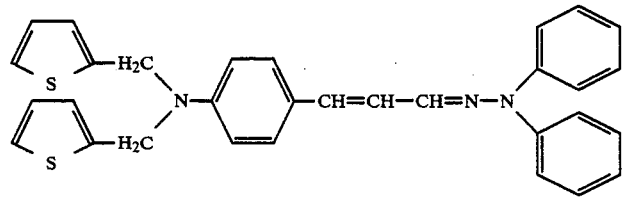
Compound No. III-26
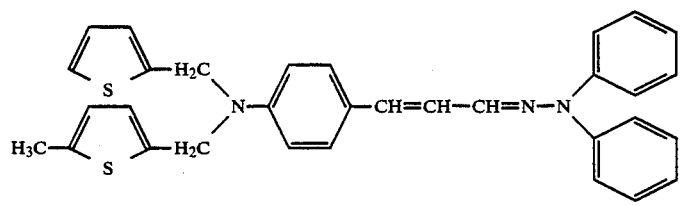
Compound No. III-27
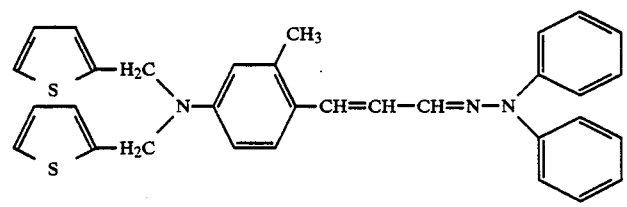
Compound No. III-28

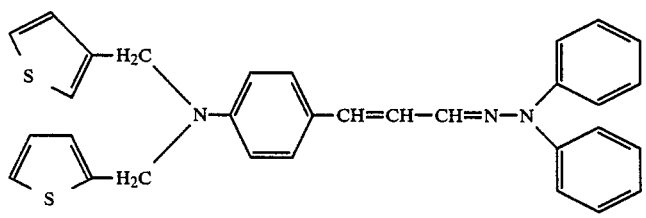

Compound No. III-29

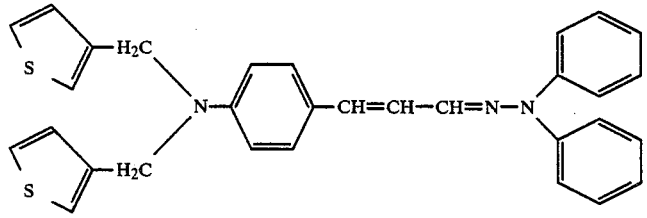

Compound No. III-30

Examples of the photoconductor, in which a chemical compound included in the compound represented by the general formula (III) is used as a charge transporting substance, will be explained.

EXAMPLE III-1

A photoconductor having the structure shown in FIG. 1 and comprising a photosensitive layer having a thickness of 15 μm was produced in substantially the same manner as in Example I-1 except that the hydrazone derivative No. III-1 as mentioned above was used instead of the compound No. I-1.

EXAMPLE III-2

A photoconductor having a structure corresponding to that of FIG. 3 was produced in substantially the same manner as in Example I-2 except that the hydrazone derivative No. III-2 was used instead of the compound No. I-2. The thickness of the charge transporting layer of the member was 15 μm, while the thickness of the charge generating layer was 1 μm.

EXAMPLE II I-3

A photoconductor was produced by forming a photosensitive layer in substantially the same manner as in Example III-1 except that 50 parts by weight of metal-free phthalocyanine, 100 parts by weight of the hydrazone derivative No. III-3 as mentioned above, 50 parts by weight of a polyester resin, and 50 parts by weight of PMMA were used to replace therewith the composition of the photosensitive layer of Example III-1.

EXAMPLE II I-4

A photoconductor was produced by forming a photosensitive layer in substantially the same manner as in Example III-3 except that Chlorodiane Blue was used instead of metal-free phthalocyanine in the Example III-1.

The four photoconductors thus produced were examined with respect to surface potential $V_s$, residual potential $V_r$, and half decay exposure amount $E_{\frac{1}{2}}$ by using white light as well as a monochromatic light (wavelength: 780 nm) in the same manner as in Examples I-1 to I-4. The results of the measurements are shown in Table 5.

TABLE 5

| Example No. | White Light | | | Light with Wavelength of 780 nm | | |
|---|---|---|---|---|---|---|
| | $V_s$ (volts) | $V_r$ (volts) | $E_{\frac{1}{2}}$ (lux · sec) | $V_s$ (volts) | $V_r$ (volts) | $E_{\frac{1}{2}}$ (μJ/ cm$^2$) |
| III-1 | 600 | 90 | 5.1 | 580 | 70 | 4.7 |
| III-2 | 590 | 100 | 5.9 | 570 | 110 | 5.5 |
| III-3 | 540 | 80 | 5.6 | 560 | 80 | 5.1 |
| III-4 | 580 | 80 | 5.9 | — | — | — |

As can be seen in Table 5, the photoconductors of Examples III-1, III-2, III-3 and III-4 were not substantially different therebetween in the half decay exposure amount and the residual potential.

EXAMPLE II I-5

A photoconductor with the structure shown in FIG. 2 was produced by forming a charge generating layer and a charge transporting layer having a dry thickness of 20 μm in substantially the same manner as in Example I-5 except that the hydrazone derivative No. III-4 was used instead of the compound No. I-4. After this photoconductor was charged by corona discharge at −6.0 and for 0.2 second, the electrophotographic characteristics of the member were measured. Good results were obtained, namely $V_s = -640V$, $V_r = -40V$, and $E_{\frac{1}{2}} = 4.4$ lux.sec.

EXAMPLE II I-6

A charge generating layer having a thickness of about 1 μm was formed on an aluminum support in the same manner as in Example I-6. A charge transporting layer having a thickness of about 15 μm was formed on the charge generating layer in substantially the same manner as in Example I-6 except that the hydrazone derivative No. III-5 was used instead of the compound No. I-5.

The photoconductor thus obtained was charged by corona discharge at −6.0 kV for 0.2 second and examined with respect to electrophotographic characteristics in the same manner as in Example III-4. Good results were obtained, namely $V_s = -630V$ and $E_{\frac{1}{2}} = 4.8$ lux.-sec.

EXAMPLE III-7

Photosensitive members were produced by forming respective photosensitive layers in substantially the same manner as in Example III-4 except that the compounds Nos. III-6 to III-30 were respectively used instead of the compound No. III-4. The results obtained by using the electrostatic recording paper testing apparatus Model SP-428 are shown in Table 6. Table 6 shows the half decay exposure amounts $E_{\frac{1}{2}}$ (lux.sec) obtained under the experimental conditions where the photoconductors were positively charged in the dark by corona discharge at +60 kV for 10 seconds and irradiated with white light at an illuminance of 2 luxes. Good results are obtained with respect to the half decay exposure amount.

TABLE 6

| Compound No. | $E_{\frac{1}{2}}$ (lux · sec) |
|---|---|
| III-6 | 5.4 |
| III-7 | 5.1 |
| III-8 | 6.2 |
| III-9 | 6.4 |
| III-10 | 5.6 |
| III-11 | 6.3 |
| III-12 | 4.9 |
| III-13 | 6.1 |
| III-14 | 6.7 |
| III-15 | 6.2 |
| III-16 | 5.8 |
| III-17 | 5.2 |
| III-18 | 5.9 |
| III-19 | 5.6 |
| III-20 | 6.1 |
| III-21 | 5.7 |
| III-22 | 5.5 |
| III-23 | 6.0 |
| III-24 | 5.9 |
| III-25 | 6.2 |
| III-26 | 6.6 |

TABLE 6-continued

| Compound No. | $E_{\frac{1}{2}}$ (lux · sec) |
|---|---|
| III-27 | 5.5 |
| III-28 | 6.4 |
| III-29 | 5.6 |
| III-30 | 6.4 |

The fourth group of hydrazone compounds or derivatives to be used in the present invention is represented by the following general formula (IV).

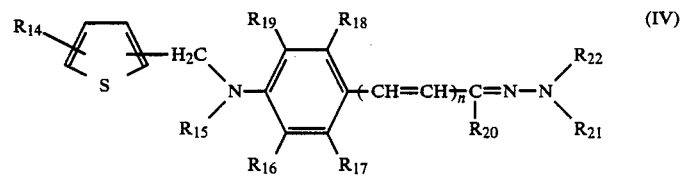

(IV)

Wherein, each of $R_{14}$ to $R_{22}$ and n are the same as those in the general formula (III) described before.

These compounds are synthesized by dehydration-condensating an aldehyde compound or a ketone compound of the formula

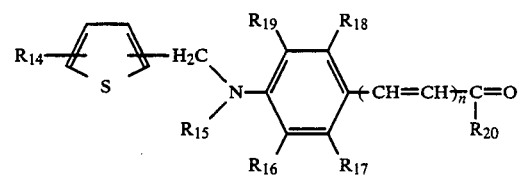

with a hydrazine compound of the formula

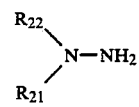

in an appropriate organic solvent such as ethanol in the presence of a small amount of a catalyst such as an acid.

Specific examples of the hydrazone compounds of the general formula (IV) prepared in the above-mentioned manner include:

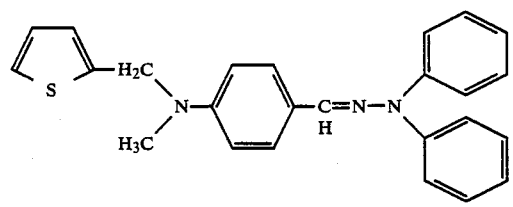

Compound No. IV-1

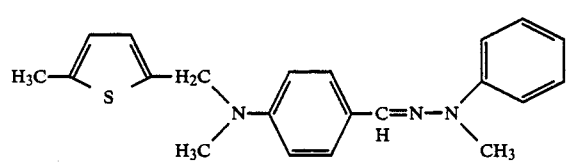

Compound No. IV-2

-continued
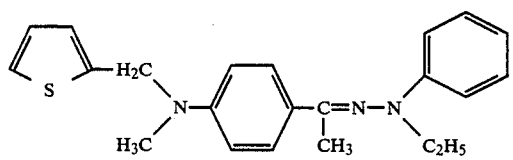
Compound No. IV-3
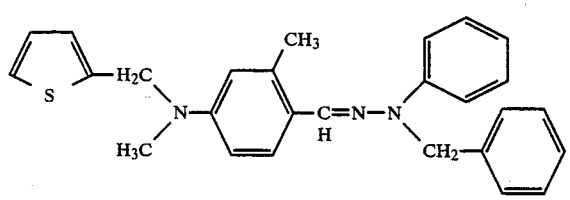
Compound No. IV-4
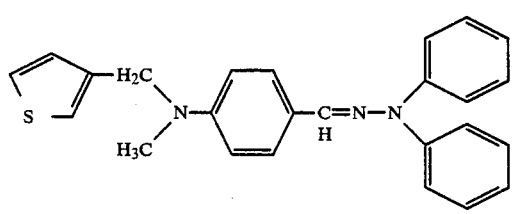
Compound No. IV-5
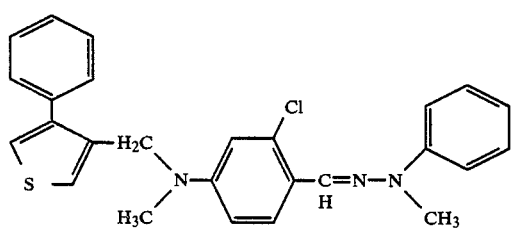
Compound No. IV-6
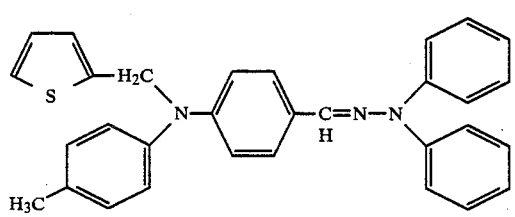
Compound No. IV-7
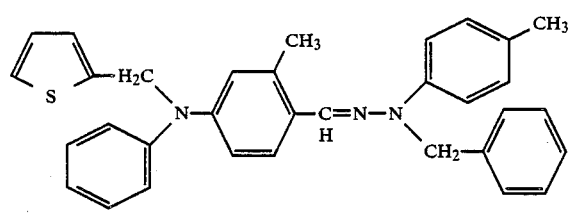
Compound No. IV-8
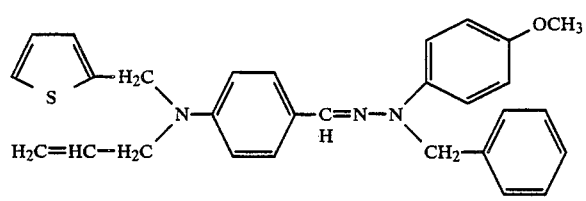
Compound No. IV-9
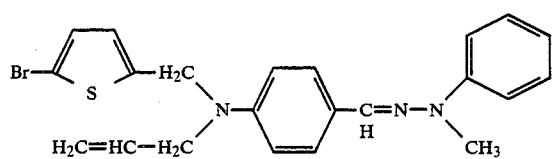
Compound No. IV-10

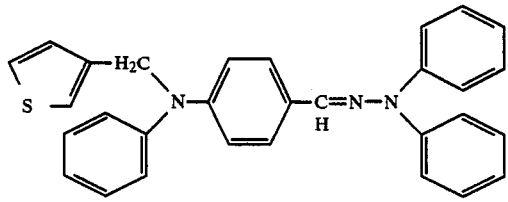
Compound No. IV-11
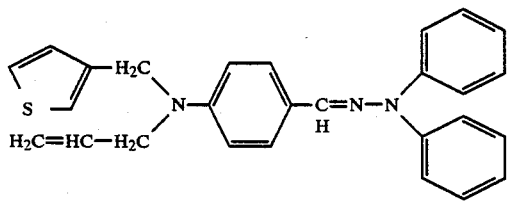
Compound No. IV-12
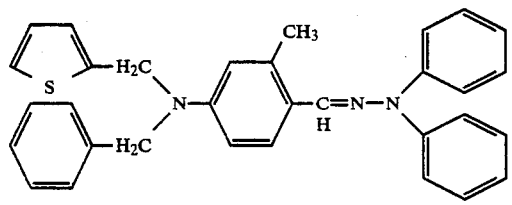
Compound No. IV-13
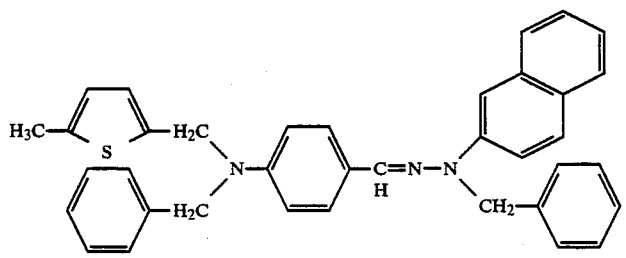
Compound No. IV-14
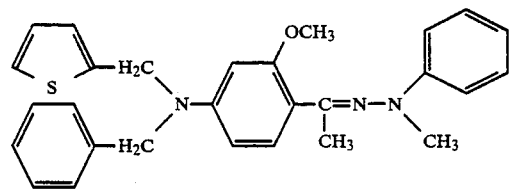
Compound No. IV-15
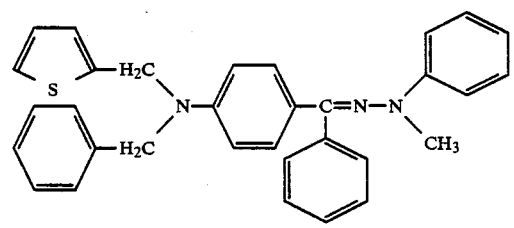
Compound No. IV-16
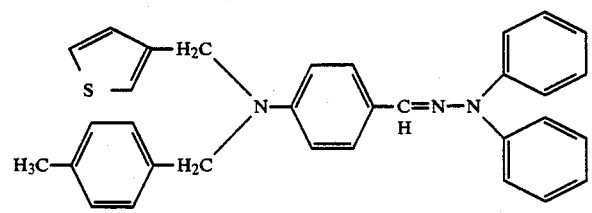
Compound No. IV-17

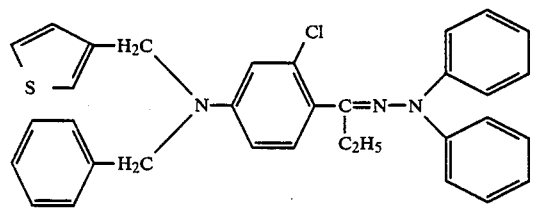
Compound No. IV-18
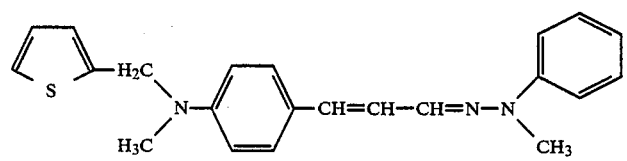
Compound No. IV-19
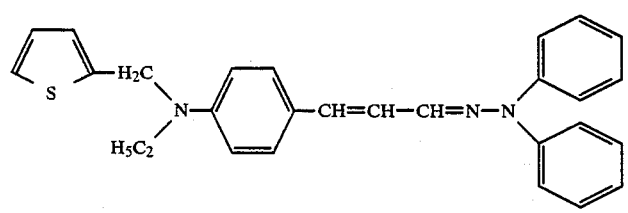
Compound No. IV-20
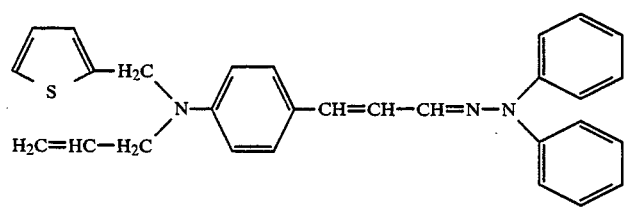
Compound No. IV-21
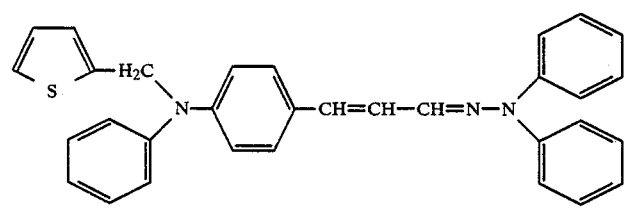
Compound No. IV-22
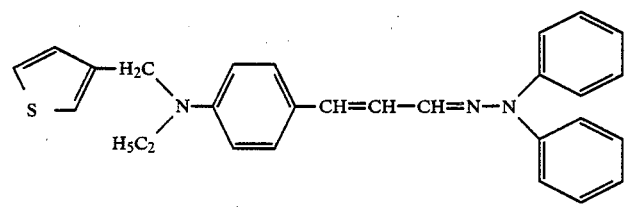
Compound No. IV-23
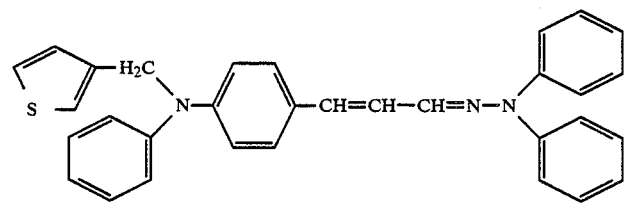
Compound No. IV-24

-continued

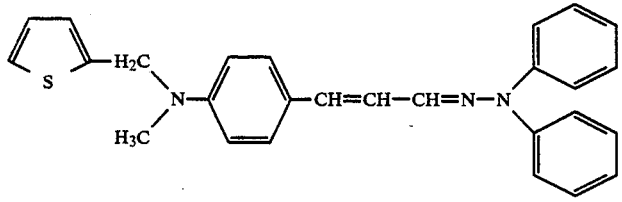

Compound No. IV-25

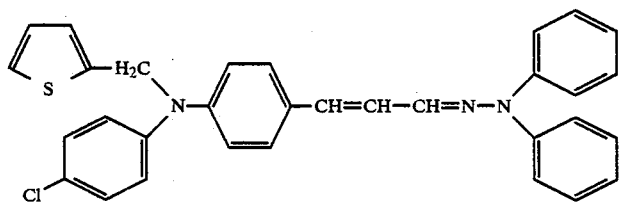

Compound No. IV-26

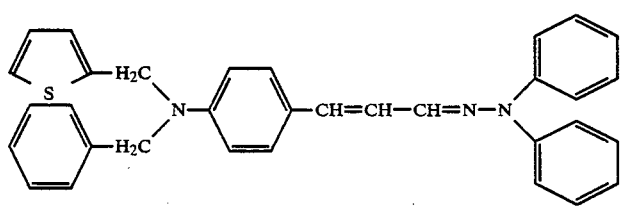

Compound No. IV-27

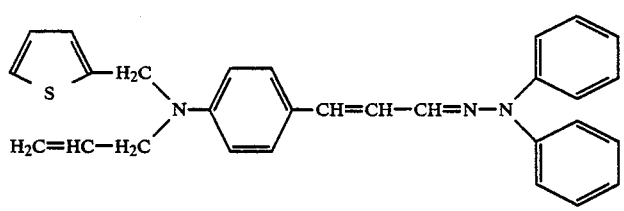

Compound No. IV-28

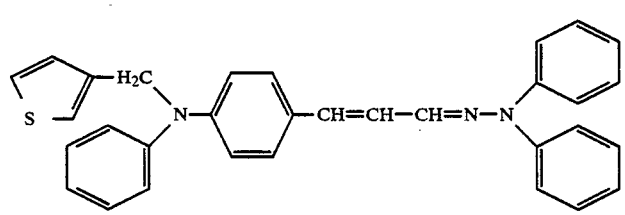

Compound No. IV-29

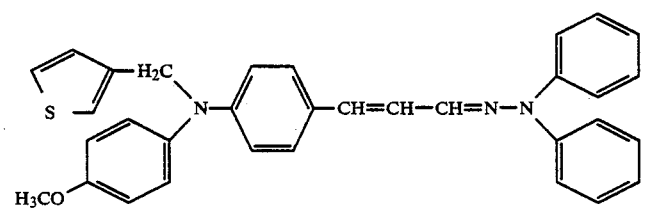

Compound No. IV-30

Examples will now be given, wherein various compounds represented by the general formula (IV) were respectively used to produce photoconductors.

EXAMPLE IV-1

A photoconductor having the structure shown in FIG. 1 and comprising a photosensitive layer having a thickness of 15 μm was produced in substantially the same manner as in Example I-1 except that the hydrazone derivative No. IV-1 mentioned above was used instead of the compound No. I-1.

EXAMPLE IV-2

A photoconductor having a structure corresponding to that shown in FIG. 3 was produced in substantially the same manner as in Example I-2 except that the hydrazone derivative No. IV-2 was used instead of the derivative No. I-2. The thickness of the charge transporting layer of the member was 15 μm, while the thickness of the charge generating layer was 1 μm.

EXAMPLE IV-3

A photoconductor was produced by forming a photosensitive layer in substantially the same manner as in Example IV-1 except that 50 parts by weight of metal-free phthalocyanine, 100 parts by weight of the hydrazone derivative No. IV-3 as mentioned above, 50 parts by weight of a polyester resin (Vylon 200) and 50 parts by weight of PMMA were used to replace therewith the composition of the photosensitive layer of Example IV-1.

EXAMPLE IV-4

A photoconductor was produced by forming a photosensitive layer in substantially the same manner as in Example IV-1 except that Chlorodiane Blue was used instead of metal-free phthalocyanine in the Example IV-3.

The four photoconductors thus produced were examined with respect to surface potential $V_s$, residual potential $V_r$, and half decay exposure amount $E_{\frac{1}{2}}$ by using white light as well as a monochromatic light (wavelength: 780 nm) in the same manner as in Examples I-1 to I-4. The results of the measurements are shown in Table 7.

TABLE 7

| Example No. | White Light | | | Light with Wavelength of 780 nm | | |
|---|---|---|---|---|---|---|
| | $V_s$ (volts) | $V_r$ (volts) | $E_{\frac{1}{2}}$ (lux·sec) | $V_s$ (volts) | $V_r$ (volts) | $E_{\frac{1}{2}}$ ($\mu J/cm^2$) |
| IV-1 | 620 | 100 | 5.5 | 600 | 80 | 5.1 |
| IV-2 | 580 | 80 | 4.9 | 610 | 100 | 5.2 |
| IV-3 | 560 | 90 | 5.2 | 580 | 110 | 5.5 |
| IV-4 | 530 | 100 | 6.1 | — | — | — |

As can be seen in Table 7, the photoconductors of Examples IV-1, IV-2, IV-3 and IV-4 were not substantially different therebetween in the half decay exposure amount and the residual potential.

EXAMPLE IV-5

A photoconductor with the structure shown in FIG. 2 was produced by forming a charge generating layer and a charge transporting layer having a dry thickness of 20 μm in substantially the same manner as in Example I-5 except that the hydrazone derivative No. IV-4 was used instead of the compound No. I-4. This photoconductor was charged by corona discharge at −6.0 kV for 0.2 second and examined with respect to electrophotographic characteristics to obtain good results, namely $V_s = -660$ V, $V_r = -60$ V and $E_{\frac{1}{2}} = 4.8$ lux.sec.

EXAMPLE IV-6

A charge generating layer having at thickness of about 1 μm was formed on an aluminum support in the same manner as in Example I-6. A charge transporting layer having a thickness of about 15 μm was formed on the charge generating layer in substantially the same manner as in Example I-6 except that the hydrazone derivative No. IV-5 was used instead of the compound No. I-5.

After the photoconductor thus obtained was charged by corona discharge at −6.0 kV for 0.2 second, the electrophotographic characteristics of the photoconductor were measured in the same manner as in Example IV-4 to obtain good results, namely $V_s = -650$ V and $E_{\frac{1}{2}} = 5.1$ lux.sec.

EXAMPLE IV-7

Photoconductors were produced by forming respective photosensitive layers in substantially the same manner as in Example IV-4 except that the compounds Nos. IV-6 to IV-30 were respectively used instead of the compound No. IV-4. The results obtained by using the electrostatic recording paper testing apparatus Model SP-428 are shown in Table 8. Table 8 shows the half decay exposure amounts $E_{\frac{1}{2}}$ (lux.sec) obtained under the experimental conditions where the photoconductors were positively charged in the dark by corona discharge at +6.0 kV for 10 compounds and irradiated with white light at an illuminance of 2 luxes. Good results are obtained with respect to the half decay exposure amount.

TABLE 8

| Compound No. | $E_{\frac{1}{2}}$ (lux·sec) |
|---|---|
| IV-6 | 5.2 |
| IV-7 | 5.5 |
| IV-8 | 4.8 |
| IV-9 | 5.6 |
| IV-10 | 5.9 |
| IV-11 | 6.0 |
| IV-12 | 5.3 |
| IV-13 | 5.5 |
| IV-14 | 5.7 |
| IV-15 | 6.5 |
| IV-16 | 5.4 |
| IV-17 | 6.1 |
| IV-18 | 5.7 |
| IV-19 | 6.2 |
| IV-20 | 6.5 |
| IV-21 | 4.8 |
| IV-22 | 5.6 |
| IV-23 | 6.1 |
| IV-24 | 6.2 |
| IV-25 | 5.8 |
| IV-26 | 6.2 |
| IV-27 | 5.9 |
| IV-28 | 6.5 |
| IV-29 | 5.8 |
| IV-30 | 7.1 |

The fifth group of hydrazone compounds to be used in the present invention is represented by the following general formula

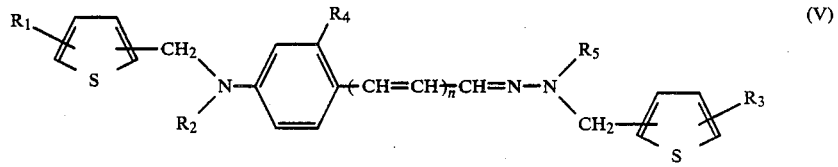

(V)

Wherein, each of $R_1$ to $R_5$ and n are the same as those in the general formula (I) described before.

These compounds are synthesized by dehydration-condensating an aldehyde compound of the formula

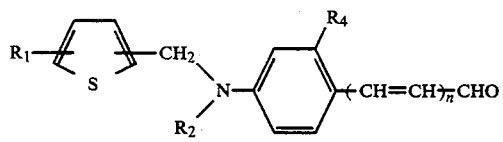
with a hydrazine compound of the formula
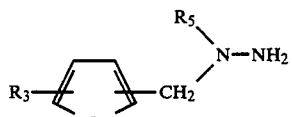
in an appropriate organic solvent such as ethanol in the presence of a small amount of a catalyst such as an acid.
Specific examples of hydrazone compounds of the general formula (V) prepared in the above-mentioned manner include:
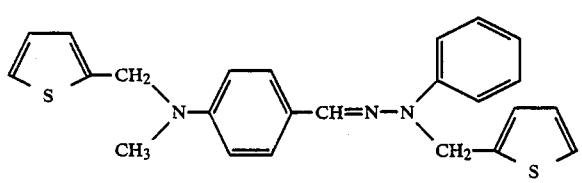
Compound No. V-1
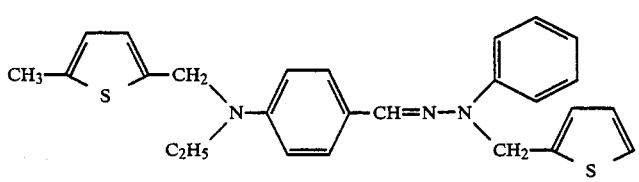
Compound No. V-2
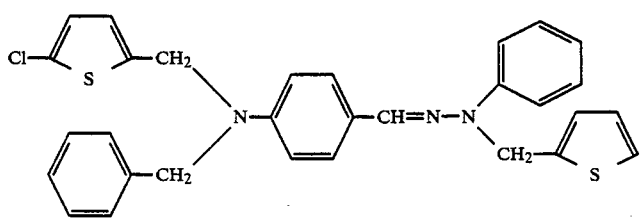
Compound No. V-3
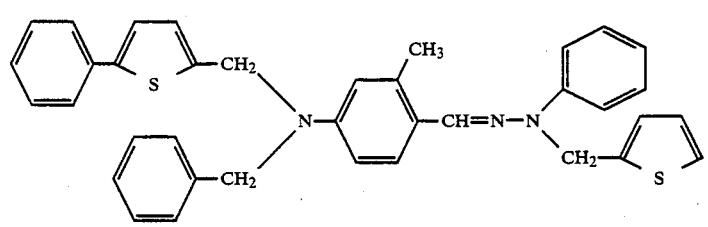
Compound No. V-4
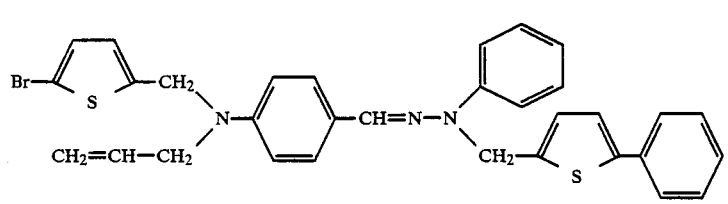
Compound No. V-5
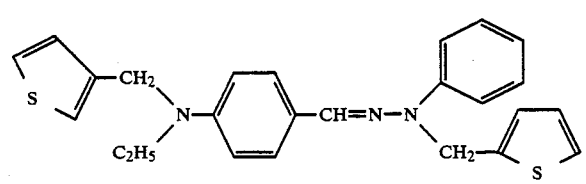
Compound No. V-6

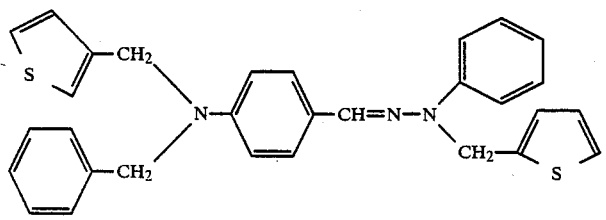
Compound No. V-7
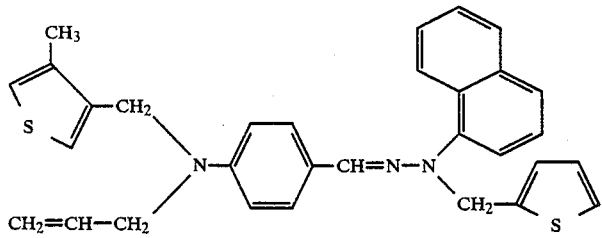
Compound No. V-8
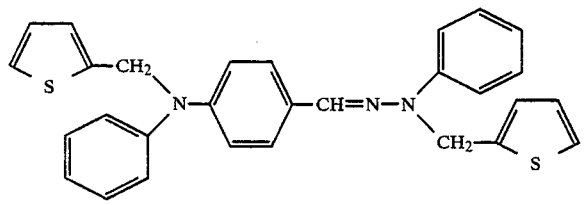
Compound No. V-9
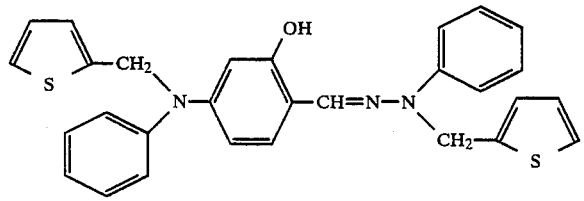
Compound No. V-10
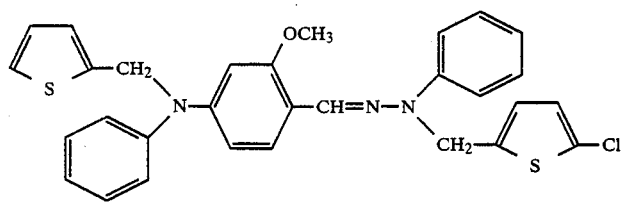
Compound No. V-11
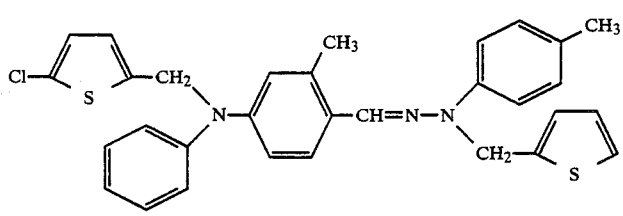
Compound No. V-12
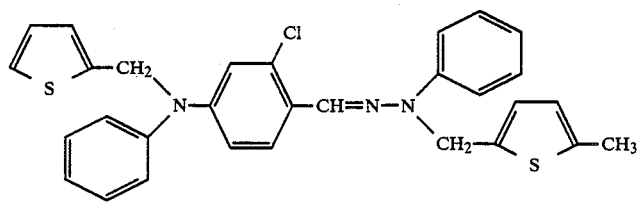
Compound No. V-13

-continued
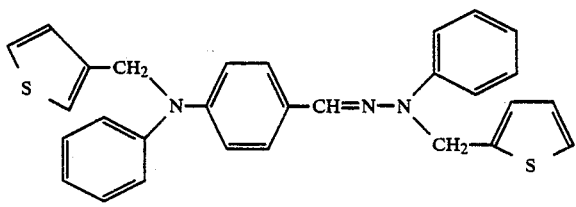
Compound No. V-14
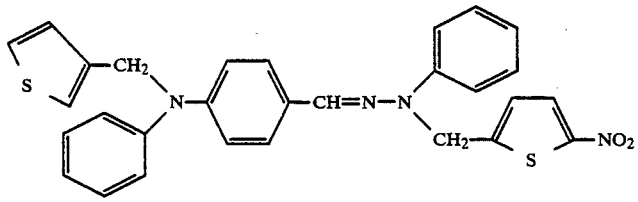
Compound No. V-15
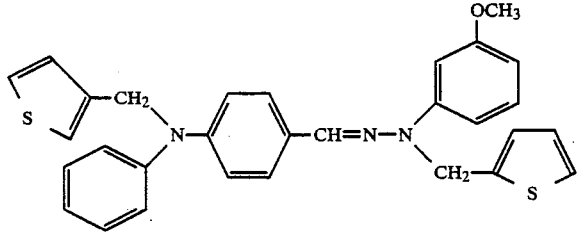
Compound No. V-16
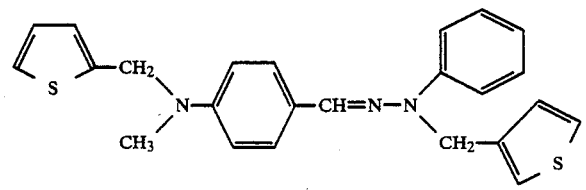
Compound No. V-17
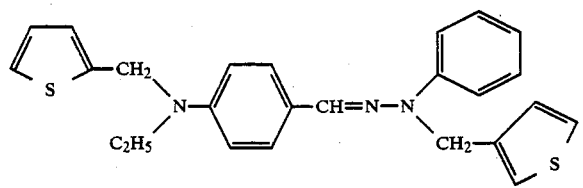
Compound No. V-18
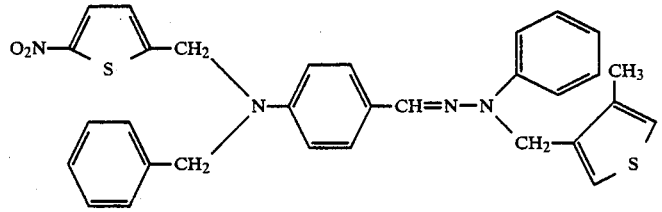
Compound No. V-19
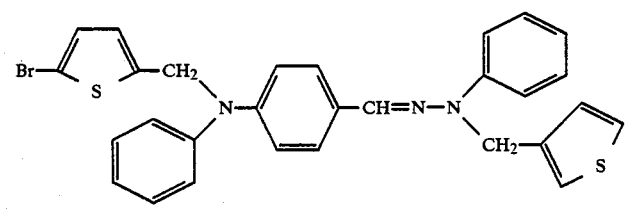
Compound No. V-20

-continued
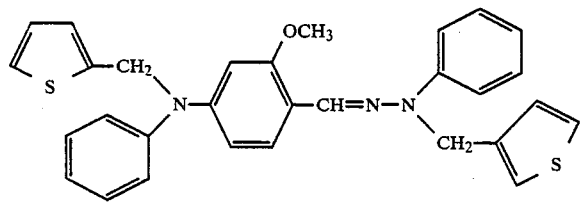
Compound No. V-21
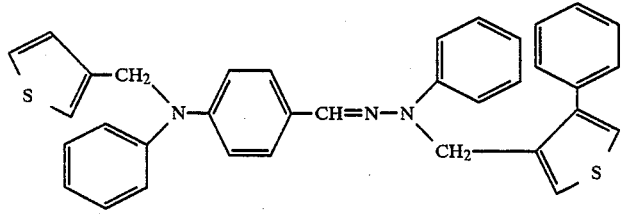
Compound No. V-22
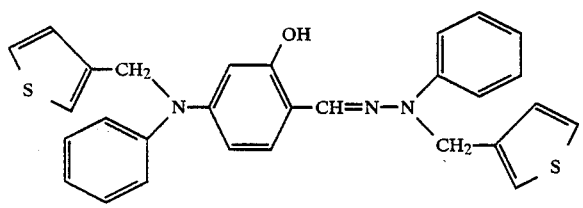
Compound No. V-23
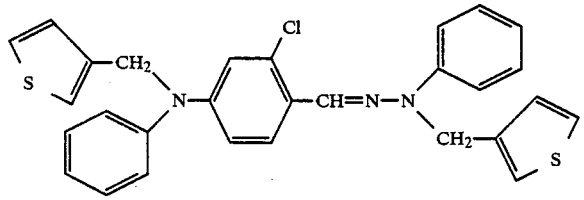
Compound No. V-24
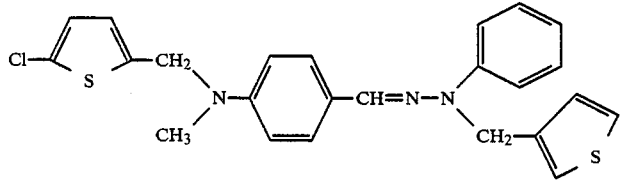
Compound No. V-25
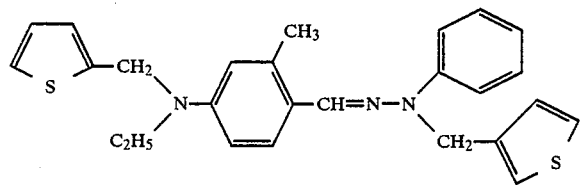
Compound No. V-26
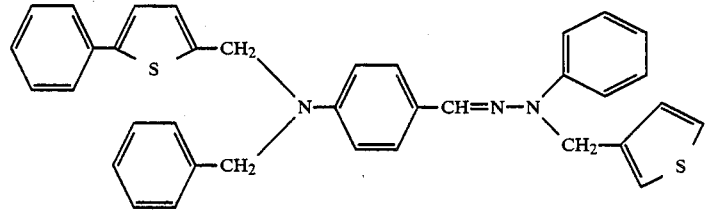
Compound No. V-27

-continued
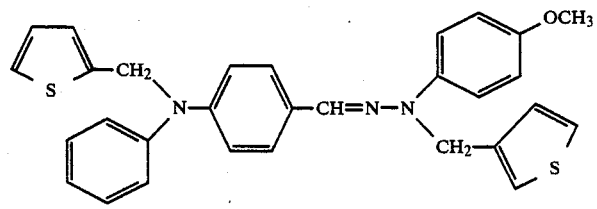
Compound No. V-28
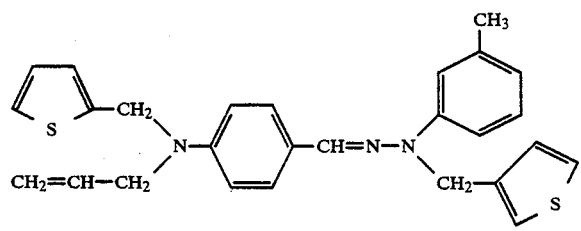
Compound No. V-29
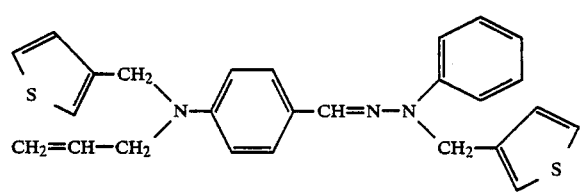
Compound No. V-30
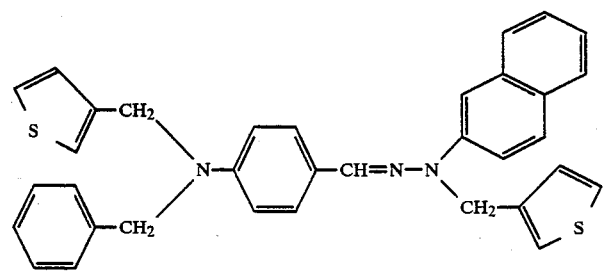
Compound No. V-31
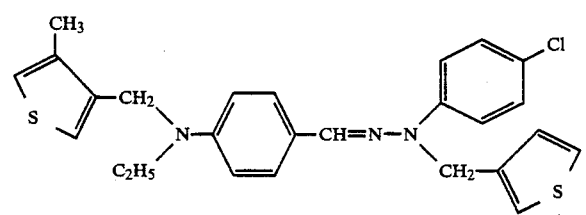
Compound No. V-32
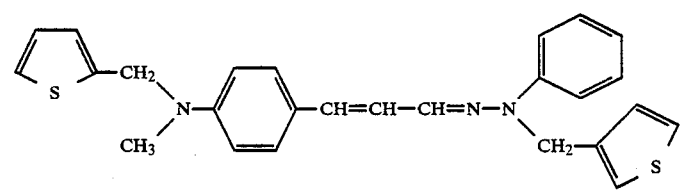
Compound No. V-33
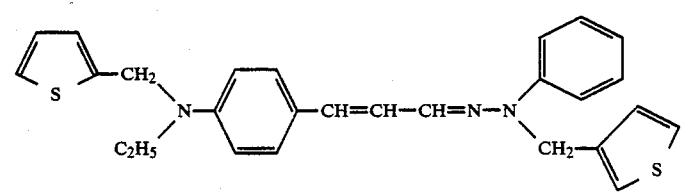
Compound No. V-34

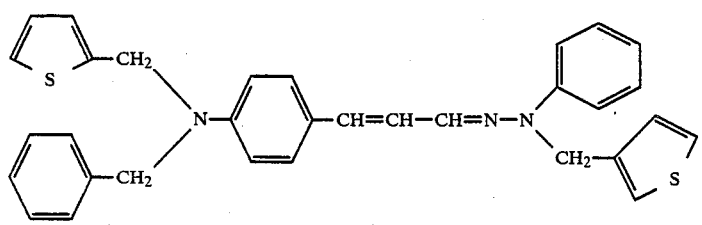
Compound No. V-35
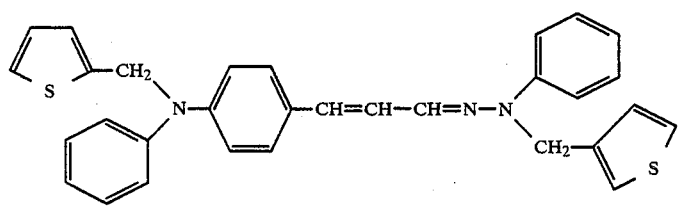
Compound No. V-36
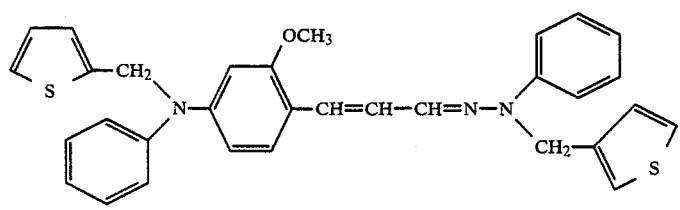
Compound No. V-37
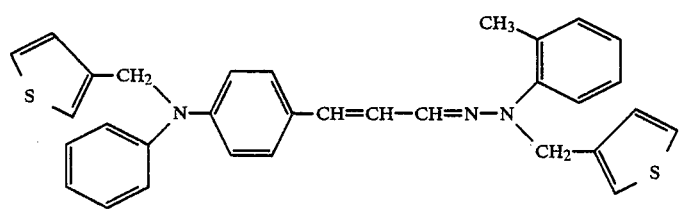
Compound No. V-38
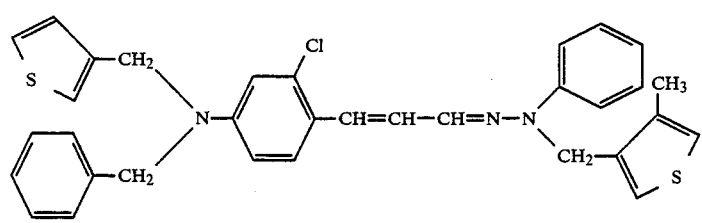
Compound No. V-39
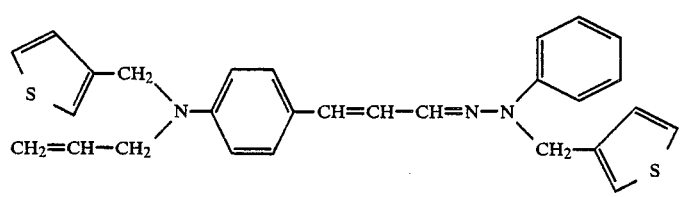
Compound No. V-40
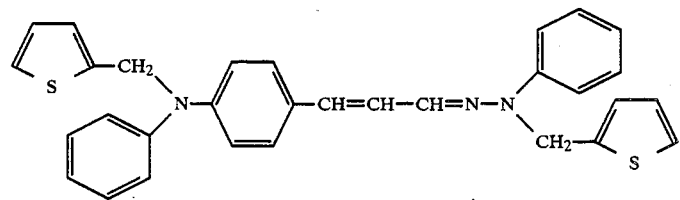
Compound No. V-41

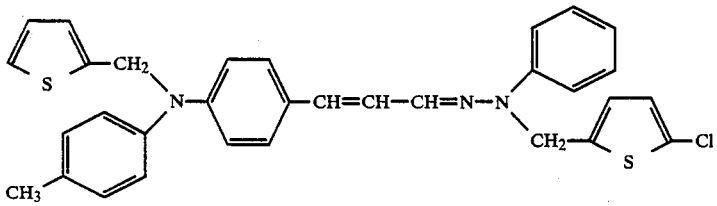

Compound No. V-42

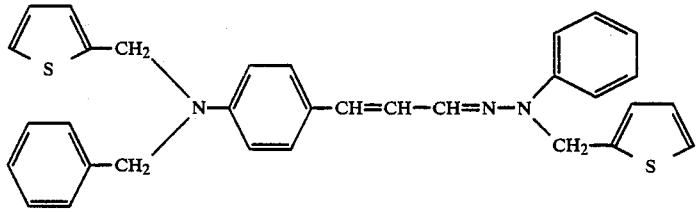

Compound No. V-43

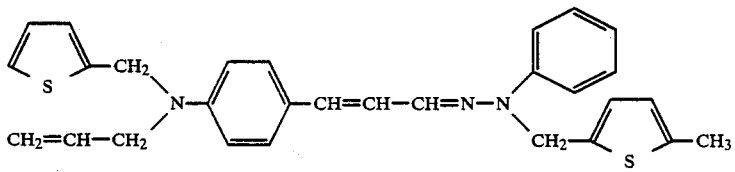

Compound No. V-44

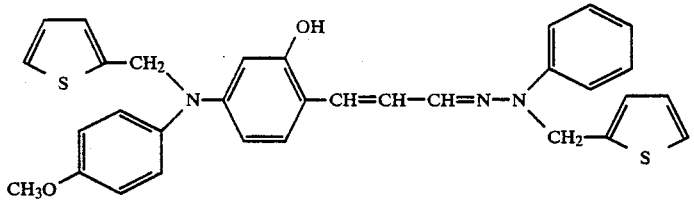

Compound No. V-45

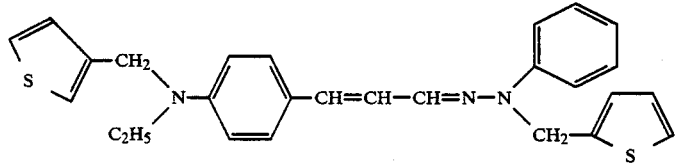

Compound No. V-46

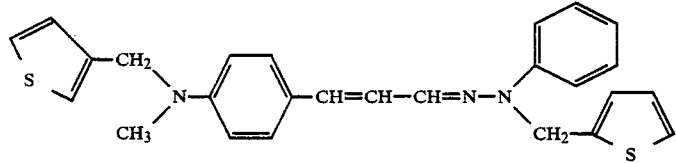

Compound No. V-47

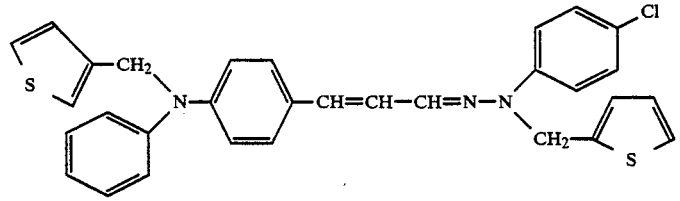

Compound No. V-48

Examples will now be given, wherein various compounds represented by the general formula (V) were respectively used to produce photoconductors.

EXAMPLE V-1

A photoconductor having the structure shown in FIG. 1 and comprising a photosensitive layer having a thickness of 15 μm was produced in substantially the same manner as in Example I-1 except that the hydrazone compound No. V-1 mentioned above was used instead of the compound No. I-1.

EXAMPLE V-2

A photoconductor having a structure corresponding to that of FIG. 3 was produced in substantially the same manner as in Example I-2 except that the hydrazone compound No. V-2 was used instead of the compound No. I-2. The thickness of the charge transporting layer of the member is 15 μm, while the thickness of the charge generating layer was 1 μm.

EXAMPLE V-3

A photoconductor was produced by forming a photosensitive layer in substantially the same manner as in Example V-1 except that 50 parts by weight of metal-free phthalocyanine, 100 parts by weight of the hydrazone compound No. V-3 mentioned above, 50 parts by weight of a polyester resin (Vylon 200), and 50 parts by weight of PMMA were used to replace therewith the composition of the photosensitive layer of Example V-1.

EXAMPLE V-4

A photoconductor was produced by forming a photosensitive layer in substantially the same manner as in Example V-1 except that Chlorodiane Blue was used instead of metal-free phthalocyanine in the Example V-3.

The four photoconductors thus produced were examined with respect to surface potential $V_s$, residual potential $V_r$, and half decay exposure amount $E_{\frac{1}{2}}$ by using white light as well as a monochromatic light (wavelength: 780 nm) in the same manner as in Examples I-1 to I-4. The results of the measurements are shown in Table 9.

TABLE 9

| Example No. | White Light | | | Light with Wavelength of 780 nm | | |
|---|---|---|---|---|---|---|
| | $V_s$ (volts) | $V_r$ (volts) | $E_{\frac{1}{2}}$ (lux · sec) | $V_s$ (volts) | $V_r$ (volts) | $E_{\frac{1}{2}}$ (μJ/cm²) |
| V-1 | 700 | 110 | 6.8 | 660 | 90 | 6.4 |
| V-2 | 650 | 90 | 7.0 | 650 | 80 | 6.6 |
| V-3 | 680 | 90 | 6.1 | 660 | 70 | 6.3 |
| V-4 | 630 | 60 | 6.5 | — | — | — |

As can be seen in Table 9, the photoconductors of Examples V-1, V-2, V-3 and V-4 were not substantially different therebetween in the half decay exposure amount and the residual potential, and showed good surface potential characteristics. The photoconductors of Examples V-1, V-2 and V-3, using a phthalocyanine compound as the charge generating substance, also showed excellent electrophotographic characteristics for light with a long wavelength of 780 nm, and providing that they are satisfactorily used in semiconductor laser printers.

EXAMPLE V-5

A photoconductor with the structure shown in FIG. 2 was produced by forming a charge generating layer and a charge transporting layer with a dry thickness of 20 μm in substantially the same manner as in Example I-5 except that the hydrazone compound No. V-4 was used instead of the compound No. I-4. This photoconductor was charged by corona discharge at −6.0 kV for 0.2 second and examined with respect to electrophotographic characteristics to obtain good results, namely $V_s = -550$ V, $V_r = -30$ V and $E_{\frac{1}{2}} = 6.0$ lux.sec.

EXAMPLE V-6

A charge generating layer with a thickness of about 1 μm was formed on an aluminum support in the same manner as in Example I-6. A charge transporting layer with a thickness of about 15 μm was formed on the charge generating layer in substantially the same manner as in Example I-6 except that the hydrazone compound No. V-5 was used instead of the compound No. I-5.

The photoconductor thus obtained was charged by corona discharge at −6.0 kV for 0.2 second and examined with respect to electrophotographic characteristics in the same manner as in Example V-5. Good results were obtained, namely $V_s = -650$ V and $E_{\frac{1}{2}} = 7.5$ lux.sec.

EXAMPLE V-7

Photoconductors were produced by forming respective photosensitive layers in substantially the same manner as in Example V-4 except that the compounds Nos. V-6 to V-48 were respectively used instead of the compound No. V-4. The results obtained by using the electrostatic recording paper testing apparatus Model SP-428 are shown in Table 10. Table 10 shows the half decay exposure amounts $E_{\frac{1}{2}}$ (lux.sec) measured under the experimental conditions where the photoconductors were positively charged in the dark by corona discharge at +6.0 kV for 10 seconds and irradiated with white light at an illuminance of 2 luxes.

TABLE 10

| Compound No. | $E_{\frac{1}{2}}$ (lux · sec) |
|---|---|
| V-6 | 4.9 |
| V-7 | 5.8 |
| V-8 | 6.2 |
| V-9 | 6.4 |
| V-10 | 6.8 |
| V-11 | 8.0 |
| V-12 | 6.8 |
| V-13 | 5.1 |
| V-14 | 5.8 |
| V-15 | 5.7 |
| V-16 | 6.5 |
| V-17 | 7.1 |
| V-18 | 7.6 |
| V-19 | 7.9 |
| V-20 | 6.6 |
| V-21 | 5.2 |
| V-22 | 5.9 |
| V-23 | 6.2 |
| V-24 | 5.8 |
| V-25 | 6.5 |
| V-26 | 6.3 |
| V-27 | 5.8 |
| V-28 | 6.6 |
| V-29 | 7.2 |
| V-30 | 5.9 |
| V-31 | 6.0 |
| V-32 | 6.5 |
| V-33 | 5.8 |
| V-34 | 6.2 |
| V-35 | 4.8 |
| V-36 | 7.7 |
| V-37 | 4.9 |
| V-38 | 5.9 |
| V-39 | 5.1 |
| V-40 | 6.6 |
| V-41 | 8.0 |
| V-42 | 7.2 |
| V-43 | 4.8 |
| V-44 | 5.9 |
| V-45 | 5.7 |
| V-46 | 6.5 |
| V-47 | 7.1 |

TABLE 10-continued

| Compound No. | $E_{\frac{1}{2}}$ (lux · sec) |
|---|---|
| V-48 | 6.5 |

As can be seen in Table 10, the photoconductors using the respective hydrazone compounds Nos. V-6 to V-48 as a charge transporting substance were satisfactory with respect to the half decay exposure amount $E_{\frac{1}{2}}$.

The sixth group of hydrazone compounds to be used in the present invention is represented by the following general formula (VI).

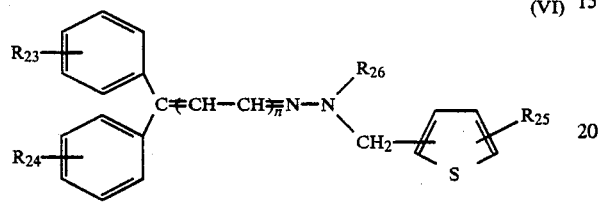

(VI)

Wherein, each of $R_{23}$, $R_{24}$ and $R_{25}$ stands for a hydrogen atom, a halogen atom, an alkyl group, a hydoxy group, an alkoxy group, an aryl group, an amino group or a nitro group, each of which groups may have a substituent(s); $R_{26}$ stands for an aryl group which may have a substituent(s); and n stands for an integer of 0 or 1.

These compounds are synthesized by dehydration-condensating an aldehyde compound of the formula

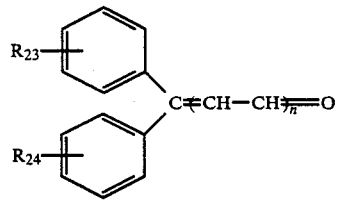

with a hydrazine compound of the formula

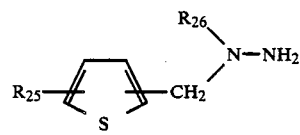

in an appropriate organic solvent such as ethanol in the presence of a small amount of a catalyst such as an acid.

Specific examples of the hydrazone compounds of the general formula (VI) prepared in the above-mentioned manner include:

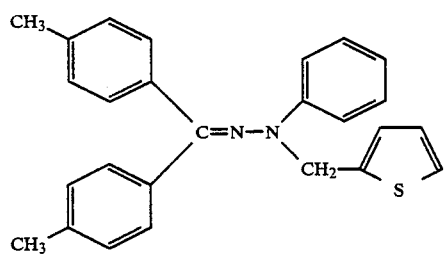

Compound No. VI-1

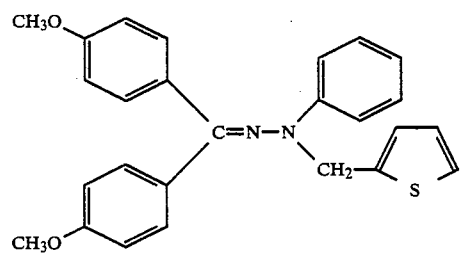

Compound No. VI-2

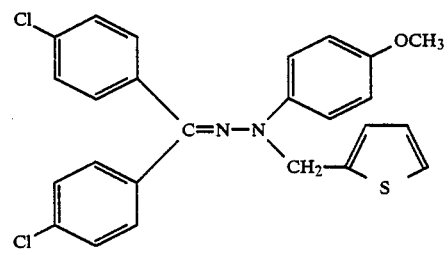

Compound No. VI-3

-continued
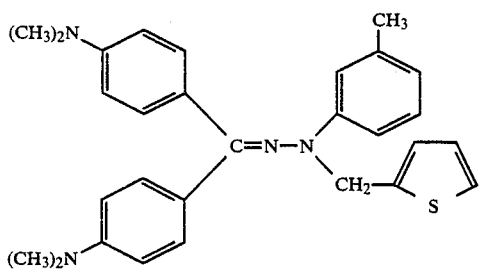 Compound No. VI-4
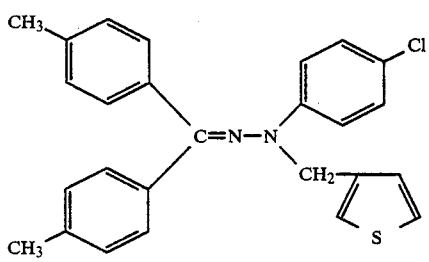 Compound No. VI-5
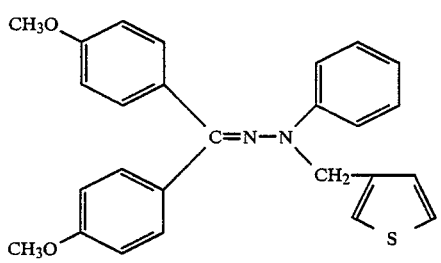 Compound No. VI-6
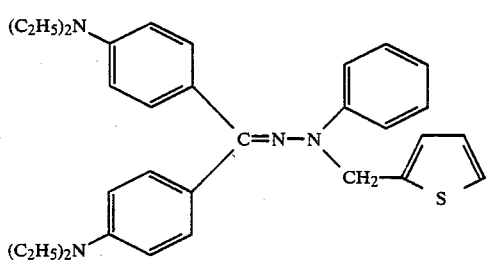 Compound No. VI-7
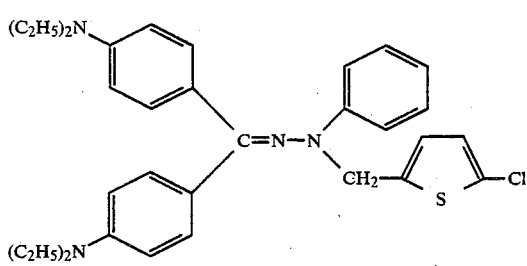 Compound No. VI-8
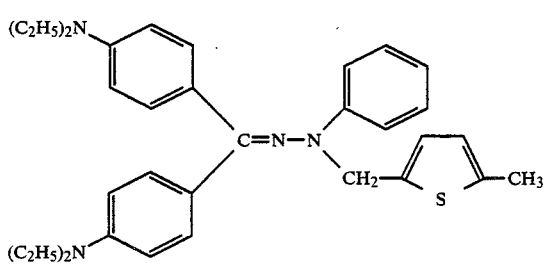 Compound No. VI-9

-continued
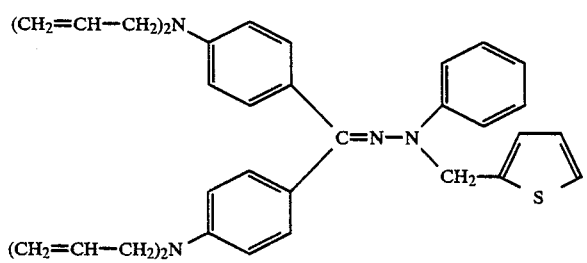
Compound No. VI-10
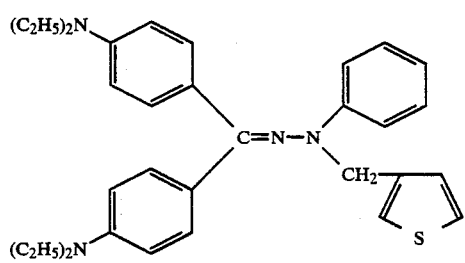
Compound No. VI-11
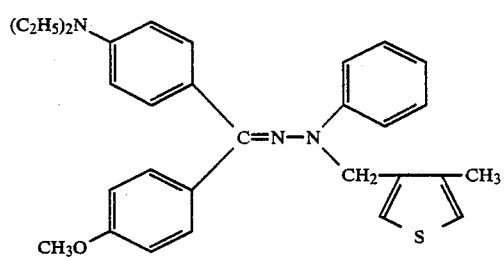
Compound No. VI-12
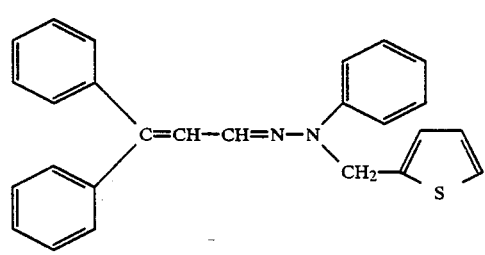
Compound No. VI-13
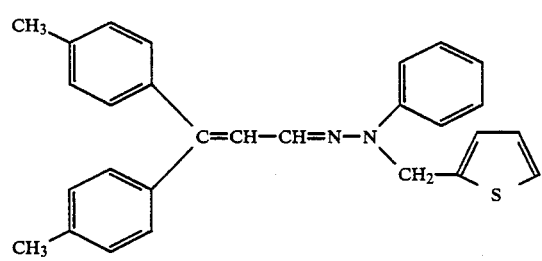
Compound No. VI-14
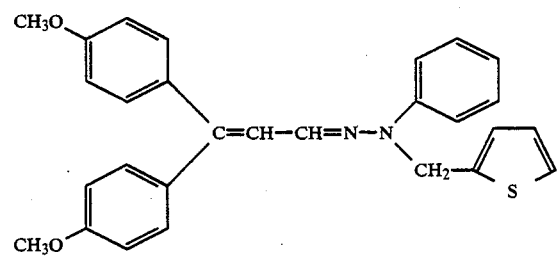
Compound No. VI-15

-continued
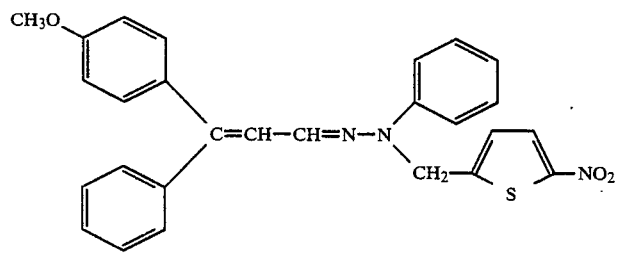
Compound No. VI-16
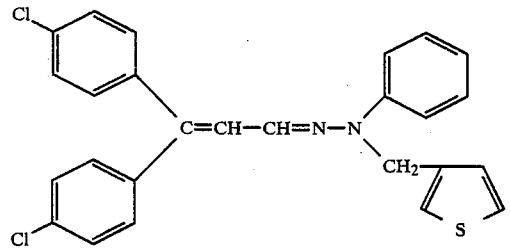
Compound No. VI-17
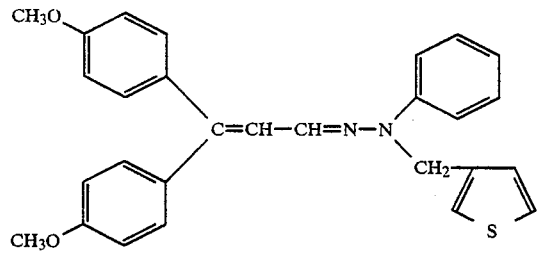
Compound No. VI-18
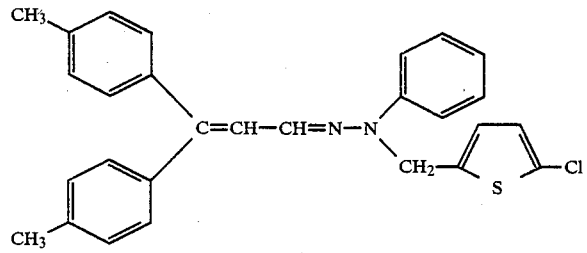
Compound No. VI-19
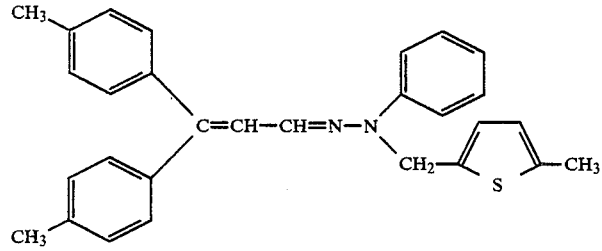
Compound No. VI-20
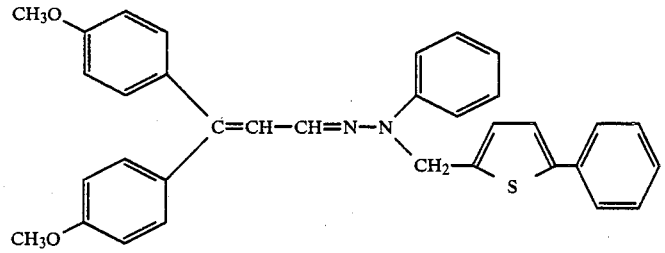
Compound No. VI-21

-continued
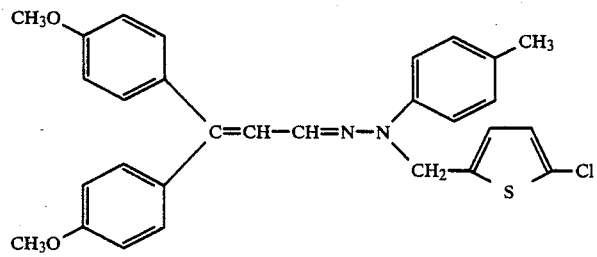
Compound No. VI-22
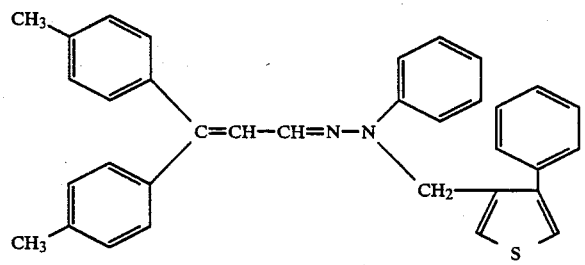
Compound No. VI-23
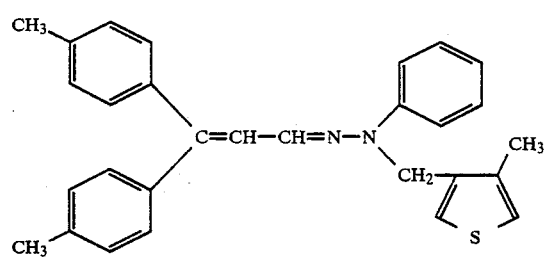
Compound No. VI-24
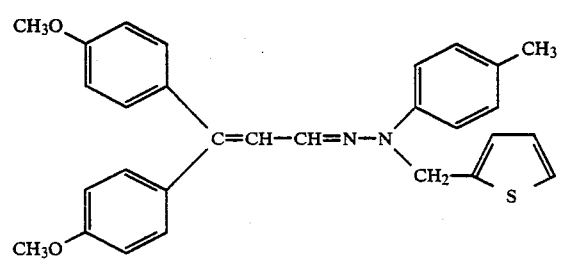
Compound No. VI-25
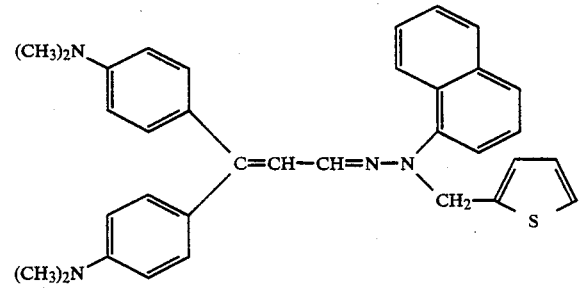
Compound No. VI-26
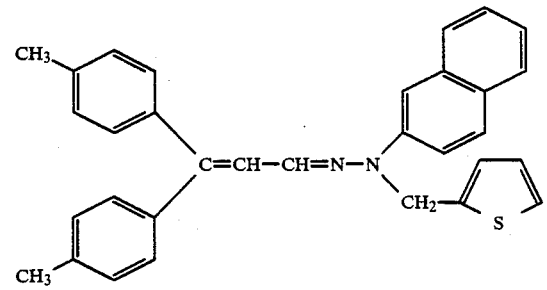
Compound No. VI-27

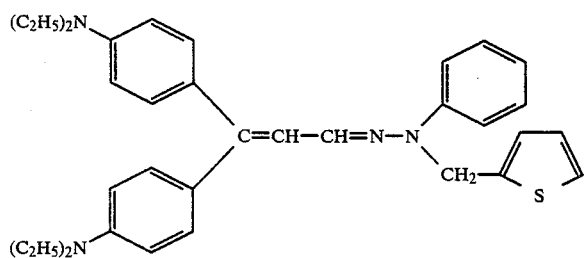
Compound No. VI-28
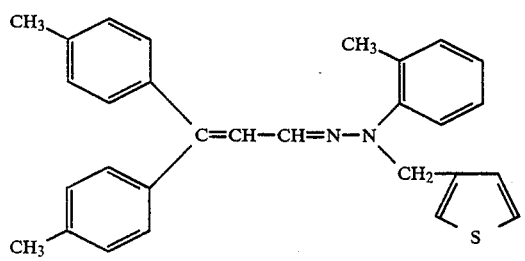
Compound No. VI-29
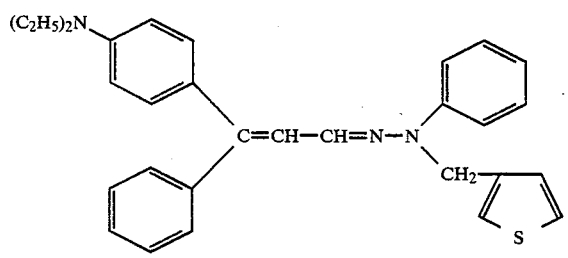
Compound No. VI-30
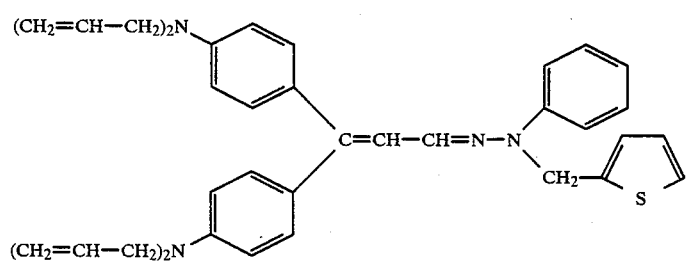
Compound No. VI-31
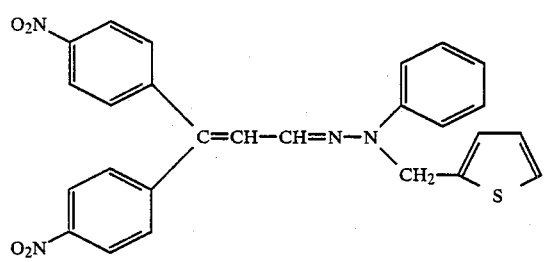
Compound No. VI-32
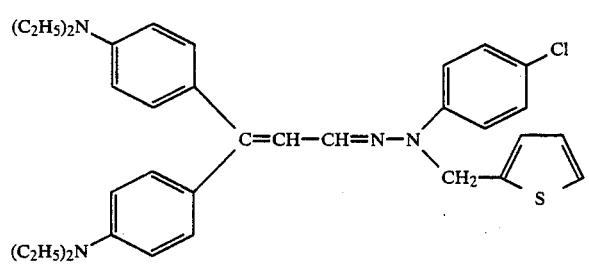
Compound No. VI-33

-continued

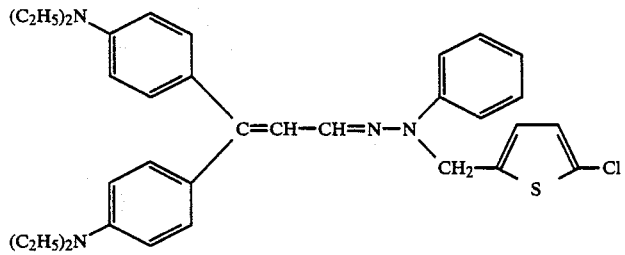

Compound No. VI-34

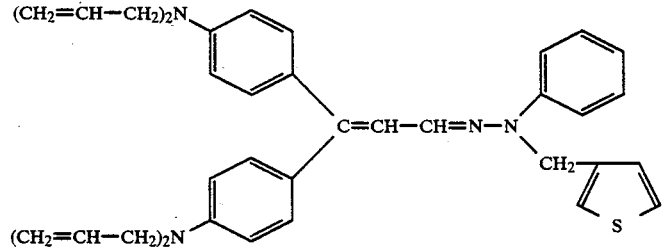

Compound No. VI-35

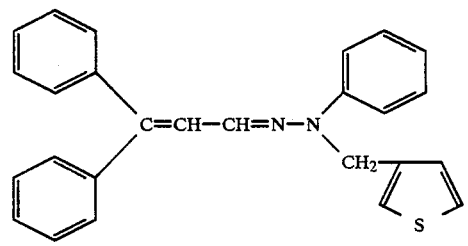

Compound No. VI-36

Examples will now be given, wherein various compounds represented by the general of formula (VI) were respectively used to produce the photoconductors.

EXAMPLE VI-1

A photoconductor having the structure shown in FIG. 1 and comprising a photosensitive layer having a thickness of 15 μm was produced in substantially the same manner as in Example I-1 except that the hydrazone compound No. VI-1 mentioned above was used instead of the compound No. I-1.

EXAMPLE VI-2

A photoconductor having a structure corresponding to that of FIG. 3 was produced in substantially the same manner as in Example I-2 except that the hydrazone compound No. VI-2 was used instead of the compound No. I-2. The thickness of the charge transporting layer of the member was 15 μm, while the thickness of the charge generating layer was 1 μm.

EXAMPLE VI-3

A photoconductor was produced by forming a photosensitive layer in substantially the same manner as in Example VI-1 except that 50 parts by weight of metal-free phthalocyanine, 100 parts by weight of the hydrazone compound No. VI-3 mentioned above, 50 parts by weight of a polyester resin (Vylon 200), and 50 parts by weight of PMMA were used to replace therewith the composition of the photosensitive layer of Example VI-1.

EXAMPLE VI-4

A photoconductor was produced by forming a photosensitive layer in substantially the same manner as in Example VI-1 except that Chlorodiane Blue was used instead of metal-free phthalocyanine in the Example VI-3.

The four photoconductors thus produced were examined with respect to surface potential $V_s$, residual potential $V_r$, and half decay exposure amount $E_{\frac{1}{2}}$ by using white light as well as a monochromatic light (wavelength: 780 nm) in the same manner as in Examples I-1 to I-4. The results of the measurements are shown in Table 11.

TABLE 11

| Example No. | White Light | | | Light with Wavelength of 780 nm | | |
|---|---|---|---|---|---|---|
| | $V_s$ (volts) | $V_r$ (volts) | $E_{\frac{1}{2}}$ (lux · sec) | $V_s$ (volts) | $V_r$ (volts) | $E_{\frac{1}{2}}$ (μJ/cm$^2$) |
| VI-1 | 650 | 80 | 5.8 | 600 | 60 | 5.4 |
| VI-2 | 650 | 70 | 6.3 | 630 | 60 | 5.9 |
| VI-3 | 630 | 80 | 6.6 | 660 | 40 | 5.8 |
| VI-4 | 600 | 60 | 5.9 | — | — | — |

As can be seen in Table 11, the photoconductors of Examples VI-1, VI-2, VI-3 and VI-4 were comparable with one another in respect of the half decay exposure amount and the residual potential, and showed good surface potential characteristics. The photoconductors of Examples VI-1, VI-2 and VI-3, using a phthalocyanine compound as the charge generating substance, also showed a high sensitivity for light with a long wavelength of 780 nm, thus proving that they can be satisfactorily used in semiconductor laser printers.

EXAMPLE VI-5

A photoconductor with the structure shown in FIG. 2 was produced by forming a charge generating layer and a charge transporting layer with a dry thickness of 20 μm in substantially the same manner as in Example I-5 except that the hydrazone compound No. VI-4 was used instead of the compound No. I-4. After this photoconductor was charged by corona discharge at −6.0 kV for 0.2 second and examined with respect to electrophotographic characteristics. Good results were obtained, namely $V_s = -650V$, $V_r = -60V$ and $E_{\frac{1}{2}} = 5.0$ lux.sec.

EXAMPLE VI-6

A charge generating layer with a thickness of about 1 μm was formed on an aluminum support in the same manner as in Example I-6. A charge transporting layer with a thickness of about 15 μm was formed on the charge generating layer in substantially the same manner as in Example I-6 except that the hydrazone compound No. VI-5 was used instead of the compound No. I-5.

The photoconductor thus obtained was charged by corona discharge at −6.0 kV for 0.2 second and examined with respect to electrophotographic characteristics in the same manner as in Example VI-5. Good results were obtained, namely $V_s = -600V$ and $E_{\frac{1}{2}} = 4.9$ lux.sec.

EXAMPLE VI-7

Photoconductors were produced by forming respective photosensitive layers in substantially the same manner as in Example VI-4 except that the compounds Nos. VI-6 to VI-36 were respectively used instead of the compound No. VI-4. The results obtained by using the electrostatic recording paper testing apparatus Model SP-428 are shown in Table 12. Table 12 shows the half decay exposure amounts $E_{\frac{1}{2}}$ (lex.sec) obtained under the experimental conditions where the photoconductors were positively charged in the dark by corona discharge at +6.0 kV for 10 seconds and irradiated with white light at an illuminance of 2 luxes.

TABLE 12

| Compound No. | $E_{\frac{1}{2}}$ (lux · sec) |
|---|---|
| VI-6 | 7.0 |
| VI-7 | 6.9 |
| VI-8 | 7.1 |
| VI-9 | 6.6 |
| VI-10 | 6.2 |
| VI-11 | 6.7 |
| VI-12 | 8.1 |
| VI-13 | 6.1 |
| VI-14 | 5.8 |
| VI-15 | 6.1 |
| VI-16 | 4.5 |
| VI-17 | 6.9 |
| VI-18 | 5.9 |
| VI-19 | 6.2 |
| VI-20 | 6.9 |
| VI-21 | 5.0 |
| VI-22 | 6.1 |
| VI-23 | 6.6 |
| VI-24 | 6.7 |
| VI-25 | 7.1 |
| VI-26 | 6.7 |
| VI-27 | 7.7 |
| VI-28 | 6.8 |
| VI-29 | 5.8 |
| VI-30 | 6.2 |
| VI-31 | 6.4 |
| VI-32 | 7.0 |
| VI-33 | 8.1 |
| VI-34 | 5.2 |
| VI-35 | 6.8 |
| VI-36 | 5.3 |

As can be seen in Table 12, the photoconductors using the respective hydrazone compounds Nos. VI-6 to VI-36 as the charge transporting substance were satisfactory with respect to the half decay exposure amount $E_{\frac{1}{2}}$.

The seventh group of hydrazone compounds to be used in the present invention is represented by the following general formula (VII).

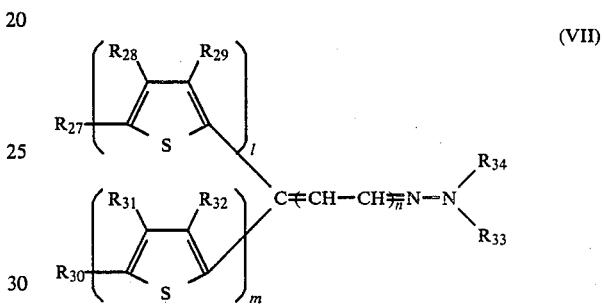

(VII)

Wherein, each of $R_{27}$ to $R_{32}$ stands for a hydrogen atom, a halogen atom, an alkyl group, an alkoxy group, an acyl group, a nitro group, an aryl group or an amino group, both of which aryl group and amino group may have a substituent(s); each of $R_{33}$ and $R_{34}$ stands for an alkyl group, an allyl group, an aryl group, or an aralkyl group both of which aryl group and aralkyl group may have a substituent(s); each of l and m stands for an integer of 1, 2 or 3; and n stands for an integer of 0 or 1.

These compounds are synthesized by dehydration-condensating an aldehyde compound of the formula

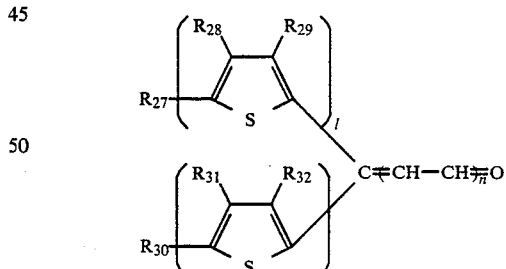

with a hydrazione compound of the formula

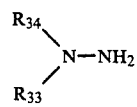

in an appropriate organic solvent such as ethanol in the presence of a small amount of a catalyst such as an acid.

Specific examples of hydrazone compound of the general formula (VII) prepared in the above-mentioned manner include:

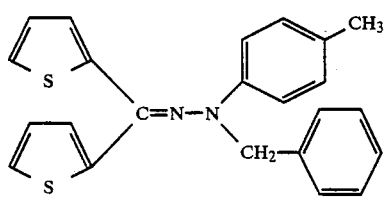
Compound No. VII-1
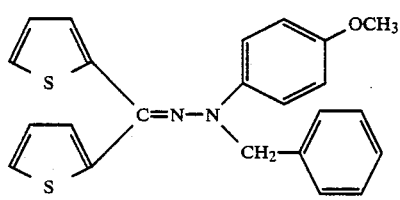
Compound No. VII-2
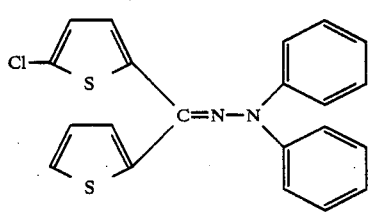
Compound No. VII-3
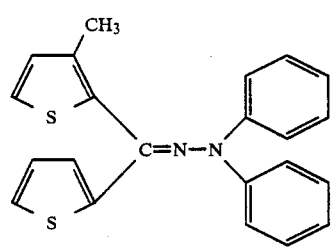
Compound No. VII-4
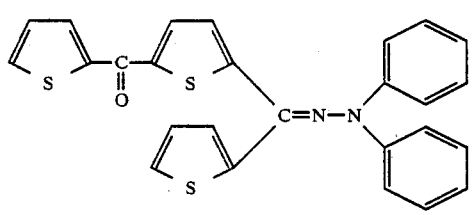
Compound No. VII-5
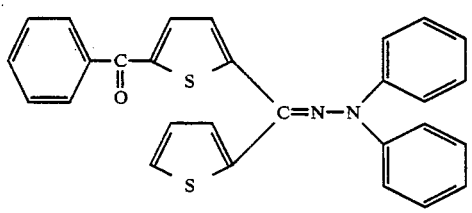
Compound No. VII-6
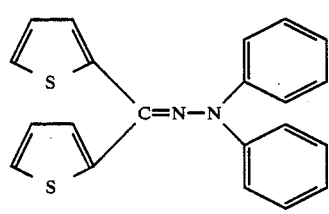
Compound No. VII-7

-continued
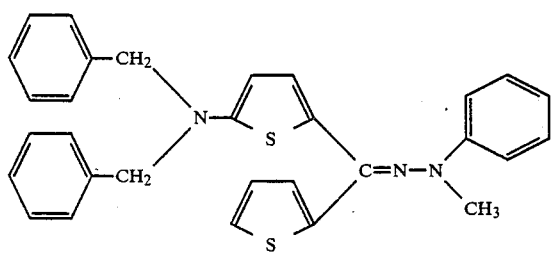
Compound No. VII-8
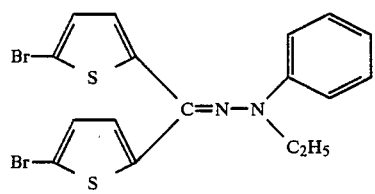
Compound No. VII-9
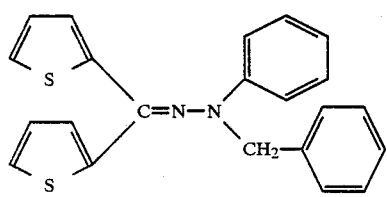
Compound No. VII-10
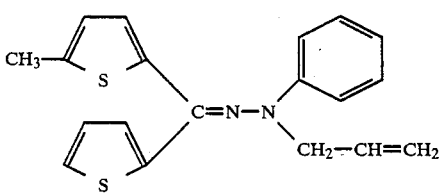
Compound No. VII-11
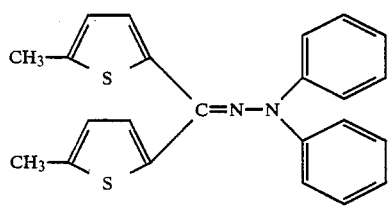
Compound No. VII-12
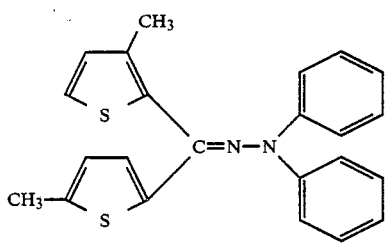
Compound No. VII-13
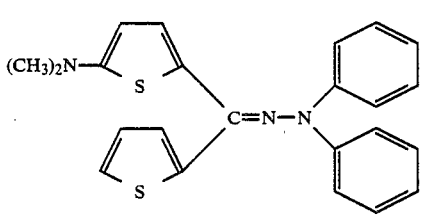
Compound No. VII-14

-continued
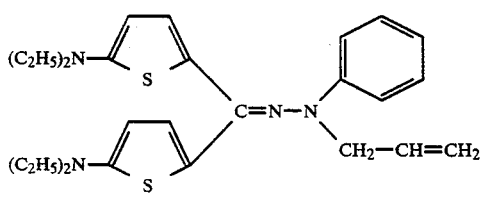
Compound No. VII-15
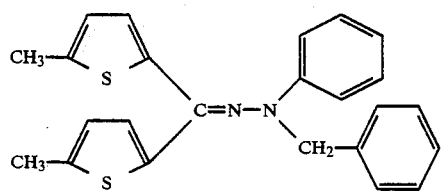
Compound No. VII-16
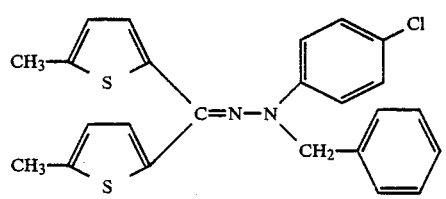
Compound No. VII-17
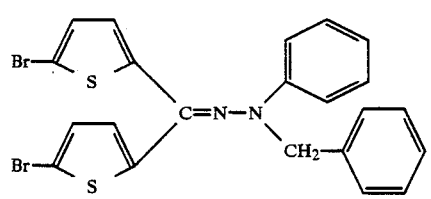
Compound No. VII-18
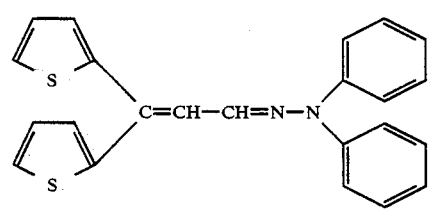
Compound No. VII-19
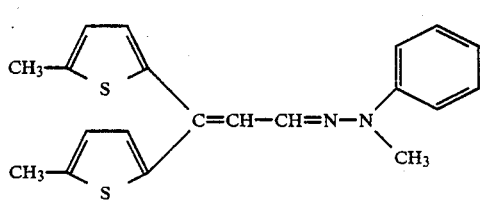
Compound No. VII-20
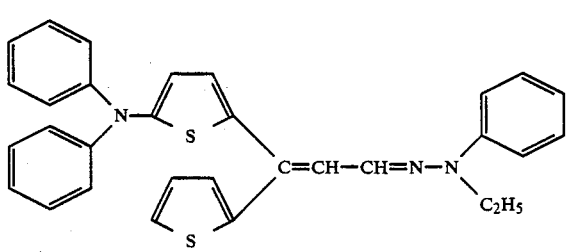
Compound No. VII-21

-continued
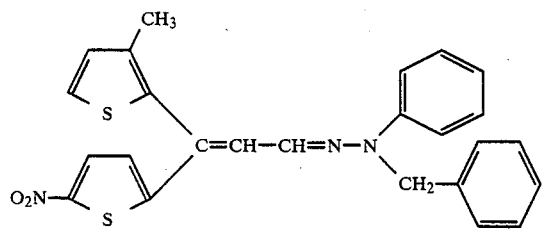
Compound No. VII-22
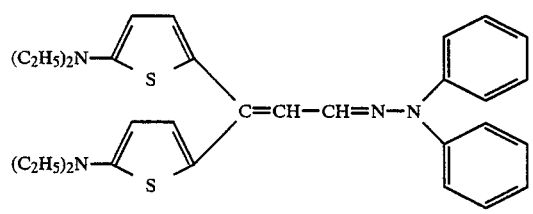
Compound No. VII-23
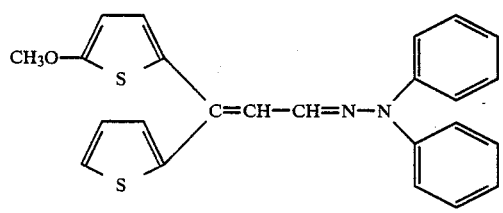
Compound No. VII-24
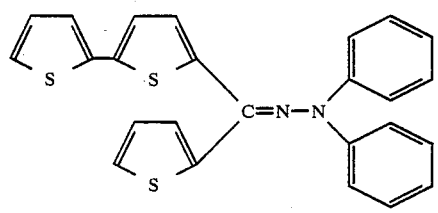
Compound No. VII-25
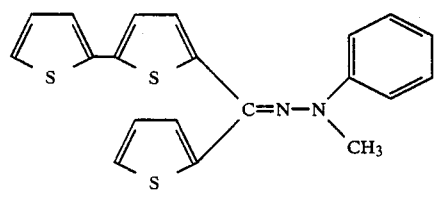
Compound No. VII-26
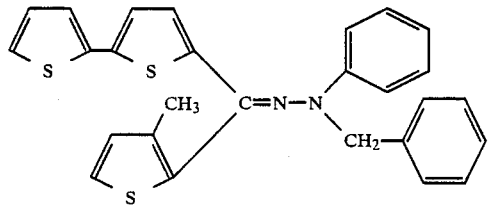
Compound No. VII-27
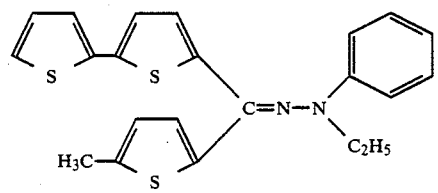
Compound No. VII-28

-continued
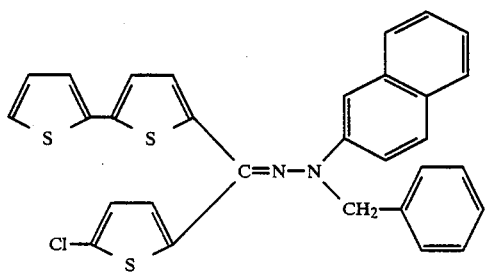
Compound No. VII-29
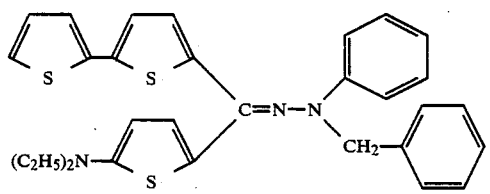
Compound No. VII-30
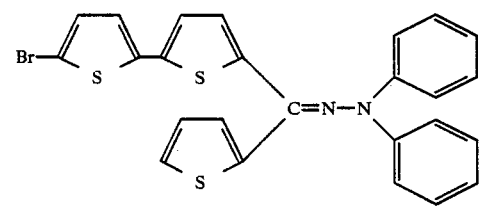
Compound No. VII-31
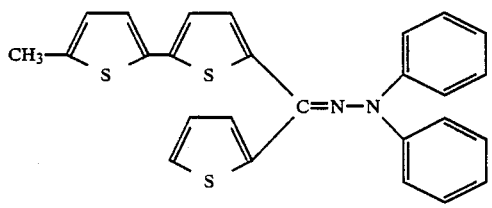
Compound No. VII-32
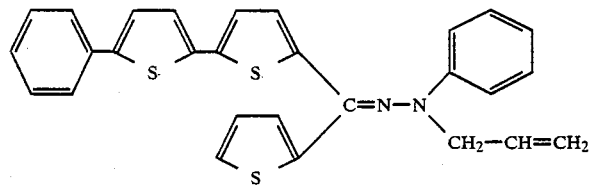
Compound No. VII-33
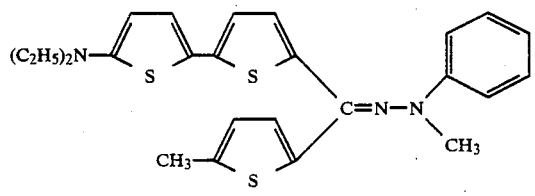
Compound No. VII-34
Compound No. VII-35
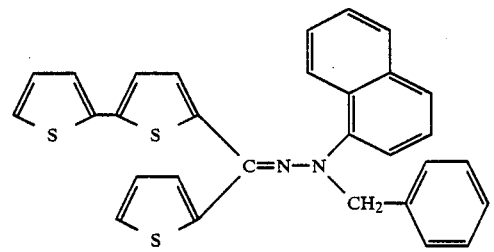

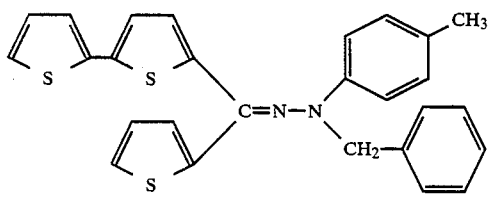
Compound No. VII-36
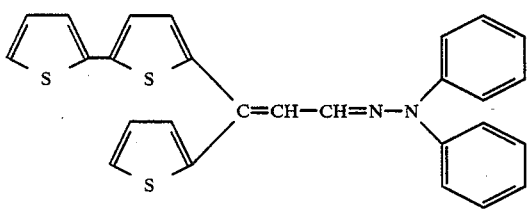
Compound No. VII-37
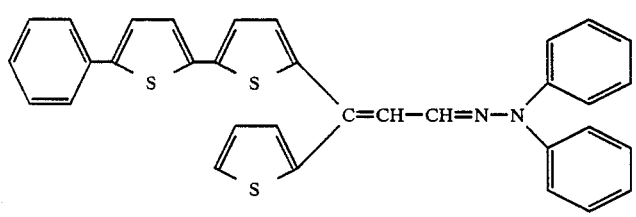
Compound No. VII-38
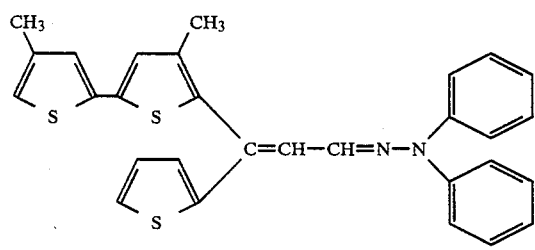
Compound No. VII-39
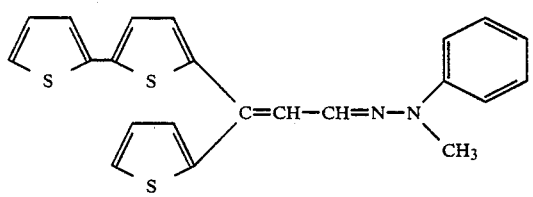
Compound No. VII-40
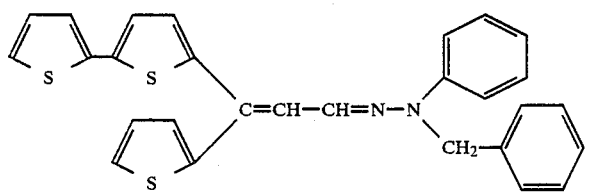
Compound No. VII-41
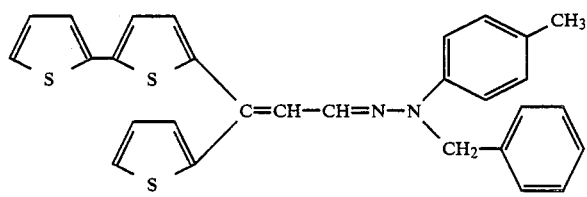
Compound No. VII-42

-continued
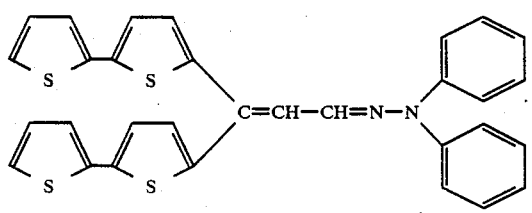
Compound No. VII-43
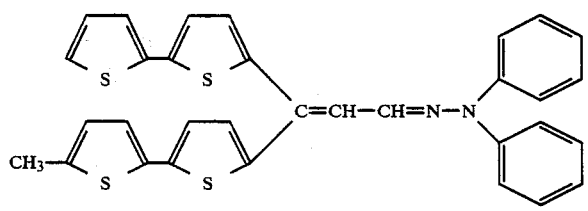
Compound No. VII-44
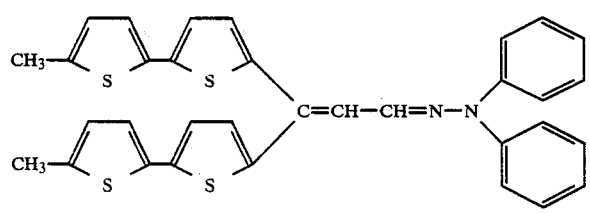
Compound No. VII-45
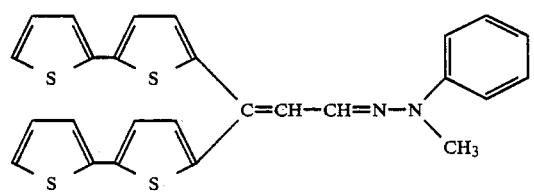
Compound No. VII-46
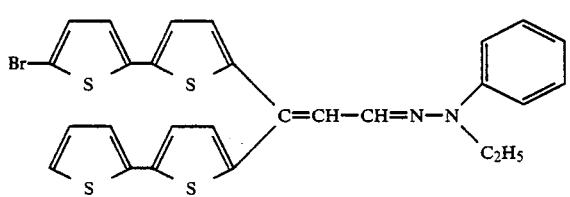
Compound No. VII-47
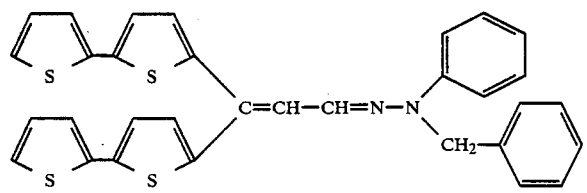
Compound No. VII-48
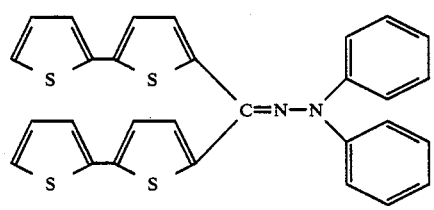
Compound No. VII-49

-continued
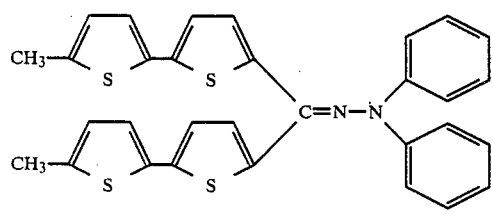
Compound No. VII-50
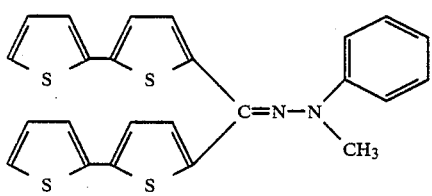
Compound No. VII-51
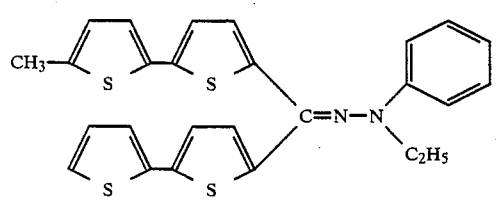
Compound No. VII-52
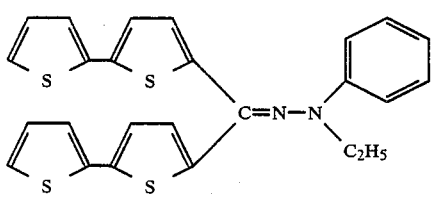
Compound No. VII-53
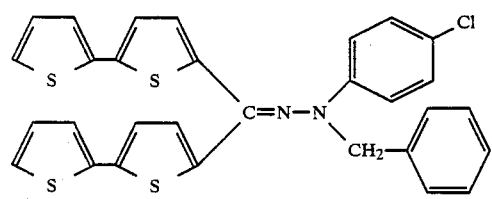
Compound No. VII-54
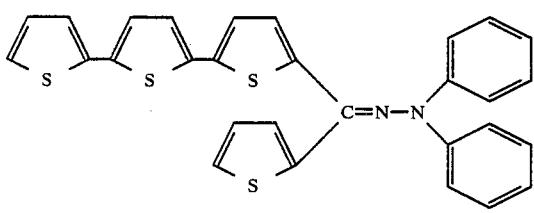
Compound No. VII-55
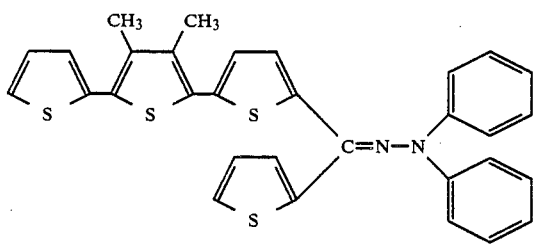
Compound No. VII-56

-continued
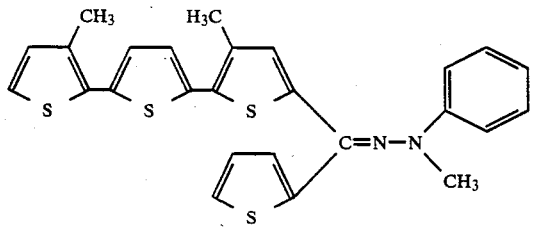
Compound No. VII-57
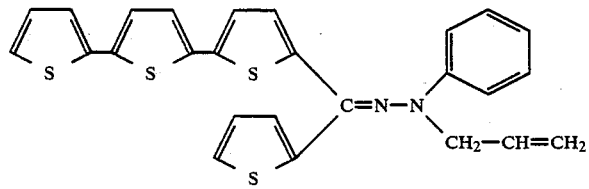
Compound No. VII-58
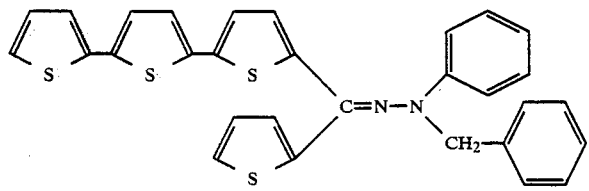
Compound No. VII-59
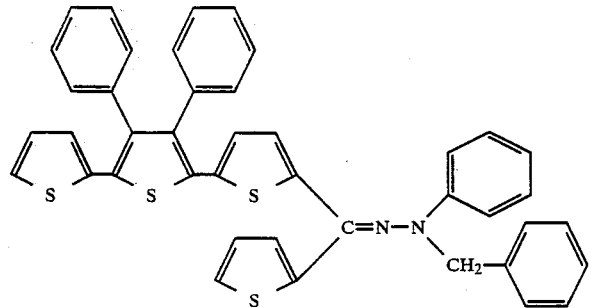
Compound No. VII-60
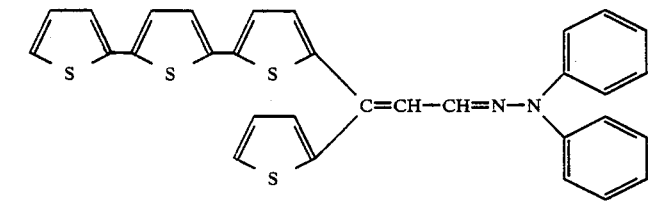
Compound No. VII-61
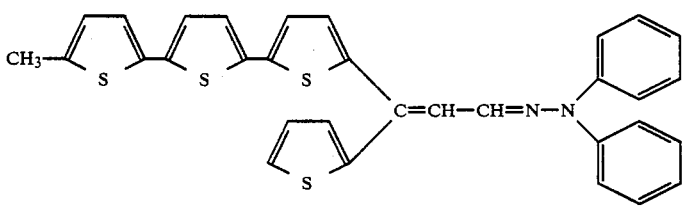
Compound No. VII-62
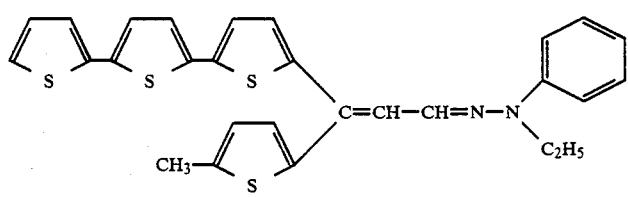
Compound No. VII-63

-continued
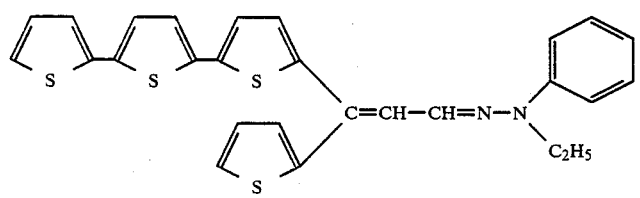
Compound No. VII-64
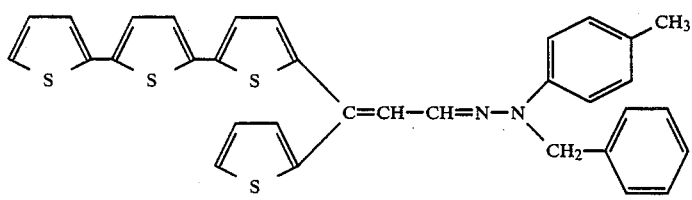
Compound No. VII-65
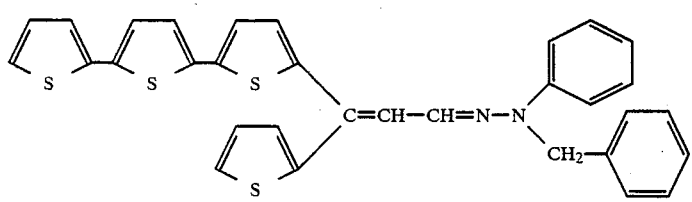
Compound No. VII-66
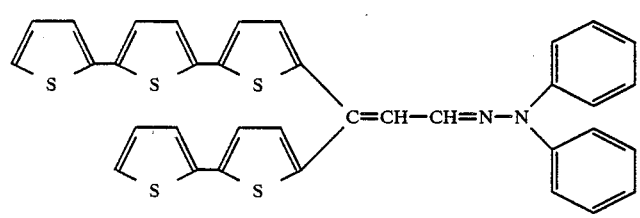
Compound No. VII-67
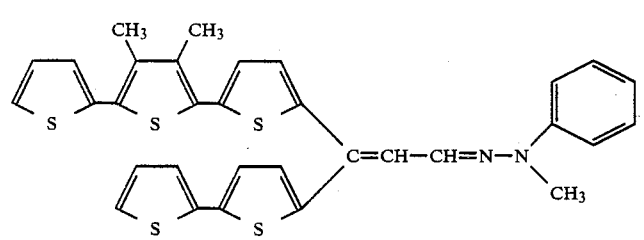
Compound No. VII-68
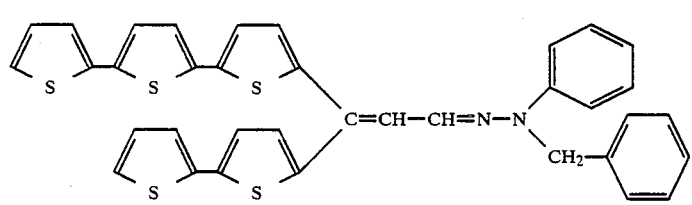
Compound No. VII-69
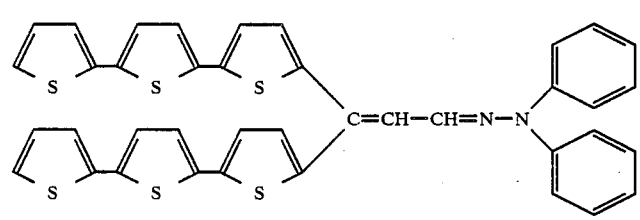
Compound No. VII-70

-continued
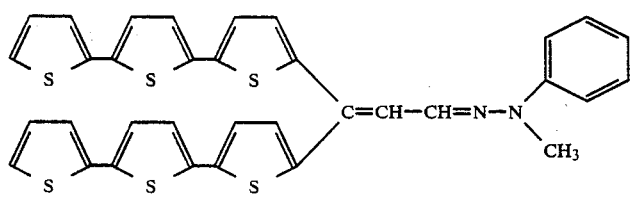 Compound No. VII-71
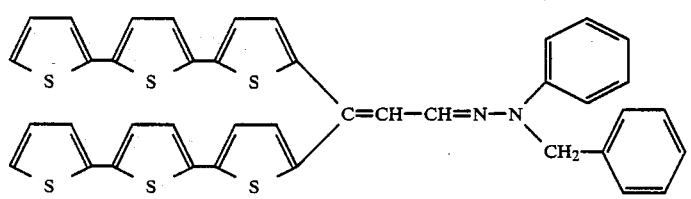 Compound No. VII-72
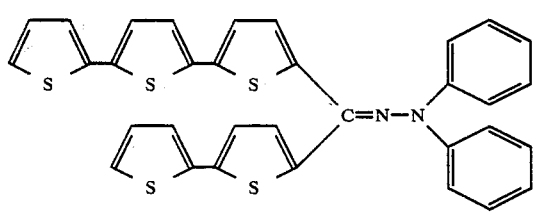 Compound No. VII-73
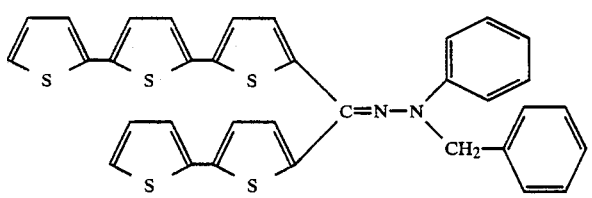 Compound No. VII-74
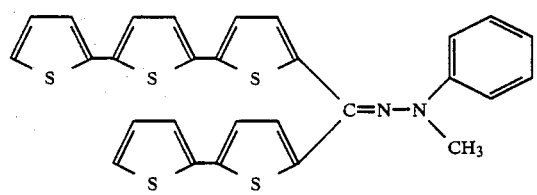 Compound No. VII-75
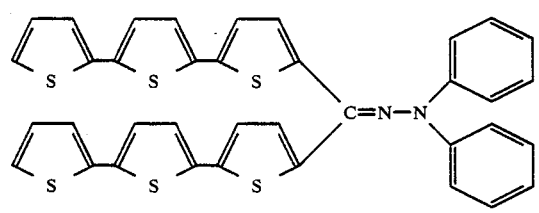 Compound No. VII-76
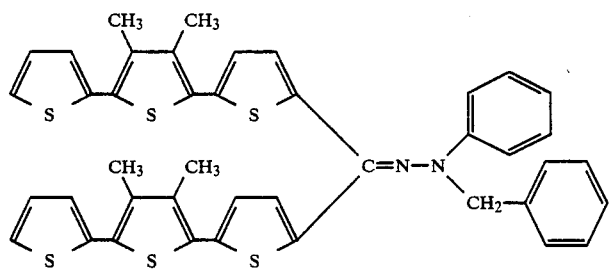 Compound No. VII-77

-continued

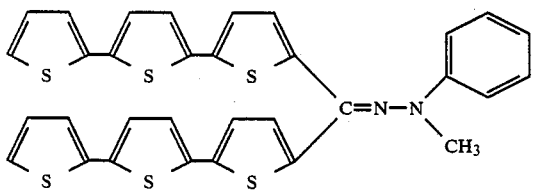

Compound No. VII-78

Examples will now be given, wherein various compounds represented by the general of formula (VII) were respectively used to produce the photoconductors.

Example VII-1

A photoconductor having the structure shown in FIG. 1 and comprising a photosensitive layer having a thickness of 15 μm was produced in substantially the same manner as in Example I-1 except that the hydrazone compound No. VII-1 mentioned above was used instead of the compound No. I-1.

EXAMPLE VII-2

A photoconductor having a structure corresponding to that of FIG. 3 was produced in substantially the same manner as in Example I-2 except that the hydrazone compound No. VII-2 was used instead of the compound No. I-2. The thickness of the charge transporting layer of the member was 15 μm, while the thickness of the charge generating layer was 1 μm.

EXAMPLE VII-3

A photoconductor was produced by forming a photosensitive layer in substantially the same manner as in Example VII-1 except that 50 parts by weight of metal-free phthalocyanine, 100 parts by weight of the hydrazone compound No. VII-3 as mentioned above, 50 parts by weight of a polyester resin (Vylon 200), and 50 parts by weight of PMMA were used to replace therewith the composition of the photosensitive layer of Example VII-1.

EXAMPLE VII-4

A photoconductor was produced by forming a photosensitive layer in substantially the same manner as in Example VII-1 except that Chlorodiane Blue was used instead of metal-free phthalocyanine in the Example VII-3.

The four photoconductors thus produced are examined with respect to surface potential $V_s$, residual potential $V_r$, and half decay exposure amount $E_{\frac{1}{2}}$ by using white light as well as a monochromatic light (wavelength: 780 nm) in the same manner as in Examples I-1 to I-4. The results of the measurements are shown in Table 13.

TABLE 13

| Example No. | White Light | | | Light with Wavelength of 780 nm | | |
|---|---|---|---|---|---|---|
| | $V_s$ (volts) | $V_r$ (volts) | $E_{\frac{1}{2}}$ (lux·sec) | $V_s$ (volts) | $V_r$ (volts) | $E_{\frac{1}{2}}$ (μJ/cm²) |
| VII-1 | 700 | 120 | 5.1 | 660 | 100 | 5.3 |
| VII-2 | 690 | 100 | 6.3 | 630 | 100 | 5.9 |
| VII-3 | 720 | 110 | 5.7 | 700 | 90 | 6.0 |
| VII-4 | 630 | 90 | 5.8 | — | — | — |

As can be seen in Table 13, the photoconductors of Examples VII-1, VII-2, VII-3 and VII-4 were comparable with one another in respect of the half decay exposure amount and the residual potential, and showed good surface potential characteristics. The photoconductors of Examples VII-1, VII-2 and VII-3, using a phthalocyanine compound as the charge generating substance, also showed a high sensitivity for light with a long wavelength of 780 nm, thus proving that they can be satisfactorily used in semiconductor laser printers.

EXAMPLE VII-5

A photoconductor with the structure shown in FIG. 2 was produced by forming a charge generating layer and a charge transporting layer with a dry thickness of 20 μm in substantially the same manner as in Example I-5 except that the hydrazone compound No. VII-4 was used instead of the compound No. I-4. After this photoconductor was charged by corona discharge at −6.0 kV for 0.2 second and examined with respect to electrophotographic characteristics. Good results were obtained, namely $V_s = -630V$, $V_r = -80V$ and $E_{\frac{1}{2}} = 4.1$ lux.sec.

EXAMPLE VII-6

A charge generating layer with a thickness of about 1 μm was formed on an aluminum support in the same manner as in Example I-6. A charge transporting layer with a thickness of about 15 μm was formed on the charge generating layer in substantially the same manner as in Example I-6 except that the hydrazone compound No. VII-5 was used instead of the compound No. I-5.

The photoconductor thus obtained was charged by corona discharge at −6.0 kV for 0.2 second and examined with respect to electrophotographic characteristics in the same manner as in Example VII-5. Good results were obtained, namely $V_s = -660V$ and $E_{\frac{1}{2}} = 6.2$ lux.-sec.

EXAMPLE VII-7

Photoconductors were produced by forming respective photosensitive layers in substantially the same manner as in Example VII-4 except that the compounds Nos. VII-6 to VII-78 were respectively used instead of the compound No. VII-3. The results obtained by using the electrostatic recording paper testing apparatus Model SP-428 are shown in Table 14. Table 14 shows the half decay exposure amounts $E_{\frac{1}{2}}$ (lex.sec) obtained under the experimental conditions where the photoconductors were positively charged in the dark by corona discharge at +6.0 kV for 10 seconds and irradiated with white light at an illuminance of 2 luxes.

TABLE 14

| Compound No. | $E_{\frac{1}{2}}$ (lux · sec) |
|---|---|
| VII-6 | 7.1 |

TABLE 14-continued

| Compound No. | $E_{\frac{1}{2}}$ (lux · sec) |
|---|---|
| VII-7 | 5.6 |
| VII-8 | 6.6 |
| VII-9 | 5.9 |
| VII-10 | 6.7 |
| VII-11 | 7.6 |
| VII-12 | 5.8 |
| VII-13 | 6.6 |
| VII-14 | 8.3 |
| VII-15 | 8.7 |
| VII-16 | 7.5 |
| VII-17 | 6.8 |
| VII-18 | 7.1 |
| VII-19 | 6.9 |
| VII-20 | 7.6 |
| VII-21 | 7.2 |
| VII-22 | 6.9 |
| VII-23 | 9.2 |
| VII-24 | 8.8 |
| VII-25 | 6.3 |
| VII-26 | 6.1 |
| VII-27 | 7.8 |
| VII-28 | 6.9 |
| VII-29 | 8.2 |
| VII-30 | 8.1 |
| VII-31 | 6.9 |
| VII-32 | 7.5 |
| VII-33 | 7.8 |
| VII-34 | 9.3 |
| VII-35 | 5.6 |
| VII-36 | 7.1 |
| VII-37 | 6.9 |
| VII-38 | 5.9 |
| VII-39 | 4.8 |
| VII-40 | 6.1 |
| VII-41 | 7.3 |
| VII-42 | 9.2 |
| VII-43 | 8.8 |
| VII-44 | 6.9 |
| VII-45 | 7.7 |
| VII-46 | 6.8 |
| VII-47 | 6.2 |
| VII-48 | 6.9 |
| VII-49 | 7.6 |
| VII-50 | 8.2 |
| VII-51 | 6.9 |
| VII-52 | 5.9 |
| VII-53 | 6.6 |
| VII-54 | 4.8 |
| VII-55 | 7.1 |
| VII-56 | 9.5 |
| VII-57 | 8.9 |
| VII-58 | 7.2 |
| VII-59 | 6.8 |
| VII-60 | 7.3 |
| VII-61 | 5.8 |
| VII-62 | 7.5 |
| VII-63 | 7.3 |
| VII-64 | 6.8 |
| VII-65 | 7.2 |
| VII-66 | 6.8 |
| VII-67 | 8.7 |
| VII-68 | 8.8 |
| VII-69 | 6.2 |
| VII-70 | 7.2 |
| VII-71 | 5.4 |
| VII-72 | 4.9 |
| VII-73 | 8.3 |
| VII-74 | 9.2 |
| VII-75 | 7.8 |
| VII-76 | 6.3 |
| VII-77 | 7.8 |
| VII-78 | 8.2 |

As can be seen in Table 14, the photoconductors using the respective hydrazone compound Nos. VII-6 to VII-78 as a transporting substance were satisfactorily with respect to the half decay exposure amount $E_{\frac{1}{2}}$.

According to the present invention, since a hydrazone compound or derivative represented by any one of the aforementioned chemical formulae is used in a photosensitive layer formed on an electroconductive substrate, as a charge transporting substance, a photoconductor shows a high sensitivity and excellent characteristics in repeated use when adapted to either a positive charge mode or a negative charge mode. A suitable charge generating substance can be chosen so as to be adapted to the kind of exposure light source. By way of example, a phthalocyanine compound or a bisazo compound can be used as a charge generating substance to provide a photoconductor capable of being used in semiconductor laser printers. If necessary, a covering layer may be provided on the surface of a photoconductor to improve the durability thereof.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. An electrophotographically photosensitive material, comprising:
a photosensitive layer containing a charge transporting substance comprising at least one hydrogen compound represented by general formula (I):

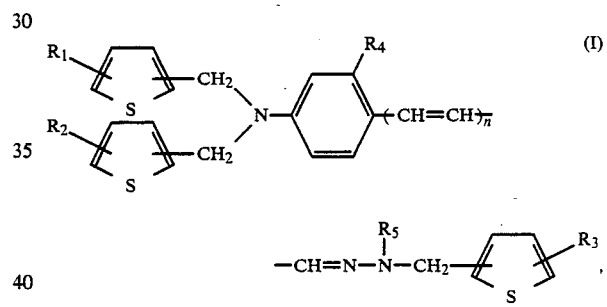

wherein each of $R_1$, and $R_2$, $R_3$ and $R_4$ is selected from the group consisting of a hydrogen atom, a halogen atom, an alkyl group, an alkoxy group, a hydroxy group, an allyl group, a nitro group, an aryl group, and an amino group, both of which aryl group and amino group may have a substituent(s); $R_5$ is an aryl group which may have a substituents(s); and n is an integer and has a value of 0 or 1.

2. The electrophotographically photosensitive material as claimed in claim 1, wherein said photosensitive layer additionally contains a charge generating substance and a binder resin, and is a dispersion of the charge generating substance and the change transporting substance selected from hydrazone compounds represented by the general formula (I) in the binder resin.

3. The electrophotographically photosensitive material as claimed in claim 1, wherein said electrophotographically photosensitive material is a laminate comprised of said photosensitive layer and a charge generating layer.

4. An electrophotographically photosensitive material, comprising:
a photosensitive layer containing a charge transporting substance comprising at least one hydrazone compound represented by general formula (II):

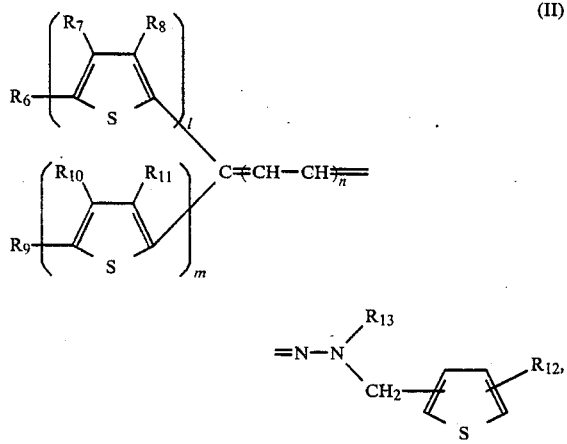 (II)

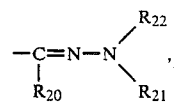

wherein each of $R_6$, $R_7$, $R_8$, $R_9$, $R_{10}$, $R_{11}$ and $R_{12}$ is selected from the group consisting of a hydrogen atom, a halogen atom, an alkyl group, a hydroxy group, an alkoxy group, a nitro group, an acyl group, an aryl group, and an amino group, both of which aryl group and amino group may have a substituent(s); $R_{13}$ stands for an aryl group which may have a substituent(s); each of l and m is an integer and has a value of 1, 2 or 3; and n is an integer and has a value of 0 or 1.

5. The electrophotographically photosensitive material as claimed in claim 4, wherein said photosensitive layer additionally contains a charge generating substance and a binder resin, and is a dispersion of the charge generating substance and the charge transporting substance selected from hydrazone compounds represented by the general formula (II) in the binder resin.

6. The electrophotographically photosensitive material as claimed in claim 4, wherein said electrophotographically photosensitive material is a laminate comprised of said photosensitive layer and a charge generating layer.

7. An electrophotographically photosensitive material comprising:

a photosensitive layer containing a charge transporting substance comprising at least one hydrazone derivative represented by general formula (III):

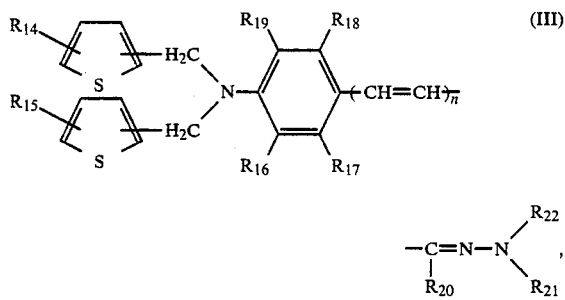 (III)

wherein each of $R_{14}$, $R_{15}$, $R_{16}$, $R_{17}$, $R_{18}$, $R_{19}$ and $R_{20}$ is selected from the group consisting of a hydrogen atom, a halogen atom, an alkyl group, an alkoxy group, an allyl group, an aralkyl group, and an aryl group, which aryl group may have a substituent(s); each of $R_{21}$ and $R_{22}$ is selected from the group consisting of an alkyl group, an allyl group, an aralkyl group and an aryl group, which aryl group may have a substituent(s); and n is an integer and has a value of 0 or 1.

8. The electrophotographically photosensitive material as claimed in claim 7, wherein said photosensitive layer additionally contains a charge generating substance and a binder resin, and is dispersion of the charge generating substance and the charge transporting substance selected from hydrazone derivatives represented by the general formula (III) in the binder resin.

9. The electrophotographically photosensitive material as claimed in claim 7, wherein said electrophotographically photosensitive material is a laminate comprised of said photosensitive layer and a charge generating layer.

10. An electrophotographically photosensitive material, comprising:

a photosensitive layer containing a charge transporting substance comprising at least one hydrazone derivative represented by general formula (IV):

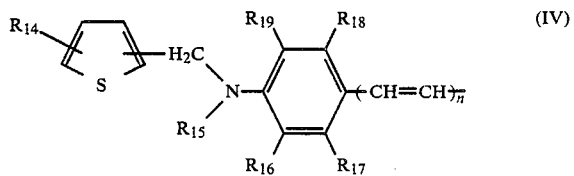 (IV)

wherein each of $R_{14}$, $R_{15}$, $R_{16}$, $R_{17}$, $R_{18}$, $R_{19}$ and $R_{20}$ is selected from the group consisting of a hydrogen atom, a halogen atom, an alkoxy group, an alkyl group, an allyl group, an aralkyl group, and an aryl group, which aryl group may have a substituent(s); each of $R_{21}$ and $R_{22}$ is selected from the group consisting of an alkyl group, an allyl group, an aralkyl group and an aryl group, which aryl group may have a substituent(s); and n is an integer and has a value of 0 or 1.

11. The electrophotographically photosensitive material as claimed in claim 10, wherein said photosensitive layer additionally contains a charge generating substance and a binder resin, and is a dispersion of the change generating substance and the charge transporting substance selected from hydrazone derivatives represented by the general formula (IV) in the binder resin.

12. The electrophotographically photosensitive material as claimed in claim 10, wherein said electrophotographically photosensitive material is a laminate comprised of said photosensitive layer and a charge generating layer.

13. An electrophotographically photosensitive material comprising:

a photosensitive layer containing a charge transporting substance comprising at least one hydrazone compound represented by general formula (V):

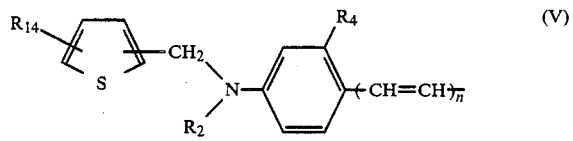 (V)

-continued

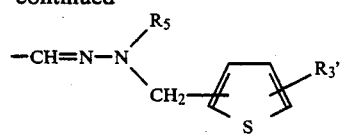

wherein each of $R_1$, $R_2$, $R_3$ and $R_4$ is selected from the group consisting of a hydrogen atom, a halogen atom, an alkyl group, an alkoxy group, an allyl group, a hydroxy group, a nitro group, an aryl group and an amino group, both of which aryl group and amino group may have a substituents(s); $R_5$ is an aryl group which may have a substituent(s); and n is an integer and has a value of 0 or 1.

14. The electrophotographically photosensitive material as claimed in claim 13, wherein said photosensitive layer additionally contains a charge generating substance and a binder resin, and is a dispersion of the charge generating substance and the charge transporting substance selected from hydrazone compounds represented by the general formula (V) in the binder resin.

15. The electrophotographically photosensitive material as claimed in claim 13, wherein said electrophotographically photosensitive material is a laminate comprised of said photosensitive layer and a charge generating layer.

16. An electrophotographically photosensitive material comprising:
a photosensitive layer containing a charge transporting substance comprising at least one hydrazone compound represented by general formula (VI):

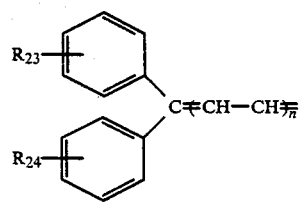

(VI)

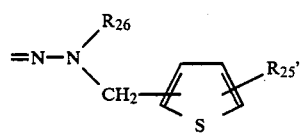

wherein each of $R_{23}$, $R_{24}$ and $R_{25}$ is selected from the group consisting of a hydrogen atom, a halogen atom an alkyl group, a hydroxy group, an alkoxy group, an aryl group, a nitro group, and an amino group, each of which groups may have a substituent(s); $R_{26}$ is an aryl group which may have a substituent(s); and n is an integer and has a value of 0 or 1.

17. The electrophotographically photosensitive material as claimed in claim 16, wherein said photosensitive layer additionally contains a charge generating substance and a binder resin, and is a dispersion of the charge generating substance and the charge transporting substance selected from hydrazone compounds represented by the general formula (VI) in the binder resin.

18. The electrophotographically photosensitive material as claimed by claim 16, wherein said electrophotographically photosensitive material is a laminate comprised of said photosensitive layer and a charge generating layer.

19. An electrophotographically photosensitive material, comprising:
a photosensitive layer containing a charge transporting substance comprising at least one hydrazone compound represented by general formula (VII):

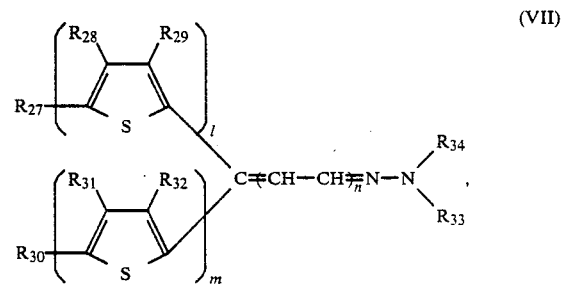

(VII)

wherein each of $R_{27}$, $R_{28}$, $R_{29}$, $R_{30}$, $R_{31}$ and 32 is selected from the group consisting of a hydrogen atom, a halogen atom, an alkyl group, an alkoxy group, an acyl group, a nitro group, aryl group and an amino group, both of which aryl group and amino group may have a substituent(s); each of $R_{33}$ and $R_{34}$ is selected from the group consisting of an alkyl group, an allyl group, an aryl group and an aralkyl group, both of which aryl group and aralkyl group may have a substituent(s); each of l and m is an integer and has a value of 1, 2, 3; and n is an integer and has a value of 0 or 1.

20. The electrographically photosensitive material as claimed in claim 19, wherein said photosensitive layer additionally contains a charge generating substance and a binder resin, and is a dispersion of the charge generating substance and the charge transporting substance selected from hydrazone compounds represented by the general formula (VII) in the binder resin.

21. The electrophotographically photosensitive material as claimed in claim 19, wherein said electrophotographically photosensitive material is a laminate comprised of said photosensitive layer and a charge generating layer.

* * * * *